(12) United States Patent
O'Dowd et al.

(10) Patent No.: US 11,609,840 B2
(45) Date of Patent: Mar. 21, 2023

(54) SYSTEMS, METHODS, AND DEVICES FOR VERTICALLY INTEGRATED INSTRUMENTATION AND TRACE RECONSTRUCTION

(71) Applicant: Green Hills Software LLC, Santa Barbara, CA (US)

(72) Inventors: Daniel D. O'Dowd, Montecito, CA (US); Steven H. Ginzburg, Mountain View, CA (US); Nikola Valerjev, Goleta, CA (US); Gregory Davis, Santa Barbara, CA (US); Greg Eddington, Santa Barbara, CA (US); Nathan Field, Santa Barbara, CA (US); Mallory M. Green, Goleta, CA (US); Phillip Kelly, Goleta, CA (US); Michael B. Wolf, Blue Hill, ME (US); Tom Zavisca, Santa Barbara, CA (US)

(73) Assignee: GREEN HILLS SOFTWARE LLC, Santa Barbara, CA (US)

( * ) Notice: Subject to any disclaimer, the term of this patent is extended or adjusted under 35 U.S.C. 154(b) by 0 days.

(21) Appl. No.: 17/665,258

(22) Filed: Feb. 4, 2022

(65) Prior Publication Data
US 2022/0245057 A1 Aug. 4, 2022

Related U.S. Application Data

(63) Continuation of application No. 17/031,606, filed on Sep. 24, 2020, now Pat. No. 11,243,871, which is a
(Continued)

(51) Int. Cl.
*G06F 11/36* (2006.01)

(52) U.S. Cl.
CPC ...... *G06F 11/3644* (2013.01); *G06F 11/3636* (2013.01); *G06F 11/3664* (2013.01)

(58) Field of Classification Search
None
See application file for complete search history.

(56) References Cited

U.S. PATENT DOCUMENTS

| 5,784,552 A | 7/1998 | Bishop et al. |
| 5,894,575 A | 4/1999 | Levine et al. |

(Continued)

FOREIGN PATENT DOCUMENTS

| JP | H09-6647 | 1/1997 |
| JP | 2012-256279 | 12/2012 |

OTHER PUBLICATIONS

Communication pursuant to Article 94(3) EPC in European Application No. 17859981.7 dated Jan. 13, 2021.
(Continued)

*Primary Examiner* — Qing Chen
(74) *Attorney, Agent, or Firm* — Knobbe, Martens, Olson & Bear LLP

(57) ABSTRACT

In an embodiment, a system is configured to replay and/or reconstruct execution events and system states in real time or substantially in real time starting from the point when execution of a target program has stopped to the point when the user desires to step through the target program's execution in order to debug the software. In an embodiment, a system is configured to efficiently collect trace data that is sufficient to reconstruct the state of a computer system at any point of time from the start of execution to the time execution was stopped. Efficient and effective debugging of the software can be performed using embodiments of the disclosed methods, systems, and devices.

25 Claims, 52 Drawing Sheets

Related U.S. Application Data continuation of application No. 16/391,108, filed on Apr. 22, 2019, now Pat. No. 10,817,404, which is a continuation of application No. 15/864,907, filed on Jan. 8, 2018, now Pat. No. 10,324,824, which is a continuation of application No. 15/729,123, filed on Oct. 10, 2017, now Pat. No. 9,904,615.

(60) Provisional application No. 62/406,829, filed on Oct. 11, 2016.

(56) References Cited

U.S. PATENT DOCUMENTS

| | | | |
|---|---|---|---|
| 6,311,327 | B1 | 10/2001 | O'Brien et al. |
| 6,901,581 | B1 | 5/2005 | Schneider |
| 7,664,798 | B2 | 2/2010 | Wood et al. |
| 7,685,388 | B1 | 3/2010 | Jiang |
| 9,898,385 | B1 | 2/2018 | O'Dowd et al. |
| 9,904,615 | B1 | 2/2018 | O'Dowd et al. |
| 10,324,824 | B2 | 6/2019 | O'Dowd et al. |
| 10,817,404 | B2 | 10/2020 | O'Dowd et al. |
| 2002/0087949 | A1 | 7/2002 | Golender et al. |
| 2002/0095660 | A1 | 7/2002 | O'Brien et al. |
| 2005/0216536 | A1 | 9/2005 | Stager et al. |
| 2007/0005664 | A1 | 1/2007 | Kodavalla |
| 2008/0301417 | A1 | 12/2008 | Law et al. |
| 2009/0049428 | A1 | 2/2009 | Cozmei |
| 2013/0185601 | A1 | 7/2013 | Mayer |
| 2013/0227350 | A1 | 8/2013 | O'Riordan et al. |
| 2014/0298301 | A1 | 10/2014 | Lindahal et al. |
| 2015/0052403 | A1 | 2/2015 | Garrett et al. |
| 2015/0378870 | A1 | 12/2015 | Marron |
| 2016/0124728 | A1 | 5/2016 | Mahaffey |
| 2016/0292061 | A1 | 10/2016 | Marron et al. |
| 2017/0109409 | A1 | 4/2017 | Nagy et al. |
| 2018/0253369 | A1 | 9/2018 | O'Dowd |
| 2018/0357079 | A1 | 12/2018 | Demulder et al. |
| 2020/0034276 | A1 | 1/2020 | O'Dowd et al. |

OTHER PUBLICATIONS

International Search Report and Written Opinion for application No. PCT/US2017/055986, which is a PCT application related to the present application, dated Feb. 1, 2018.

International Preliminary Report on Patentability and Written Opinion for application No. PCT/US2017/055986, dated Apr. 16, 2019.

Veitch, et al. "XRay: A Function Call Tracing System" dated Apr. 5, 2016 in 9 pages.

Undo Software, "What is reversible debugging?" dated 2015 in 4 pages.

Undo Software, "What is reversible debugging?" dated 2015 in 3 pages.

```
Error E;
TileParameters *tile = spe->Tile;
int xval = *x, yval = *y;

/* Find the next tile on the screen to compute. */
while (yval < Y_DIM && TileStarted[yval >> TILE_SHIFT][xval >> TILE_SHIFT] ) {
    xval += MAX_TILE_DIM;
    if (xval >= X_DIM) {
        xval = 0;
        yval += MAX_TILE_DIM;
    }
}
*x = xval;
*y = yval;
if (yval >= Y_DIM)
    return;
```

FIG. 13 (Continued)

Timestamp Interpolation (even subdivision)

| | Actual TS | With sub-timestamp bits | Synthesized TS | Duration of event (synthesized) |
|---|---|---|---|---|
| X11a.1 | 0x100 | 0x100000 | 0x100000 | 0x800 |
| X11a.2 | - | - | 0x100800 | 0x800 |
| X11a.3 | - | - | 0x101000 | 0x800 |
| X11a.4 | - | - | 0x101800 | 0x800 |
| X11a.5 | - | - | 0x102000 | 0x800 |
| X11a.6 | - | - | 0x102800 | 0x800 |
| X11a.7 | 0x103 | 0x103000 | 0x103000 | |

Timestamp Interpolation (uneven subdivision)

| | Actual TS | With sub-timestamp bits | Synthesized TS | Duration of event (synthesized) |
|---|---|---|---|---|
| X11b.1 | 0x100 | 0x100000 | 0x100000 | 0x200 |
| X11b.2 | - | | 0x100200 | 0x200 |
| X11b.3 | - | | 0x100400 | 0x1400 |
| X11b.4 | - | | 0x101800 | 0x1400 |
| X11b.5 | - | | 0x102c00 | 0x200 |
| X11b.6 | - | | 0x102e00 | 0x200 |
| X11b.7 | 0x103 | 0x103000 | 0x103000 | |

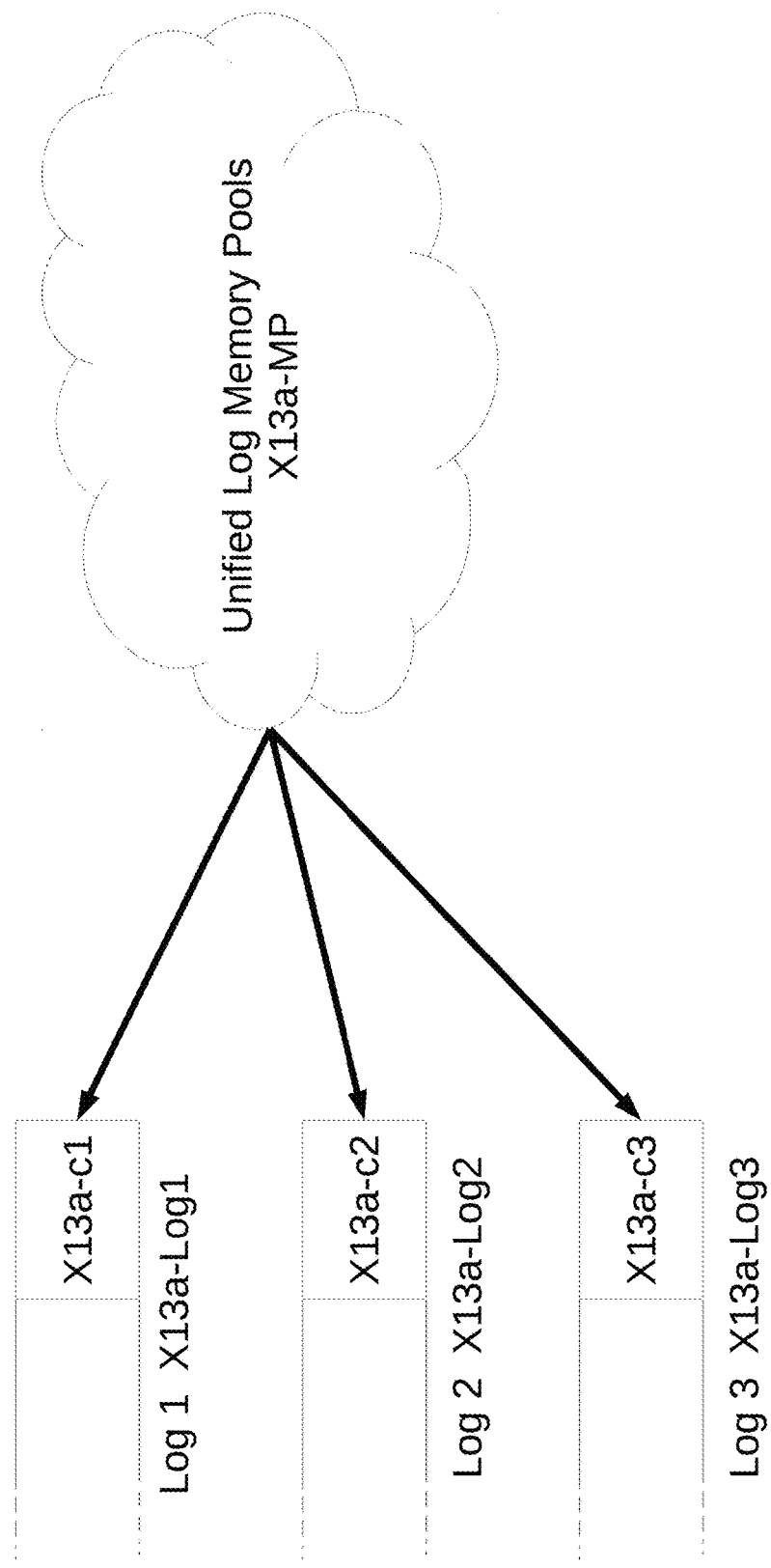
FIG. 26A Initial Chunk Assignments

SYSTEMS, METHODS, AND DEVICES FOR VERTICALLY INTEGRATED INSTRUMENTATION AND TRACE RECONSTRUCTION

CROSS-REFERENCE TO RELATED APPLICATIONS

This application is a continuation of U.S. patent application Ser. No. 17/031,606 filed on Sep. 24, 2020 and issued as U.S. Pat. No. 11,243,871, which is a continuation of U.S. patent application Ser. No. 16/391,108 filed on Apr. 22, 2019 and issued as U.S. Pat. No. 10,817,404, which is a continuation of U.S. patent application Ser. No. 15/864,907 filed on Jan. 8, 2018 and issued as U.S. Pat. No. 10,324,824. which is a continuation application of U.S. patent application Ser. No. 15/729,123, filed on Oct. 10, 2017 and issued as U.S. Pat. No. 9,904,615, which claims the benefit of U.S. Provisional Application No. 62/406,829, filed on Oct. 11, 2016. The foregoing applications are incorporated herein by reference in their entirety.

BACKGROUND

Field

The embodiments of the disclosure generally relate to instrumentation systems, and more particularly to systems, devices, and methods for dynamic reconstruction and debugging.

Description of the Related Art

With the development of new high technologies, the software required to run these new innovations becomes increasingly important and complex. As software becomes increasingly more complex, the debugging of such software also becomes increasingly more difficult. For example, cars and trucks increasingly require complicated software to run the various system components in the vehicle. In general, a typical car nowadays requires tens of millions of lines of computer code that is written by hundreds of people. As the number of lines of code increases and as more programmers are involved, the number of bugs in software code also increases. Additionally, the software bugs are increasingly more complex to detect and/or debug. As used herein, the term "bug" generally refers to errors in computer programs. For example, a common bug in a computer program is for the computer program to crash before completing its entire function.

In general, programmers employ software debuggers to help assist with finding errors in computer programs. However, such debuggers typically require long periods of time for the debugger to analyze trace data that is generated from running the computer program that is being analyzed. As used herein, the term "trace data" generally refers to a recording of the sequence of machine instructions executed by a program during a time period along with the addresses and/or values stored in memory and/or the values of memory locations accessed and/or modified by each machine instruction.

SUMMARY

For purposes of this summary, certain aspects, advantages, and novel features of the disclosure are described herein. It is to be understood that not necessarily all such advantages may be achieved in accordance with any particular embodiment. Thus, for example, those skilled in the art will recognize that the disclosure may be embodied or carried out in a manner that achieves one advantage or group of advantages as taught herein without necessarily achieving other advantages as may be taught or suggested herein.

In some embodiments, a method of reconstructing at a destination point in time, as a reconstructed state, the contents of at least part of the memory and registers of one or more computer programs, executed on one or more execution units of a target system includes reconstructing the reconstructed state at a plurality of points in time, basing the reconstruction on logged data resulting from execution of the one or more computer programs. The logged data includes pre-images representing at least part of the reconstructed state at a time prior to modifications by the one or more computer programs or by the operating system or another agent external to the one or more computer programs. The logged data also includes at least one register state snapshot logged prior to the destination point in time. The method also includes applying an instruction set simulator to determine at least part of the reconstructed state at the destination point in time.

The method of any preceding paragraph can include one or more of the following features. The method can further include maintaining a representation of the reconstructed state at at least one of the plurality of points in time. The method can further include recreating the reconstructed state immediately prior to a memory change by copying a pre-image from the logged data during the reconstruction of the reconstructed state. The method can further include recreating the reconstructed state at points in time immediately prior to successively earlier memory change records, thereby recreating successively earlier points during execution of the one or more computer programs. The method can further include reserving memory space for storing a post-image. The method can further include storing pre-images in the same memory space reserved for post-images. The method can further include copying at least a portion of the representation as a post-image into the reserved memory space for storing the post-image. The method can further include reconstructing the reconstructed state at a point in time immediately after a memory change by copying the post-image. The method can further include reconstructing the reconstructed state at a point in time immediately after successively later memory changes, thereby recreating successively later and later points during execution of the one or more programs. The method can further include recreating at least part of the reconstructed state in which an execution unit operated at one point in time, and applying the instruction set simulator to determine at least part of the reconstructed state at a later point in time. The method can further include recreating the at least part of the reconstructed state in which the execution unit operated by reconstructing memory forwards or backwards. The later point in time can be the destination point in time.

The method of any preceding paragraph can include one or more of the following features. The method can further include determining a set of execution units whose register states are unknown at the destination point in time. The method can further include determining a reconstruction point such that for each execution unit whose register state is unknown at the destination point in time, at least one register state snapshot between the reconstruction point and the destination point in time has been logged. The method can further include reconstructing at least part of the reconstructed state at the reconstruction point. The method can further include using a combination of memory reconstruction techniques and reconstructive simulation techniques to return to the destination point in time. The method can further include using the reconstructive simulation technique when accurate register state information for an execution unit of the set of execution units is available. The method can further include using the memory reconstruction technique when accurate register state information for an execution unit of the set of execution units is not available.

The method of any preceding paragraph can include one or more of the following features. The method can further include determining that reconstruction of a subset of the reconstructed state is not possible. Reconstruction of the subset of the reconstructed state may not be possible due to one or more pre-image values for a memory change not being logged. The one or more pre-image values for the memory change may not be logged when storing to side effect volatile memory. Reconstruction of the subset of the state of the memory may not be possible due to a correct order of logged events not being certain. The correct order of logged events may not be certain due to one or more race conditions in the one or more computer programs. The method can further include displaying information relating to the one or more race conditions. The displayed information can include locations in the one or more computer programs of conflicting accesses to one or more memory locations. The locations in the one or more computer programs can be source code locations.

The method of any preceding paragraph can include one or more of the following features. The method can further include tracking the unknown subset of the reconstructed state. The method can further include propagating the unknown-ness of the subset of the reconstructed state to a different subset of the reconstructed state when performing the simulation. The unknown-ness may not be propagated when a result of an instruction of the one or more computer programs is known. The method can further include marking an unknown subset of the reconstructed state as known when the value becomes known. The value can become known as a result of simulating an instruction that loads a register or memory location with a known value. The value can become known when it can be determined from a register state snapshot.

In some embodiments, a non-transitory computer storage stores instructions that, when executed by the one or more processors, cause the one or more processors to execute the method of any preceding paragraph. In some embodiments, a computer system includes at least one memory and one or more processors configured to implement the method of any preceding paragraph.

BRIEF DESCRIPTION OF THE DRAWINGS

Before going in other features, aspects and advantages of the embodiments disclosed herein are described in detail below with reference to the drawings of various embodiments, which are intended to illustrate and not to limit the various embodiments. The drawings comprise the following figures in which:

FIG. 25A illustrates performing timestamp interpolation with even subdivision according to an embodiment.

FIG. 25B illustrates performing timestamp interpolation with uneven subdivision according to an embodiment.

FIG. 26A illustrates initial chunk assignment according to an embodiment.

DESCRIPTION OF THE EMBODIMENTS

Figure 1A:
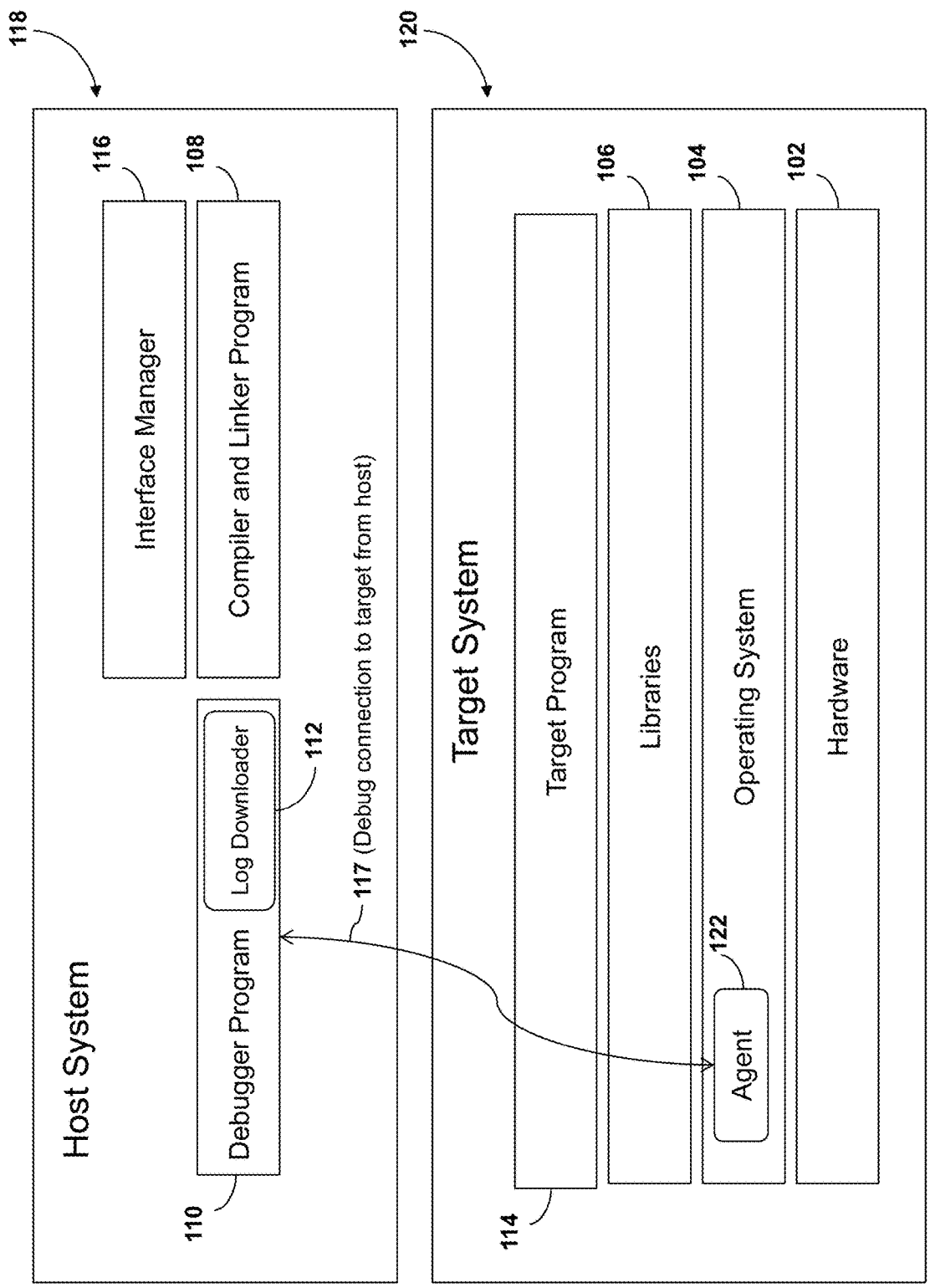
FIG. 1A illustrates a block diagram of a general hardware and software architecture comprising a debugger and a compiler.

Although several embodiments, examples and illustrations are disclosed below, it will be understood by those of ordinary skill in the art that the disclosure extends beyond the specifically disclosed embodiments, examples and illustrations and includes other uses of the disclosure and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments. In addition, embodiments can comprise several novel features and no single feature is solely responsible for its desirable attributes or is essential to practicing the disclosure herein described.

Overview

Computer programmers use software debuggers to find errors or "bugs" in computer programs. Some errors are difficult to find because they appear long after the circumstances that caused them have occurred. For example, the result of an incorrect calculation may not be used until millions or billions of instructions have executed after the initial calculation.

Some other bugs are difficult to find when they take a long time to reproduce or the conditions to cause the bug are indeterminate or rely on other unknown factors. For example, a program that depends on varying external inputs such as a particular sensor reading from a car engine or smartphone's gyroscopic sensor may exhibit an error only when those sensor readings have a specific sequence of values. In such cases, a programmer may have to wait for a long time for a specific sequence of values to occur or try an impractically large number of inputs to the program in order to cause the bug to appear so that it may be observed in a debugger.

Some other bugs are difficult to correct even after they are found because of the complexity and enormity of the source code within which they occur. Programmers may need to understand a large portion of the source code of a program before they can correct a bug without causing an error somewhere else in the program's execution. Modern devices that rely on embedded computing systems such as cars, smartphones, airplanes, etc. execute tens of millions of lines of source code written by teams of dozens or hundreds of engineers. No one person in these engineering teams understands the entire source code base, so fixing bugs in large source code can be difficult, slow, and error-prone.

When there are millions or billions of executed instructions and/or lines of code, which is often the case with complex modern devices, such as smartphones, tablets, laptops, control systems, vehicle control systems, etc., or there are bugs that take a long time to reproduce, or there are bugs that are difficult to correct because the software is very complicated, it is not possible for a human to debug such software code in a person's mind or using paper and pencil within a reasonable amount of time. Further, the problem of debugging software only arises in the computer realm, and the solutions disclosed herein are technical solutions to a problem unique to the use and development of complex software, which is increasingly necessary for operating our new high technologies on which we rely. As new high technologies become more advanced, the software that operates such high technologies becomes complicated and large, both of which makes debugging such software challenging and requires a unique technical solution.

Some debugging solutions offer various analysis tools that enable hardware, firmware, and software developers to find and fix bugs and/or errors, as well as to optimize and/or test their code. One class of these analysis tools looks at log data generated while executing instructions on one or more processors. The log data can be generated by the processor itself (for example, processor trace), by the operating system, by instrumentation log points added by software developers, and/or by instrumentation added by a compiler or JIT (Just In Time) compiler. Other sources of data, such as logic analyzers, collections of other systems, and logs from validation scripts or other sources, may be external to the system. The data generated by these different sources may be referred to as "trace data." A single element of the trace data may be referred to as an "event."

Some debugger systems, which may be referred to as "time traveling debuggers," allow programmers to move forward and backward in the execution of their programs. Time traveling debuggers may be used to debug a program from the manifestation of the bug all the way back to the root cause of the bug, or to allow programmers to understand the general structure of a program so that they know how a program is organized, along with when and where the various functions of the program occur and are executed.

Time traveling debuggers can include two components: a time traveling debugger backend, responsible for generating, gathering, and (in some embodiments) interpreting data, and a time traveling debugger user interface, responsible for presenting the data to the user.

Some time traveling debugger backends (which may be referred to as "hardware trace backends") comprise a form of hardware trace. Hardware trace is a highly compressed stream of information emitted by a CPU that allows a programmer to reconstruct exactly what instructions have been executed by the CPU. Hardware trace has several limitations. For example, hardware trace is not available on all CPU architectures, therefore it can only be used on some CPUs. Even on CPUs which have hardware trace, manufacturers may choose not to install pins that comprise the trace output port that emits hardware trace in order to shrink the CPU's chip package size and save on production cost. Additionally, hardware trace may require external trace collection hardware, such as a trace probe, which may be costly, limited in memory to record trace data, and physically difficult to install for some systems. For example, a smartphone has to be small and portable, and would be difficult to use with a large, heavy trace probe attached to its trace output port.

Further, hardware trace can be unreliable and can have missing information when the trace output port cannot keep up with the CPU's execution of instructions. Rather than slowing down or stalling the CPU, most manufacturers have chosen not to emit trace data when the CPU may overload the trace output port. Hardware trace of memory accesses is particularly susceptible to overloading trace output because memory access is not predictable and therefore not easily compressed for output. Omission of memory accesses in the trace data severely hampers the functionality of time traveling debuggers. In addition, hardware trace cannot trace operating systems well. Such debugging systems may be able to tell when a task in an operating system is created or destroyed, but is blind to all other OS operations such as allocation of resources, creation of address spaces, and use of various synchronization primitives. However, knowledge of all of these OS activities can be important in finding the root cause of a bug, especially since modern devices often use operating systems with dozens to hundreds of tasks running simultaneously, all interacting with each other.

Additionally, hardware trace cannot trace Symmetric Multi-Processing (SMP) systems well. Hardware trace is often unable to trace more than 2 cores in an SMP system due to bandwidth limitations of emitting trace data for more than 2 cores. Such debugging systems can be of limited use because many modern computing devices such as smartphones and tablets commonly have 4 or more cores of SMP execution. Further, hardware trace has almost no way of tracing Asymmetric Multi-Processing systems wherein multiple different types of CPUs and systems are executing asynchronously with respect to each other. This can be significant limitation of such debugging systems because, for example, modern cars have over 100 independent CPUs operating asynchronously with respect to each other. Further, hardware trace is very slow to decode into a form suitable for use in a time traveling debugger, so a programmer may have to wait for a long time before using trace data to debug the program. Typical decoding rates for commercial products range from under a megabyte per second to 2 MB/sec. Trace probes are typically equipped with 1 GB of memory, and it may take over 20 minutes to decode a full trace probe's trace data. In addition, since hardware trace decoding is done from the beginning of the collected trace data, the more trace data that is collected, the longer it takes to decode trace data. With trace probes sold with up to 16 GB of trace memory today, it can take almost 6 hours to decode a full 16 GB trace buffer before a programmer can use the trace data to debug a program. Hardware trace decoding time increases with the size of the trace buffer.

The embodiments disclosed herein seek to solve the above problems with debugging systems and/or with a software-based approach to trace. In an embodiment, the systems disclosed herein use a compiler to instrument a program with additional instructions. In an embodiment, an operating system can be configured to work and/or cooperate with the instrumented target program that is running on the operating system in order to solve the above problems with debugging systems.

Time traveling debugger backends that include certain forms of software instrumentation (which may be referred to as "copying backends"), can significantly slow down target programs, whereas the embodiments disclosed herein contain features to reduce these speed penalties. Copying backends require a burdensome method of saving the entire target's operating state through copying (or "forking") large portions of the memory of the executing program as checkpoints, whereas the embodiments disclosed herein do not require such bulk copies of state. Further, copying backends also require corralling all processes into one CPU in order to trace them. However, some bugs only occur when processes are running on different CPUs because of timing dependencies that occur with concurrent execution. In an embodiment, the systems disclosed herein address the foregoing limitations.

In an embodiment, the system uses instrumentation in the target program and in the operating system to generate the trace information needed to implement an improved time traveling debugger backend (which may be referred to as "improved backend.") Trace information generated by the instrumentation can be logged in the memory of the CPU running the computer program until it can be retrieved and interpreted by the debugger. This logged trace information is called the "trace log." In an embodiment, the improved backend retrieves and interprets the trace information from newest to oldest. The trace information can be configured and/or designed to be interpreted in reverse-chronological order, so the user may begin debugging the most recent execution history of the program without waiting for the earlier parts to be retrieved and/or decoded.

In an embodiment, the improved backend can comprise instrumentation in the target program inserted automatically by the compilation tools (compiler, assembler, linker, etc.) Such instrumentation in the target program can serve two primary purposes.

First, such instrumentation can be configured to record the target program's execution path, for example, which instructions are executed, and/or in what order. Such instrumentation can be configured to do this by making a log entry for each basic block executed. A basic block may be defined as a sequence of instructions in the program that, absent outside interruptions, has a single entry point and a single exit point, and each instruction within the block is executed exactly once. Depending on the capabilities of the CPU architecture, the definition of a basic block may be modified, for example, to account for conditionalized instructions (which have no effect under certain conditions, and therefore may be considered not to have executed); or repeat instructions, which execute multiple times, for example, to perform a memory copy; or other modifications, as appropriate.

Second, such instrumentation in the target program can be configured to track and/or monitor changes to the target program's memory. When memory is overwritten, the improved backend can be configured to log the address modified, and/or the memory's value prior to the modification ("pre-image"). In an embodiment, the pre-image is logged to allow reconstruction to occur in reverse-chronological order, as follows. Starting with an image of the current state of memory on the target, the debugger improved backend can apply pre-images in reverse chronological order to recreate the state of memory at any point in the past, starting with the most recent, and proceeding earlier and earlier. In an embodiment, each pre-image applied to the target memory image simulates undoing one of the memory modifications performed while the program was running. While performing this reverse reconstruction, each time the debugger system overwrites part of the target memory image with a pre-image, the contents of the memory the debugger system is about to overwrite may be saved in the log as a "post-image." Once a post-image is saved, the debugger improved backend can be configured to apply the post-image to the target memory image, simulating the corresponding memory modification forward in time. Therefore, starting with the final state of the program, the improved backend can be configured to freely reconstruct the memory state of the target program backwards, and then forwards again in time, as needed.

In an embodiment, the technique of logging pre-images is adjusted in cases where logging a pre-image is not possible, for example, when the memory being modified is a memory mapped register on a hardware peripheral, which could have undesirable side effects when read.

In an embodiment, the compilation tools use various techniques to reduce or eliminate instrumentation in cases where the logged values can be inferred from other logged data. These optimizations reduce logging overhead, and increase the amount of execution history that can be stored in a given amount of log.

In an embodiment, an improved backend can comprise instrumentation in the operating system configured to log changes to the target program's execution path and memory that originate from outside of the application. Examples of changes to the target program's execution path and memory can include, but are not limited to interrupts, context switches, memory changes caused by operating system calls, and communication arriving from outside of the program from peripherals and other programs. As with memory modifications logged by the target program's internal instrumentation, in an improved backend, the operating system can be configured to log memory changes as pre-images for purposes of backwards reconstruction.

The operating system of the systems disclosed herein can be configured to periodically log the state of CPU registers in all threads of execution in the target program. In an embodiment, the foregoing data is used to reconstruct the state of registers in the program. After the memory is reconstructed at the desired point in time using the techniques described herein, the debugger can use a simulator to simulate forward from the nearest register state snapshot recorded prior to the desired point in time, reconstructing the state of CPU registers at the desired point in time.

In an embodiment, the instrumentation and/or techniques described herein are sufficient to implement an improved time traveling debugger backend, that does not incur the various limitations usually associated with hardware trace backends and copying backends, described herein.

Optionally, the improved backend can be configured to collect additional information for various purposes. For example, when the target program being debugged has multiple threads of execution running simultaneously, for example, in symmetric or asymmetric multiprocessing configurations, the improved backend can be configured to log the synchronization events and other communication between CPUs, optionally along with timestamps. Assuming sufficient information is logged to allow merging data from different execution units in a logically consistent order, for example, timestamps on certain critical events, an improved backend can enable a time traveling debugger to operate on systems comprising multiple execution units. The collection of such data can also allow an improved backend to perform automated detection of hazards, race conditions, and/or other potential programming errors, even when such errors did not result in incorrect behavior in the portion of the target program's execution being analyzed.

In an embodiment, an improved backend can be configured to comprise instrumentation adapted to collect function entry and exit (FEE) data, which can be used to display changes in the program's call stack over time. FEE data can include timestamp information, making the data valuable for performance analysis and optimization, as well as for debugging.

The embodiments disclosed herein may overcome the limitations with hardware trace backends, described herein. As discussed herein, hardware trace is not available on all architectures. By contrast, the embodiments disclosed herein do not rely on hardware trace capabilities, and thus work on virtually any architecture. Additionally, the embodiments herein can operate without external trace collection hardware. Therefore, the embodiments may not be subject to the high cost, large size, and limited memory capacity of trace probes. The embodiments can use instrumentation, which slows down program execution such that no data is lost, as can happen with hardware trace when the trace output port cannot keep up with program execution.

Further, the embodiments can instrument the operating system, and as such, the embodiments can be capable of recording operating system events of which hardware trace is unaware. These operating system events can be important in finding the root cause of a bug. In an embodiment, the system is configured to be aware of synchronization primitives and communication between CPUs, allowing debugging of programs running in SMP environments, and other configurations with multiple execution units. Additionally, by logging sufficient information to allow merging data from different CPUs in a logically consistent order, the embodiments can have the ability to operate in Asymmetric Multi-Processing systems, and other distributed systems. In an embodiment, the use of pre-image logging in the embodiments disclosed herein can allow for the trace data to be already in a suitable form for use in a time traveling debugger user interface, so a programmer may begin debugging using trace data as soon as it is downloaded from the target, without waiting for all of the trace data to be downloaded and decoded.

Further, an improved backend can be configured to allow the programmer to begin debugging before all of the trace data is downloaded. The time the user must wait is not a function of the size of the trace memory buffer, allowing for practical use of much larger trace buffers. In an embodiment, an improved backend can be advantageous by not relying on copying address spaces, or corralling all processes into one CPU in order to trace them. As such, the embodiments do not suffer from the performance penalties inherent in such bulk copies of data, and can help programmers find bugs that only occur during concurrent execution.

Disclosed systems, methods, and devices solve specific technical problems arising in the field of computing and improve operation of computer systems. Specific, concrete improvements in the field of debugging are disclosed. Disclosed systems, methods, and devices provide significant improvements in, at least, computer code debugging technology because, among other things, they increase the speed and accuracy of debugging through more efficient instrumentation, logging, and/or reconstruction as compared to traditional debugging techniques. Disclosed systems, methods, and devices can be used for debugging software executed on computing systems that have a single processing core or multiple processing cores. Debugging software executed on multiple cores can be particularly challenging due to, among other things, the complexity of tracking execution threads on multiple cores. Disclosed techniques seamlessly solve these and other problems associated with debugging computer code executed on multiple processing cores by, among other things, tracking operating system events and merging data from different computing cores in consistent order.

Unlike traditional systems that rely on manual operation and intervention by the programmer, but, nonetheless, are slow, error-prone, and inadequate for detecting and fixing many types of bugs, disclosed techniques can automatically detect and facilitate debugging of numerous software bugs, including race condition bugs, memory corruption bugs, and other difficult-to-reproduce bugs. Due to their efficiency, disclosed systems, methods, and devices may add less overhead to the execution of the computer program, and may, in other ways, be less intrusive and/or cumbersome to use than traditional systems. Disclosed systems, methods, and devices allow for fast, automated debugging of even the most complex computer code executed on single- or multi-core computing system and provide more efficient and accurate debugging than traditional techniques. This results not only in significant improvements in computer-related technology, including computer program debugging technology, but also in the improved operation of computing systems achieved through such systems running error-free computer programs debugged using specific techniques disclosed herein.

"Computer system" may include one or more processing devices (such as a central processing unit, CPU) for processing data and instructions that is coupled with one or more data storage devices for exchanging data and instructions with the processing unit, including, but not limited to, RAM, ROM, internal SRAM, on-chip RAM, on-chip flash, CD-ROM, hard disks, and the like. Examples of computer systems can include everything from an engine controller to a laptop or desktop computer, to a super-computer. The data storage devices can be dedicated, for example, coupled directly with the processing unit, or remote, for example, coupled with the processing unit over a computer network. It should be appreciated that remote data storage devices coupled to a processing unit over a computer network can be capable of sending program instructions to the processing unit for execution. In addition, the processing device can be coupled with one or more additional processing devices, either through the same physical structure (for example, a parallel processor), or over a computer network (for example, a distributed processor). The use of such remotely coupled data storage devices and processors will be familiar to those of skill in the computer science arts. The term "computer network" may include a set of communications channels interconnecting a set of computer systems that can communicate with each other. The communications channels can include transmission media such as, but not limited to, twisted pair wires, coaxial cable, optical fibers, satellite links, or digital microwave radio. The computer systems can be distributed over large, or "wide," areas (for example, over tens, hundreds, or thousands of miles, WAN), or local area networks (for example, over several feet to hundreds of feet, LAN). Furthermore, various local-area and wide-area networks can be combined to form aggregate networks of computer systems. One example of such a confederation of computer networks is the "Internet."

The term "target" may be synonymous with "computer system." The term target can be used to indicate that the computer system which generates the trace events may be different from the computer system which is used to analyze the trace events. Note that the same computer system can both generate and analyze trace events.

The term "thread" may be used to refer to any unit of execution of instructions. A thread can normally have a method of storing state (such as registers) that are primarily for its own use. It may or may not share additional state storage space with other threads (such as RAM in its address space). For instance, this may refer to a thread executing inside a process when run in an operating system. This can also include running instructions on a processor without an operating system. In that case the "thread" is the processor executing instructions, and there may be no context switching. Different operating systems and environments may use different terms to refer to the concept covered by the term thread. Other common terms of the same basic principle include, without limitation, hardware thread, light-weight process, user thread, green thread, kernel thread, task, process, and fiber.

Instrumentation

An improved backend for a time traveling debugger may comprise instrumentation for collecting data about the execution of a computer program. Instrumentation can include instructions added to a computer program that do not directly contribute to the operation of the program. Instrumentation can be inserted into a program automatically, for example, by the compiler, JIT (Just In Time) compiler, assembler, linker, or other tools used in the process of converting the program from source code to executable code, or by post-processing the fully-compiled executable. Instrumentation can be embedded in libraries, header files, or other bodies of instructions imported into the program either explicitly or implicitly by the programmer. Instrumentation can be written into a computer program manually by the programmer. A compiler can be configured to assist the programmer in manually instrumenting a program by making available special compiler keywords or intrinsics, which the programmer can insert into the program source code, causing the compiler to generate appropriate instrumentation instructions. Instrumentation can be embedded in the operating system or hypervisor under which a computer program runs. Instrumentation can be embedded in the hardware or simulator on which a computer program runs, or in auxiliary hardware monitoring the operation of a computer system.

Instrumentation can be used to log almost any kind of information. An improved backend can comprise instrumentation configured to log information about the execution path of the program, and information about changes to data stored in memory within the program, as well as other information that may prove useful, either directly or indirectly, to the programmer.

Instrumentation Optimization and Removal

Instrumentation inserted into a computer program can negatively impact the run-time performance and/or the memory footprint of that computer program. While the instrumentation can be very useful for debugging the program and for other purposes, there are circumstances under which it may be beneficial to build an executable of a computer program with some or all instrumentation removed.

In an embodiment, some instrumentation inserted in a computer program by an improved backend produces data that can be inferred from other logged data, or from other sources of information, and therefore does not need to be produced when the program runs. In such cases, an improved backend can eliminate or simplify such instrumentation, and insert the inferred data later, such as after the data is collected from the target system. Such inferred data is an example of "synthesized data", that is, data that could have been recorded by instrumentation at runtime, but is instead generated after the fact. The process of using synthesized data in place of generated data is an example of "instrumentation optimization", which can refer to a method of reducing one or more of the instrumentation, the runtime performance impact, and the log space to perform the functions of a backend. Several examples of instrumentation optimization and synthesized data appear throughout this disclosure.

In an embodiment, an improved backend can allow disabling generation of instrumentation and building an executable without instrumentation by configuring the compiler, assembler, and other development tools not to generate the instrumentation in the first place, and to remove or ignore any instrumentation manually inserted (for example, by the programmer).

In an embodiment, an improved backend can allow stripping instrumentation and building an executable without instrumentation by configuring the linker, or another component of the software development tools that is invoked after the instrumentation is inserted, to remove the instrumentation. Stripping instrumentation has several advantages over disabling instrumentation generation. Once an executable with instrumentation is produced, the executable does not have to be rebuilt from scratch; instead, the software development tools can be configured to strip the instrumentation from the already-built executable and/or object files. This can greatly reduce the time required to create a non-instrumented executable. Since the non-instrumented executable is simply the instrumented executable with the instrumentation removed, the risk that the instrumented and non-instrumented versions will behave differently is greatly reduced, whereas it is much harder to make such a guarantee when the executable must be rebuilt from scratch. Since the non-instrumented version of the program is likely to be the version deployed to users, and the instrumented version of the program is likely to receive the most scrutiny during development, keeping behavior consistent between the versions reduces the chance of bugs entering the software between development and deployment through the process of rebuilding without instrumentation. Stripping instrumentation also allows providers of pre-built libraries to distribute a single set of libraries containing instrumentation. The programmer using the pre-built libraries may strip the instrumentation or not, as needed.

In an embodiment, instrumentation inserted in software either manually or automatically can be comprised of instructions that access reserved registers, for example, a reserved register that points to the next location in the log to be written, or a register reserved for holding temporary values during the logging process. If this is the case, stripping instrumentation can be a fast and computationally simple process, involving only detecting and removing instructions referencing reserved registers. It is also easy to demonstrate the correctness of the process of removing instrumentation, in that only instructions inserted as instrumentation may use the reserved registers, and therefore only instructions inserted as instrumentation, and therefore not involved in the operation of the computer program, are removed.

In an embodiment, instrumentation stripping can occur prior to, or during the process of combining relocatable object files and libraries into a single executable image, a process which can be called "linking." The linking process can involve modifying branches, other instructions, and pointers in the relocatable object files and libraries to point to their appropriate targets in the final executable, a process that can be called "relocation." The relocation process can be sensitive to the addition or removal of instructions, or other actions that change the size or location of the machine instructions within object files and libraries. By performing instrumentation stripping during or prior to the linking process, relocation is not disrupted by the change in code size resulting from the removal of instrumentation instructions.

Removing instructions from a relocatable object file, as can be done in instrumentation stripping, can necessitate changes in local branch instructions, other instructions that refer to locations within the same relocatable object or library, and in tables listing the locations of instructions and pointers that may require alteration during the process of relocation (which can be called, "relocation tables"). The process of instrumentation stripping can therefore require making such changes, in addition to and in conjunction with the removal of the instrumentation instructions.

In an embodiment, some or all instrumentation inserted into a program can be configured to be disabled at run-time. In such cases, the instrumentation can be preceded by one or more additional instructions, sometimes referred to as guard instructions. In an embodiment, guard instructions can have no effect by default, but can be changed at runtime by the debugger, by the operating system, or by other means, into another instruction or instructions, for example, a branch instruction, that causes execution to skip over the remainder of the instrumentation, such that nothing is logged. In an embodiment, the process above may be reversed, reinstating the effect of the instrumentation, by reversing the modification to the guard instruction(s). In an alternate embodiment, guard instructions can work as described herein, except the default state of the guard instructions is to skip the instrumentation.

In an embodiment, the compiler and/or other tools used to generate the executable binary image can generate a table of locations within the compiled program containing guard instructions. Such a table can be used by the debugger, by the operating system, or by other components to guide the process of enabling and/or disabling instrumentation at run-time.

Disabling instrumentation at run-time by use of guard instructions as described herein can be advantageous in some embodiments, as it allows the user to turn logging on and/or off without recompiling, relinking, or even restarting the application program. The user may also be selective in which instrumentation is enabled/disabled, for example enabling instrumentation only within one function, or for example, enabling only one kind of instrumentation. As another example, the user can cause logging to become enabled only when certain other conditions are met, for example, when the debugger, the operating system, or the application itself detects an internal inconsistency. Disabled instrumentation typically executes more quickly, and consumes less log space than enabled instrumentation, so disabling instrumentation at run-time can give the user greater control over application performance and log usage, trading off the quantity and type of trace data generated.

Compiler-Driven Optimization of Instrumentation

An improved backend can comprise instrumentation from many sources, including inserted by hand by the programmer, embedded in a library or operating system, or inserted automatically during the process of converting a program from source code to executable. In each of the above cases, in an improved backend, the compiler can be configured to optimize the instrumentation, reducing the footprint of the instrumentation in executable code, reducing the footprint of the instrumentation in memory, and/or reducing the run-time performance impact of the instrumentation, and/or reducing the amount of log space required by the instrumentation.

In an embodiment, in an improved backend, a compiler can be configured to analyze the data logged at each logging point, for the purpose of distinguishing data that is always the same for that log point ("static data"), such as the location of the logging point in the program, and constant pointers and integers, from data that may change ("dynamic data"), such as timestamps and the contents of program variables. Given that analysis, the compiler can be configured to structure the instrumentation to log only the dynamic data and a unique identifier representing the logging point. In an embodiment, the unique identifier can be the location of the logging point in the program, or a number correlated with the location. The improved backend compiler can store the static data for some or all of the logging points, indexed by the unique identifiers, in a non-loading section of the executable image, or in a data file, or in another place where it can be accessed by consumers of the logged data (which may be a program or a person). Such an index can be referred to as a "static lookaside table." A consumer of the logged data can use a static lookaside table to determine the length of each log entry, and to infer or synthesize the missing static data. As a result, the static data has little or no impact on executable code footprint, memory footprint, run-time performance, or log space. In an embodiment, an improved backend may perform additional optimizations, such as omitting the high-order bits of timestamps from the log, and synthesizing them later.

In some embodiments, such optimization can result in very efficient logging, particularly when logged information includes static data. In cases where performance constraints make other kinds of logging impossible to use, it may still be possible to use optimized logging as described herein. In typical cases, users can apply such optimized logging liberally without having a significant impact on runtime performance, or other constraints.

Trace Data for Execution Path

An improved backend can use instrumentation to record the execution path of none, some, or all of the threads of execution in a system.

In an embodiment, the compiler in an improved backend is configured to insert instrumentation for each basic block prior to the first instruction of the basic block. In an embodiment, the instrumentation is configured to log a unique identifier (such as the value of the program counter) associated with the basic block to indicate that the particular basic block had executed. Logging each basic block instead of each instruction can be advantageous for reducing the amount of data that must be logged to encode the execution path of a thread of execution.

In an embodiment, the compiler in an improved backend is configured to insert instrumentation associated with one or more branch instructions. A branch instruction may be defined as an instruction whose execution may immediately precede the execution of code that does not immediately follow the branch instruction in program memory. A branch may be said to be "taken" in a particular instance of its execution if the next program instruction executed is not the instruction immediately following the branch instruction in program memory. In an embodiment, instrumentation associated with a particular branch instruction may generate log data regardless of whether or not the branch is taken. In an embodiment, instrumentation associated with a particular branch instruction may only generate log data when the branch is taken. In embodiment, instrumentation associated with a particular branch instruction may only generate log data when the branch is not taken. Logging each branch instead of each instruction can be advantageous for reducing the amount of data that must be logged to encode the execution path of a thread of execution.

In an embodiment, instrumentation associated with a branch instruction is configured to log an indication of the next instruction executed after the branch instruction. In an embodiment, instrumentation associated with a branch instruction is configured to log an identifier that uniquely identifies the next instruction executed, such as the memory address of the next instruction executed. In another embodiment, instrumentation associated with a branch instruction is configured to log a relative indicator of the next instruction executed, such as the difference between the memory address of the next instruction executed and the memory address of the instruction following the branch instruction in program memory. In another embodiment, instrumentation associated with a branch instruction is configured to log an indication of whether the branch was taken or not in that particular instance of the branch instruction's execution.

Figure 8A:
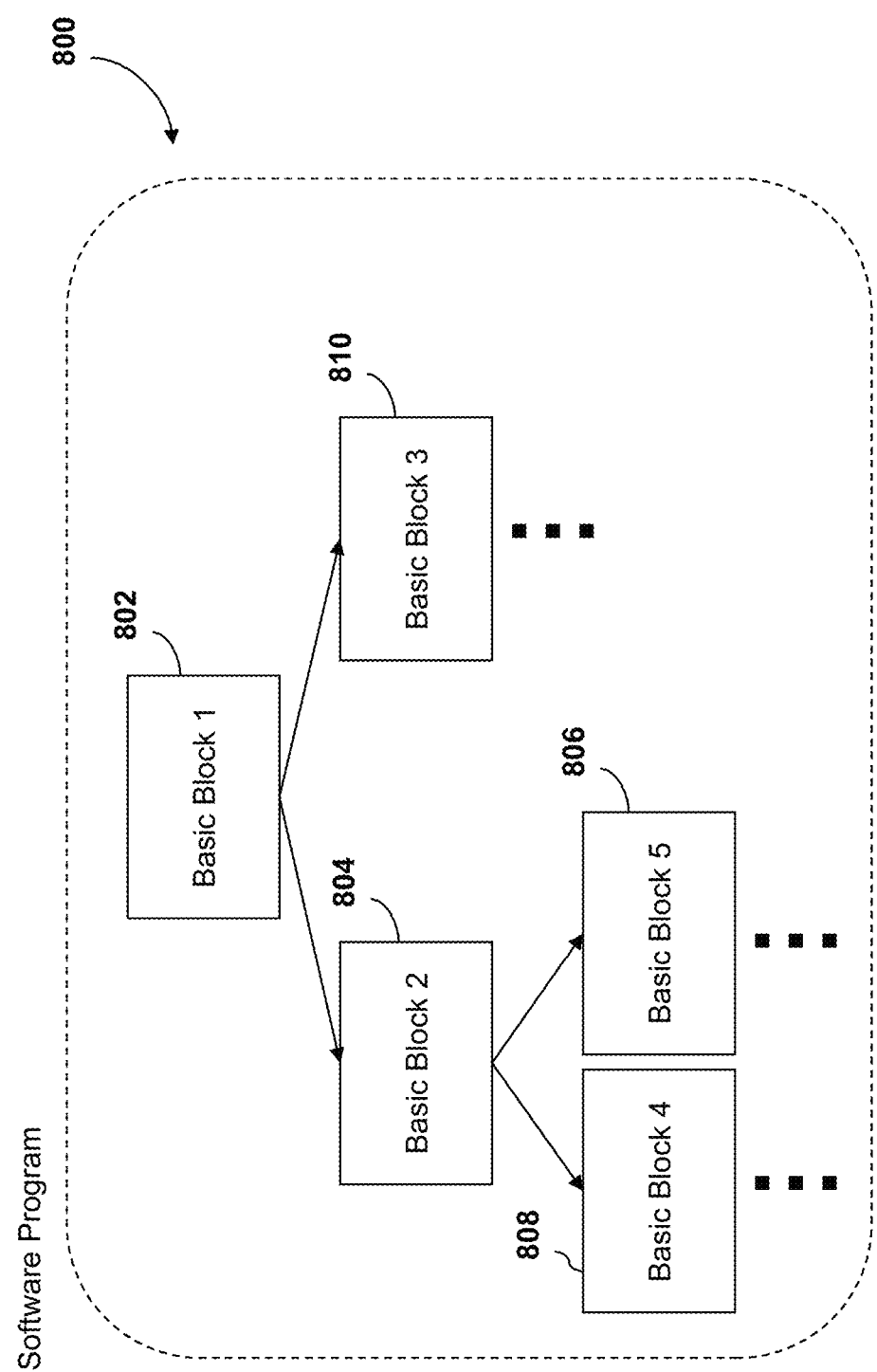
FIG. 8A is a block diagram depicting a high level overview of a software program comprising basic blocks.

FIG. 8A is a block diagram depicting a high level overview of a software program comprising basic blocks. In an embodiment, a software program can comprise a plurality of basic blocks. As is explained herein, a basic block is a set or sequence of instructions with one entry point and one exit point. A compiler can analyze the software program to identify one or more basic blocks. In an embodiment, software program 800 can comprise a number of basic blocks. In an embodiment, a software program can comprise an initial basic block 802, specifically basic block 1. In an embodiment, basic block 1 can branch off to basic block 2 at 804 and basic block 3 at 810. Basic block 2 can also comprise a number of other branches leading to other basic blocks 808 and 806.

Figure 8B:
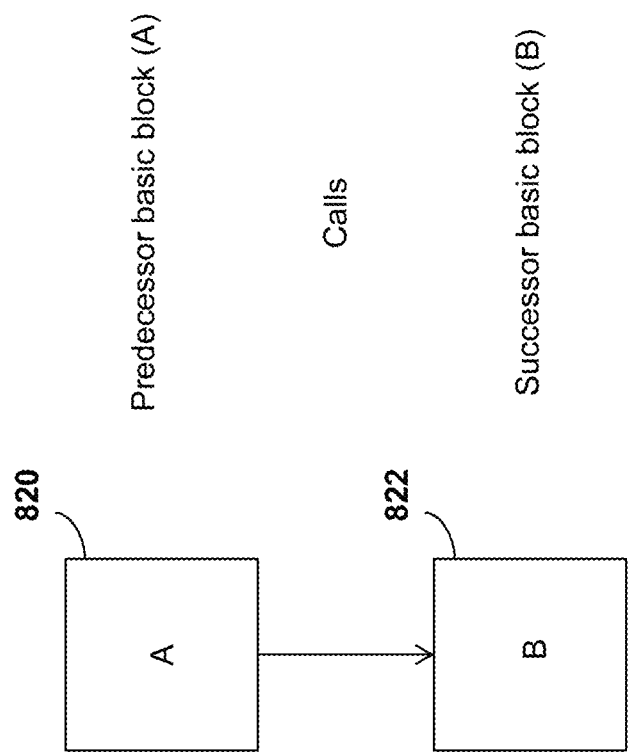
FIG. 8B is a block diagram depicting basic block instrumentation optimization.

In an embodiment, a software program can contain a subsequent or successor basic block which is always executed with the previous or predecessor basic block and is the only basic block called by the predecessor block. For example, as is illustrated in FIG. 8B, execution of a successor basic block B (822) can immediately follow the execution of a predecessor basic block A (820). Because basic block B is the only successor of basic block A, when basic block B executes, it is known that basic block A has also been executed. In an embodiment, only basic block B is instrumented because when the trace data log contains instrumentation data from basic block B, it is known that basic block A has been executed as well. The identification of basic blocks that are always executed with predecessor basic blocks is advantageous because the system can utilize this information in order to reduce the amount of instrumentation that is inserted into the software code.

Figure 8C:
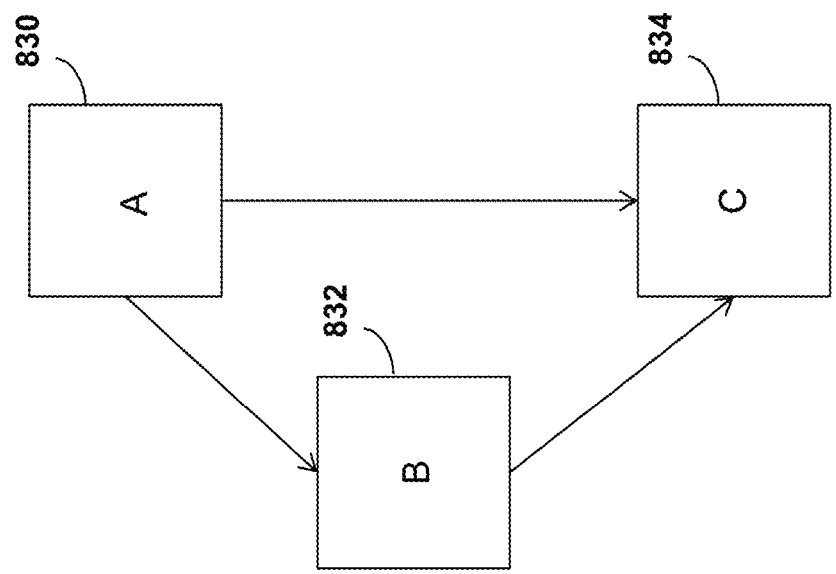
FIG. 8C is a block diagram depicting another basic block instrumentation optimization.

FIG. 8C illustrates another basic block instrumentation optimization according to an embodiment. As is illustrated, basic block A (830) can call basic block C (834) directly or can call basic block B (832), which in turns calls basic block C. If the trace data includes data associated only with basic block C, then during execution basic block A called basic block C directly and basic block B was not executed. If the trace data includes data associated with basic block B, then during execution basic block A called basic block B, which then called basic block C. In any case, basic block A is not separately instrumented. It is sufficient to instrument only basic blocks B and C.

Figure 8D:
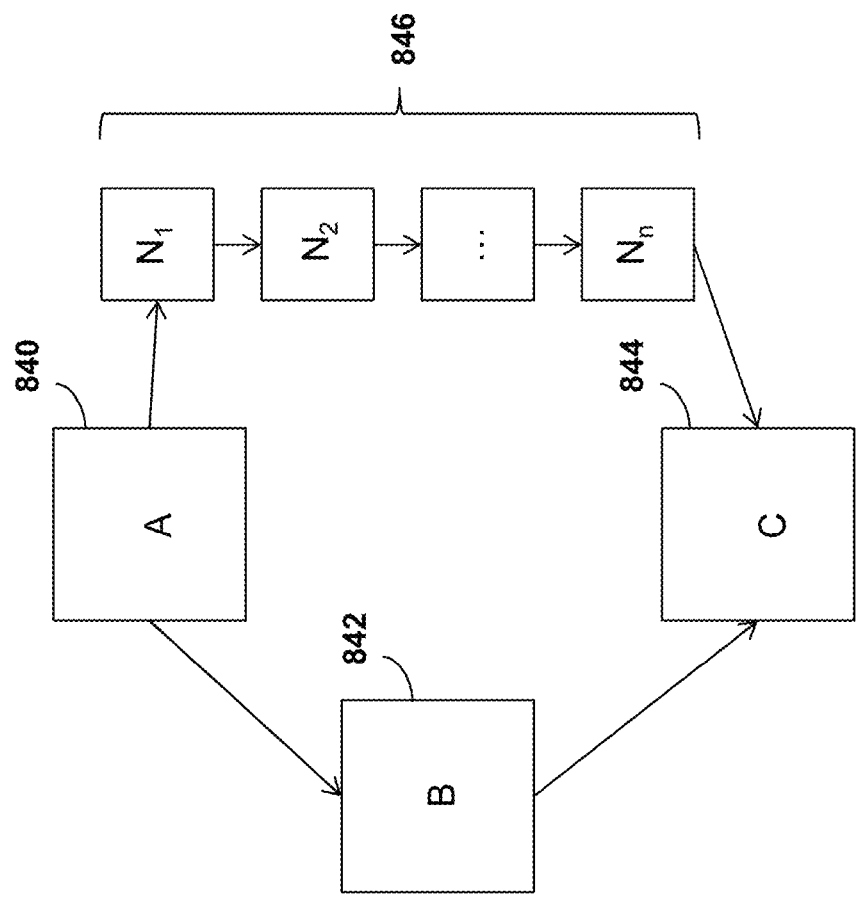
FIG. 8D is a block diagram depicting yet another basic block instrumentation optimization.

FIG. 8D illustrates yet another basic block instrumentation optimization according to an embodiment. As is illustrated, basic block C (844) is called from basic block A (840) either via basic block B (842) or basic blocks $N_1$ through $N_n$ (846). If the trace data includes data associated only with basic block C, then during execution basic block A called basic block C via basic blocks $N_1$ through $N_n$ and basic block B was not executed. If the trace data includes data associated with basic block B, then during execution basic block A called basic block B, which then called basic block C. In any case, basic blocks A and $N_1$ through $N_n$ are not separately instrumented. It is sufficient to instrument only basic blocks B and C.

In an embodiment, a basic block with multiple immediate successor blocks ends with an instruction that causes execution to continue with the first instruction of one of the successor blocks. Such an instruction can be called a conditional branch instruction. Some optimizing compilers can use heuristics and other techniques to determine which successor block is most likely to be executed after the execution of a conditional branch instruction. On some CPU architectures, such compilers can use such determinations to increase the efficiency of the generated executable by organizing the code to make best use of CPU caches, and/or by generating forms of the conditional branch instructions that let the CPU know that the branch is likely to be taken or not, and/or by using other techniques. In an embodiment, an improved backend can comprise a compiler with such branch prediction capabilities, and those capabilities can be used when generating optimized instrumentation to inform the decision of which basic blocks are most beneficial not to instrument.

In the example in FIG. 8D, block A (840) has two immediate successor blocks: block B (842) and block $N_1$ (the first block in 846) according to an embodiment. Applying instrumentation optimizations described herein, the compiler can omit instrumentation from blocks A (840) and B (842), or alternatively, from blocks A (840) and $N_1$ through $N_n$ (846). If it is assumed that both successor blocks of block A (840) are equally likely to execute, then the most efficient code is produced by omitting instrumentation from the path containing more blocks. However, in an embodiment, the compiler can predict the relative likelihood that each of those successor blocks will be executed after block A (840) executes. If, for example, the compiler predicts that block B (842) is ten times more likely than blocks $N_1$ through $N_n$ (846) to follow block A (840), and the number of blocks "n" executed in the series of blocks $N_1$ through $N_n$ (846) is less than ten, then the compiler can decide that it is more efficient, when optimizing instrumentation, to instrument blocks $N_1$ through $N_n$ (846) and block C (844), and to omit instrumentation from blocks A (840) and B (842). This is advantageous in that the total expected number of instrumentation instructions executed, and total log space consumed when executing the target program are reduced, decreasing the run-time performance impact and log space consumption of the instrumentation. The greater the likelihood of one codepath executing versus another, the greater the potential performance and log savings from this technique. Given that it is not uncommon for certain branches to be taken only one time in 1,000 or one time in 1,000,000 or more, the potential savings from this technique is substantial.

In an embodiment, the system generates and inserts instrumentation code that identifies entry into a basic block. For example, one or more instrumentation instructions can be inserted at the beginning of the basic block. In an embodiment, the location of the entry point of a basic block is represented by a memory address, which can correspond to a virtual memory location. In an embodiment, instrumentation can be optimized by not separately recording entry into some or all basic blocks whose successor blocks are always preceded by the basic block in question. Recording entry into the successor basic blocks can be sufficient to identify the execution of the predecessor basic blocks. Advantageously, this can reduce the size of trace data generated and recorded as a result of instrumentation as well as reduce the amount or the volume of instrumentation code that is needed to be inserted into the target program, thereby reducing the impact on the execution performance of the target program. By reducing the amount of instrumentation inserted into the software code, the system can more efficiently debug the target software. By reducing the number of instrumentation code elements inserted into the target software, there is less trace data that is produced. Reduction in the size of trace data that is produced and/or reduction in the amount of the instrumentation code can reduce the impact of instrumentation on the execution of the target computer program and can also improve the time necessary for replaying/reconstructing the events leading up to a halting condition.

An embodiment may omit some or all of the instrumentation for tracing the execution path. Such omission can improve the runtime performance of the traced program, reduce the code size of the traced program, and/or use less log data. In such cases, an embodiment may reconstruct the execution path using a technique such as that described in the section "Reconstructing Register State," which uses a "Reconstructive Simulation" technique as described herein to run, or simulate the running of, the execution path of some or all of the execution of the program. Among the state information, such as register state, reconstructed by such a technique, is the program counter (PC). Recording the PC after each instruction executed during the reconstruction effectively reconstructs the execution path of a portion of the program. An embodiment may also employ other techniques for reconstructing the execution path, such as using reconstructive simulation to perform a binary search for the desired halting condition. Depending on various conditions, such techniques may be advantageous by consuming less memory and/or finding the desired halting condition more quickly.

Trace Data for Memory Changes

Figure 18A:
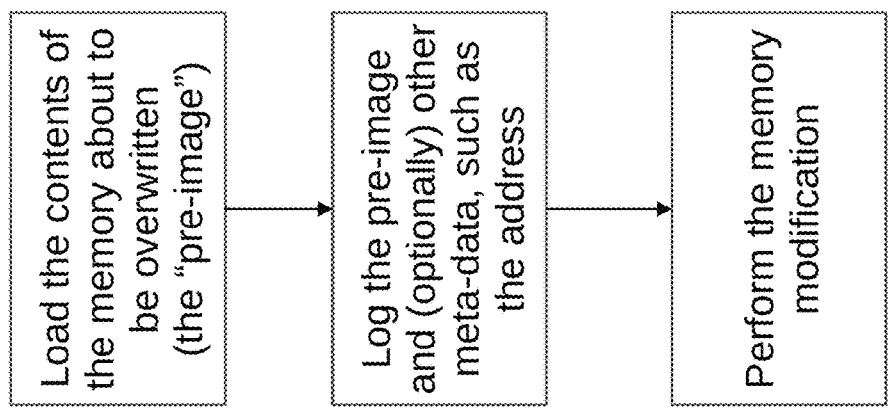
FIGS. 18A, 18B, 18C, and 18D illustrate pre-image logging according to some embodiments.

In an embodiment, an improved backend can log trace data in such a way as to allow the data to be decoded backwards in time, such as from newest to oldest. To this end, an improved backend can log the contents of memory that is about to be changed (the "pre-image"). One method of pre-image logging is in FIG. 18A. In this example, the pre-image is loaded, and then logged. Meta-data, such as the address of the data modified, length of the data modified, etc., may be logged at the same time. Finally, the memory modification is performed. Other methods of pre-image logging may be used, depending on the environment in which the logging is performed.

Pre-image logging can be performed by instrumentation within a computer program configured to log a pre-image before the computer program modifies memory with a store instruction. Such pre-image logging can take the form of loading the pre-image into a CPU register, writing the contents of the CPU register into the log, along with (optionally) additional meta-data, and then performing the memory modification with a store instruction. Other techniques may be possible, depending on the CPU architecture, for example, if the CPU architecture has a memory-exchange instruction that swaps a value in memory with a value in a CPU register.

Pre-image logging may be performed by instrumentation within a computer program, library, operating system, or elsewhere, in cases when the operating system or another agent external to a computer program modifies the program's memory. For example, a program could perform a system call that modifies the program's memory, such as the POSIX "read" call. Prior to the operating system carrying out the memory modification in the "read" call, the operating system can, on behalf of the program, log a pre-image of the memory about to be overwritten. As another example, a program could request direct memory access (DMA) from a hardware device into the program's memory space. Prior to requesting the DMA, the program can save a pre-image of the memory that could be overwritten by the DMA.

Figure 18B:
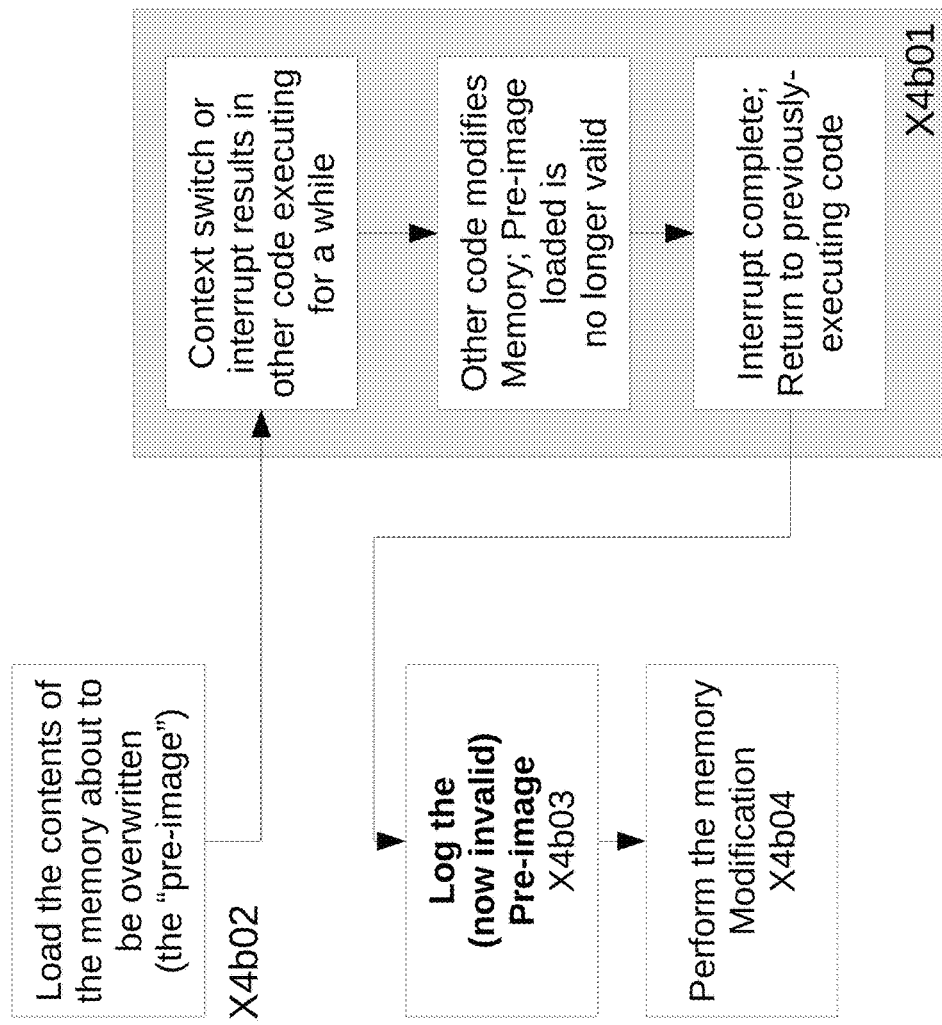

In some implementations, it may be possible for the pre-image logging procedure to be interrupted by an external event, such as a context switch or a POSIX signal. In such a case, the pre-image read from memory and/or logged may no longer be accurate when execution returns to the interrupted code and the memory modification is performed. In this case, if no special action is taken, the logged pre-image value could be incorrect, and a time traveling debugger attempting to use such incorrect data could behave incorrectly. An example of this problem is shown in FIG. 18B. Note that the interruption (the boxes labeled X4b01) result in the pre-image previously loaded (X4b02) no longer being accurate, resulting in incorrect data being logged (X4b03). Specifically, the pre-image data logged (X4b03) does not match the memory actually overwritten (X4b04). Note that, though not represented in the figure, the same problem occurs if the interruption occurs after the pre-image is logged (X4b03) and before the memory modification occurs (X4b04). Several examples of techniques for dealing with this problem are described herein.

Figure 18C:
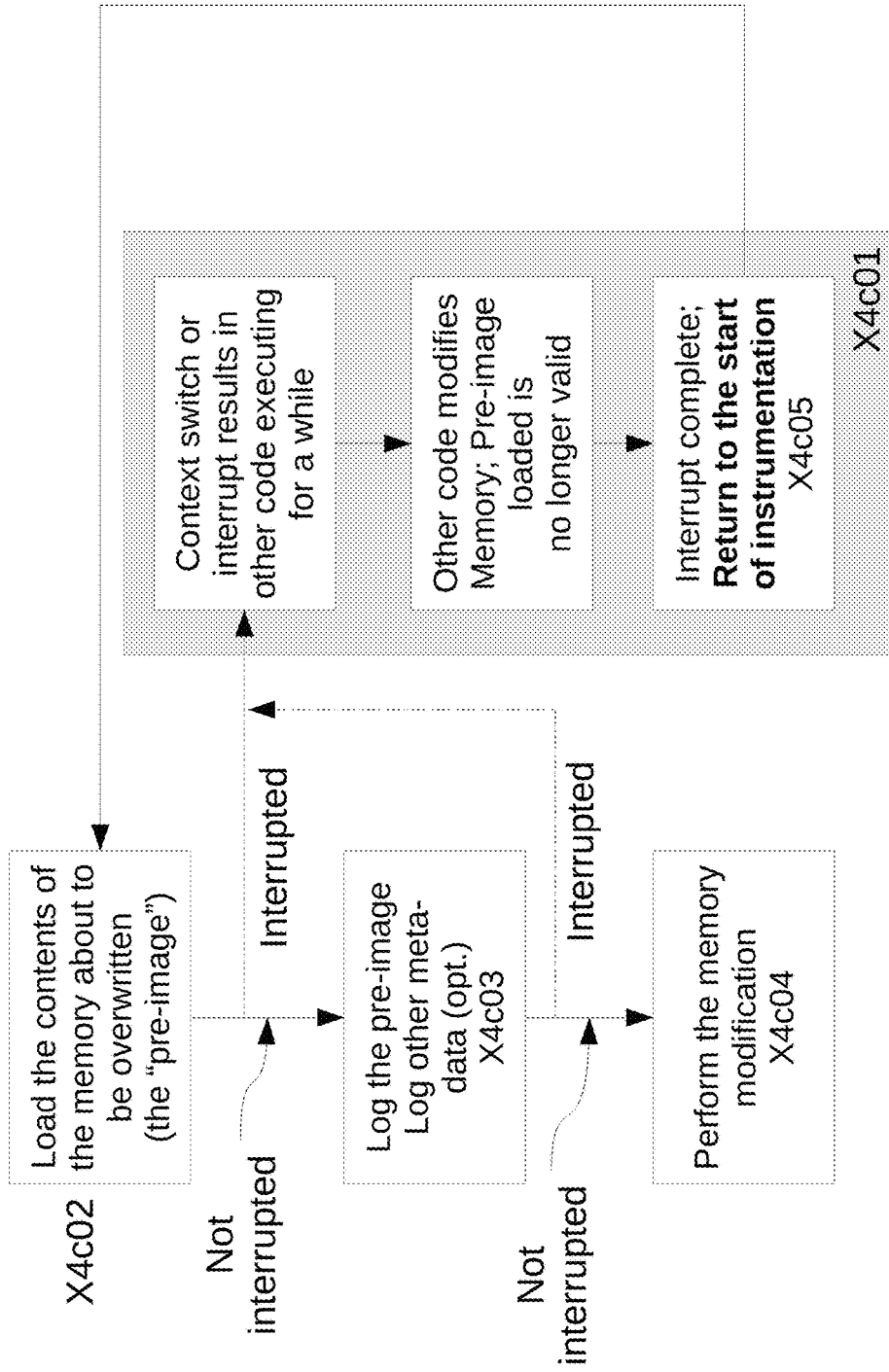

In an embodiment, an improved backend can use a "restartable window" to guarantee the atomicity of the pre-image logging and the memory modification. A restartable window can refer to a technique by which, if a section of code is interrupted, a mechanism within the program, library, operating system, or elsewhere, after the interruption is complete, causes the interrupted code to be restarted from an earlier point. This is shown in FIG. 18C. Note that interruptions (dashed arrows) can occur at any point between loading the pre-image (X4c02) and performing the memory modification (X4c04), resulting in other code executing (X4c01) and invalidating the loaded pre-image value (X4c02). When the other code completes, execution can return (X4c05) to the start of the instrumentation (X4c02). In such a case, if incorrect data was logged or partially logged prior to the interruption, the data can be removed from the log at run-time, or the consumer of the logged data can detect the condition and ignore the incorrect or partially-logged data.

In an embodiment involving a restartable window, removing the partially logged data at run-time is accomplished by structuring the instrumentation so the log pointer is not advanced until the instrumentation has executed completely. In such a case, when the interrupted code is restarted, it will overwrite the same section of log with the new data, or, if that section of the log has subsequently been used for another purpose, it will write the new data to a new section of log.

In an embodiment involving a restartable window, it can be determined how much partially-logged data must be removed by disassembling application code in the vicinity of the interruption, looking for a pattern of instrumentation or other instructions indicative of the progress of the instrumentation; or by examining meta-data produced by the compiler or other tools involved in the compilation and/or analysis of the program.

Figure 18D:
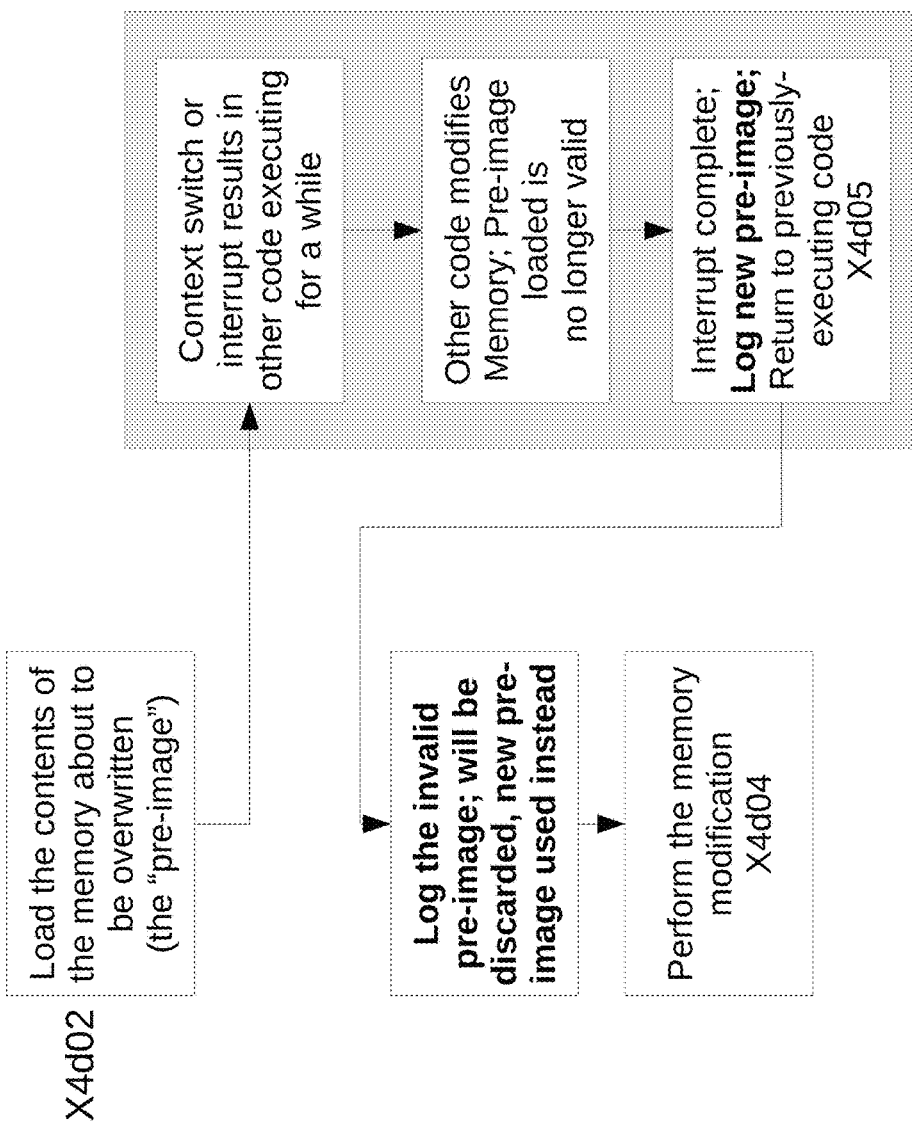

In some implementations, an improved backend can use the following technique to deal with interrupted pre-image logging. The operating system, a library, or other component, upon return from the interruption, can log a special record (hereafter, a "fixup record") containing the correct data. Upon detecting such a record, the consumer of the logged data can be configured to ignore any incorrect or partially-logged data associated with that memory store. An example of this is shown in FIG. 18D. When the interrupt is complete, a new pre-image can be logged (X4d05) before returning to the interrupted instrumentation and performing the memory modification. As in FIG. 18B, this technique works for interruptions occurring at any point between loading the pre-image (X4d02) and performing the memory modification (X4d04), though only an interruption immediately after loading the pre-image (X4d02) is depicted in this example.

In an embodiment, a fixup record is only logged when the system detects that the interruption occurred between the loading of a pre-image and the logging of a memory modification record. Such detection can be accomplished by disassembly of application code in the vicinity of the interruption, looking for a pattern of instrumentation or other instructions indicative of a memory modification; or by examining meta-data produced by the compiler or other tools involved in the compilation and/or analysis of the program.

In an embodiment, a fixup record can be logged regardless of the point at which the interruption occurred, and it can be determined at a later time whether the fixup record occurred between the loading of a pre-image and the logging of a memory modification record. If the consumer of the fixup record (which may be a person or a program) determines that the fixup record was logged at a different time, the fixup record can be ignored. The technique of logging a fixup record regardless of the point at which the interruption occurred can have better runtime performance than logging a fixup record conditionally, as it eliminates the need to apply disassembly or other techniques to determine if the fixup record is necessary. Which technique is more beneficial can depend on the CPU architecture, the structure of the instrumentation, characteristics of the operating system (if applicable), and other factors.

Deferred Trace Data Optimization

Pre-image logging instrumentation, as described herein, can, in some embodiments, log, for each memory store operation in a basic block, information such as the address of the affected memory, the pre-image, the width of the store, etc. However, the consumer of the logged information may be able to determine a subset of this information from other sources, in which case that subset of the information is redundant, and need not be logged. Optimizing the instrumentation, such that it does not log the unnecessary data, is advantageous in that it can improve run-time performance by eliminating unnecessary logging instructions, and it can result in more efficient use of log space. The deferred trace data optimization described herein is such an optimization.

The compiler in an improved backend can be configured to analyze the target program to identify blocks of memory accesses to the same memory address and optimize instrumentation by inserting, for such a block, one or more instrumentation instructions that record the memory address being accessed. The other instrumentation instructions need only record the relevant data, not the memory addresses. For example, suppose that a set of target program instructions performs N (where N is an integer, such as 1, 2, 3, 4, . . . ) accesses to a memory location having address A. For the last memory access to address A, the compiler can generate an instrumentation instruction configured to record in the trace data address A along with the relevant data. For the remaining N−1 accesses to address A, the compiler can be configured to generate instrumentation instructions that only record the relevant data, but not the address A. Such optimization can advantageously reduce the size of trace data. In an embodiment, this type of optimization is performed when multiple memory addresses (such as A and B, A, B, and C, and so on) are accessed by, for example, different offsets from the same base address which might be stored in a register. The base address is recorded only once and subsequent memory location addresses are recorded only by their offsets. In an embodiment, this type of optimization is referred to as deferred trace data optimization.

In an embodiment, the compiler can be configured to insert the instrumentation code identifying execution of the basic block at the end of a basic block instead of at the beginning of the basic block. This way, replay and/or reconstruction performed backwards in time can be optimized because the record representing the basic block will be encountered before records representing memory stores and/or other events that occurred within that basic block. To further speed up decoding of trace data during replay and/or reconstruction, the compiler can insert one or more additional instructions, such as loading a register with a particular value, in addition to the instruction that stores the value of the program counter associated with the end of the basic block. The one or more additional instructions can be instructions that have no side effects (similar to executing a No Operation or NOP instruction). When the system finds such one or more additional instructions during replay and/or reconstruction, this will indicate to the system that the program counter (or another type of unique identifier) saved in the trace data is for the end of the basic block. The system will then find the beginning program counter (PC) of the basic block, and insert it into the trace data so that it appears to the trace data decoder that the beginning PC was recorded in the original trace data. In an embodiment, such operations are referred to as deferred trace data optimization because the insertion of the PC value in its usual place is deferred until the trace data is being decoded.

In an embodiment, such a system can advantageously reduce the amount of recorded trace data. When PC instrumentation is inserted at the end of the basic block, pre-write memory values before that can often be reduced in size because such entries do not need extra annotation to distinguish themselves from the PC value recorded and stored and the system can assume that they are pre-image (or pre-write) memory values. In contrast, if PC instrumentation is recorded in the beginning of the basic block, then when trace data is decoded backwards, the pre-image memory values recorded for the basic block are encountered first. Accordingly, these values need extra annotations to distinguish from PC values.

Figure 9:
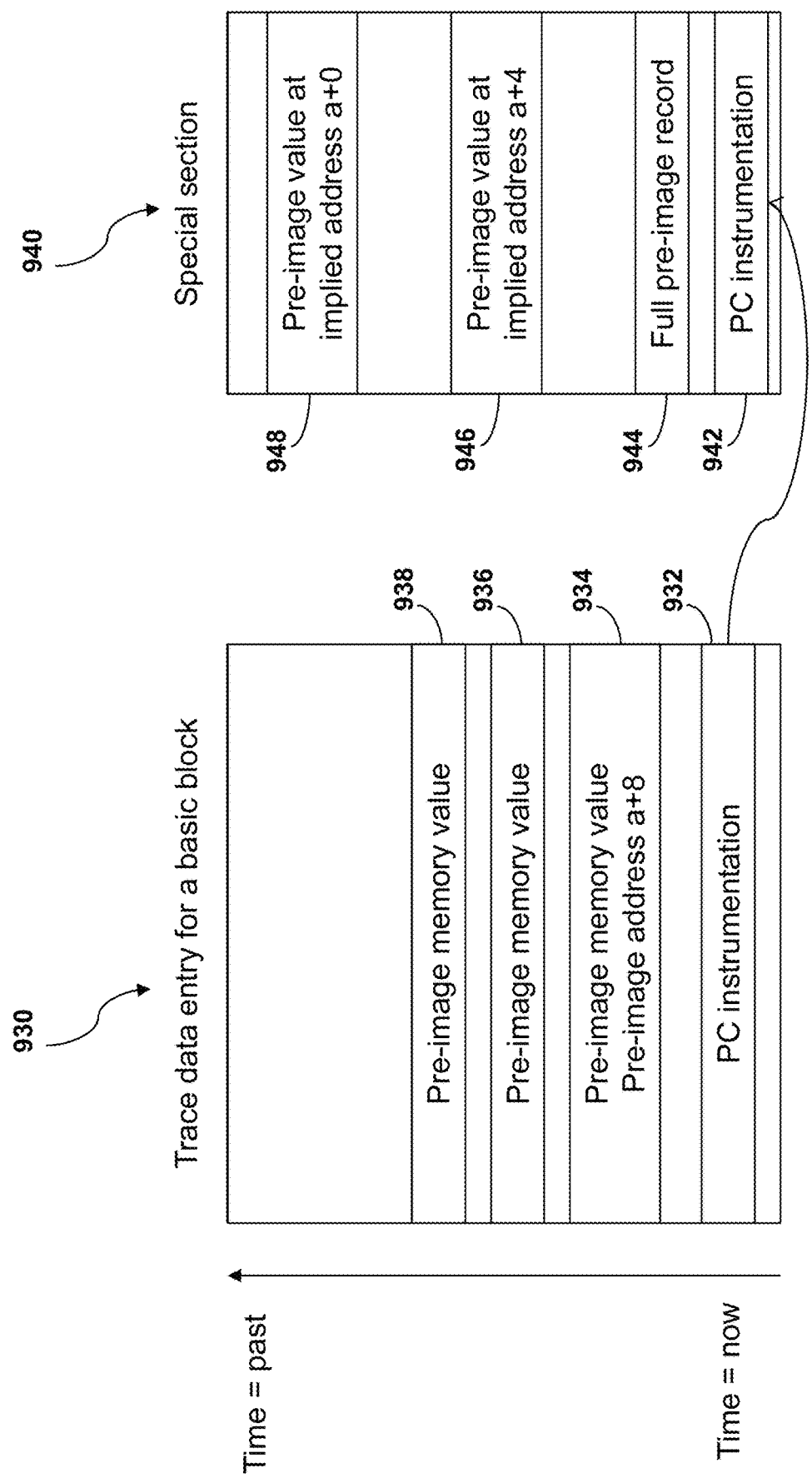
FIG. 9 is a flowchart depicting an embodiment of deferred trace data optimization.

In an embodiment, as is illustrated in FIG. 9, deferred trace data optimization is performed as follows. Trace data fragment 930 includes an entry 932 saving the PC at the end of a basic block. Entry 934 corresponds to writing to a memory address (prior to writing to the address a+8) and includes a pre-image value and the address (namely, "a+8"). Entries 936 and 938 correspond to writing to memory addresses, but include only pre-image values and not the addresses. During replay and/or reconstruction, the system will decode the trace data fragment 930 by utilizing the special section 940, which includes a template or a map for decoding the trace data fragment. Such a section can be an example of a static lookaside table, as described herein. Entry 942 in the special section is associated with entry 932 in the trace data, and indicates the value of the PC is stored in the trace data. Entry 944 in the special section is associated with entry 934 in the trace data, and indicates that "full pre-image" or pre-write value along with the address written to are stored in the trace data. Entry 946 in the special section is associated with entry 936 in the trace data, and indicates that only a pre-write value is stored in the trace data. The address that was written to (namely, "a+4") is not stored in the trace data, but is reconstructed from entry 946 in the special section. In an embodiment, the address is implied from the address "a+8" stored in entry 934 in the trace data (for example, a relative offset of "−4" is stored in entry 946 in the special section, which corresponds to address "a+8−4", or more simply, "a+4"). Entry 948 in the special section is associated with entry 938 in the trace data, and indicates that a pre-write value is stored in the trace data (but an implied address, such as a relative offset of "−8" is stored in entry 948 in the special section, which corresponds to address "a+8−8", or more simply, "a+0" or "a"). For example, entries 948, 946, and 944 in the special section indicate that the program was writing to an array or other such series of nearby memory addresses because consecutive memory locations ("a," "a+4," and "a+8") were being written to (with address "a" being the base address). During replay and/or reconstruction, the trace data is decoded (or decompressed) and missing information is inserted. For example, addresses a+0 and a+4 will be inserted into the trace data using the implied addresses stored in entries 946 and 948 in the special section. This way, it will appear that all the addresses were recorded in the original trace data.

In an embodiment, deferred trace data optimization is not limited to the case of writing to consecutive memory locations. In other embodiments, certain data may be omitted from the trace data log during execution of a task being debugged. For example, only the last pre-image memory value's address can be recorded, and all other addresses written to by the basic block that are constants or can be represented as offsets from the last address are recorded in the special section, such as section 940. The missing data can be inserted into the trace data log at a later time after execution of the task has been halted.

In an embodiment, section 940 is a static lookaside table, included into a section of an ELF (Executable and Linkable Format) file. Section 940 of the ELF file is not downloaded to the target computer system along with the instrumented executable code. Rather, section 940 of the ELF file is used during replay and/or reconstruction to decode and supplement skipped trace data. Advantageously, deferred trace data optimization reduces the size of the trace data log and also reduces the size of data that is transferred to the target computer system prior to execution of the computer program.

Side-Effect Memory

In some cases, attempting to load a pre-image value from certain memory locations (which can be referred to as "side-effect memory") may have undesirable effects. For example, certain memory mapped registers can affect the state of a hardware device when read. When a store to side-effect memory is performed, the compiler in an improved backend can be configured to generate alternate instrumentation that does not read the pre-image, thus avoiding any unwanted side-effects. Such instrumentation can log a subset of the usual information, for example, by logging the address of the store. By logging the usual information, except for the pre-image, improved backend and time traveling debugger operations that do not rely on the pre-image can still function normally when operating on side-effect memory. For example, such a store can still be used within a condition for halting a movement forward or backward in time.

In some cases, it may not be possible to determine at compile-time whether a given memory store affects side-effect memory or not. For example, a memory store through a pointer can affect either kind of memory, depending on where the pointer points, which can change each time the store instruction is executed. In such cases, a compiler in an improved backend can be configured to output instrumentation that determines at runtime whether the affected memory is side-effect or not. Such a determination can be made by comparing the store address against known-safe and/or known-unsafe memory ranges, or by performing other tests. In an embodiment, if an improved backend cannot determine whether a given memory store affects side-effect memory or not, it does not load a pre-image, as the degradation in debugging capability is generally preferable over incurring a risk of disrupting target hardware, crashing the CPU, or causing other such negative effects.

In an embodiment, a compiler in an improved backend can be configured to accept special keywords in the source code, or command-line options, or other forms of instruction from the programmer to affect the compiler's determination as to whether a store affects side-effect memory or not. Such a mechanism can allow the programmer to override the default behavior of the compiler in cases where the compiler's default behavior might be sub-optimal or incorrect.

Register State Snapshots

There are many ways CPU register state can be recorded by an improved backend. In an embodiment, a record can be written to the log every time a register's value is changed. Such a record can contain a pre-image value, such as the value that will be overwritten when the register is modified. However, since register state tends to change frequently during the execution of a computer program, this technique may involve inserting a very large number of instrumentation instructions into a program, which can negatively impact the program's run-time performance and/or memory footprint.

In an embodiment, an improved backend can periodically record "register state snapshots" of the state of one or more CPU registers. These register state snapshots can be recorded by the application, by library code, by the operating system, or by some other component. A technique for reconstructing the state of CPU registers at various points in time from such snapshots is described in the section "Reconstructing Register State." Register state snapshots are not limited to containing only registers. Register state snapshots may include other state or meta-information, such as representations of parts of program memory, timestamps, thread information, address space information, or any other data. Such data typically augments, identifies, or facilitates the use of the other contents of the snapshot, but can serve other purposes as well.

Logging register state snapshots as described herein, in some embodiments, can be configured to have a much smaller impact on run-time performance and memory footprint than logging every register change individually. In some implementations, an improved backend that logs register state snapshots as described herein can have a much smaller impact on the run-time performance of the system being traced than a copying backend. A copying backend copies some or all of an application's memory space and register state at each checkpoint, the impact of which can scale with the amount of memory in use by the application. In contrast, an improved backend only copies some or all of an application's register state, which is bounded by the number of CPU registers, making the run-time performance impact independent of the amount of memory in use by the application. Further, the amount of data contained in a CPU's registers is generally significantly smaller than the data contained in the memory in use by an application, so in general, the amount of data logged in each checkpoint by an improved backend is significantly smaller than by a copying backend, significantly reducing run-time performance impact and log usage.

An improved backend can record register state snapshots at times such as: when threads of execution start or stop running, when outside changes are made to register state (for example, when the operating system changes several registers as part of a system call), when various kinds of interrupts occur, and when a snapshot has not been logged recently. Depending on the circumstances, snapshots can include complete register state (which can be referred to as a "full snapshot"), or only a subset.

One consideration in configuring an improved backend's timing for recording snapshots is to affect the time required to reconstruct CPU state. In an embodiment, an improved backend can schedule snapshot logging to bound the time required to reconstruct CPU state using an algorithm such as that described in the section "Reconstructing Register State." Snapshot-based register reconstruction algorithms typically run in linear time, proportional to the amount of log that must be traversed to execute the algorithm. Bounding the amount of log that must be traversed to perform register reconstruction, and therefore bounding the amount of time register reconstruction takes, may allow for favorable performance characteristics of various operations of a time traveling debugger employing an improved backend.

In an embodiment, an improved backend can bound register reconstruction time using the following schedule for logging register state snapshots. When an outside agent (for example, the operating system) modifies the registers belonging to a particular thread of execution, logging a snapshot containing at least the registers that changed guarantees that the change is reflected in the log. Additionally logging a full snapshot when a thread of execution stops executing guarantees that at all points in the log when a thread of execution is not running, the most recent snapshot encountered contains accurate register state, and no reconstruction is required. To bound register reconstruction time at points in time when a thread of execution is running, the register state of the thread of execution must be logged periodically, such that the amount of trace data logged between register state snapshots is bounded. In an embodiment, this can be accomplished by logging a register state snapshot every time a certain bounded amount of log space is consumed.

Operating System Events

In an embodiment, an improved backend can log operating system events that may be of interest to the programmer. Examples include, but are not limited to: the creation and destruction of threads of execution and/or address spaces; communication between threads of execution and/or address spaces; hardware interrupts, including those that could have a performance impact on applications running on the system, and/or could indicate the arrival of data, or some other external event of interest; operating system events affecting scheduling of threads of execution, and/or modifying application register or memory state; mapping and/or unmapping of virtual memory; the use of synchronization primitives, such as mutexes, semaphores, and the like.

A time traveling debugger, and/or other user interface components, can display such events to the programmer to aid in the programmer's overall understanding of system behavior. Where such events impact an application, for example by altering its memory or register state, an improved backend can use such information to improve a programmer's ability to detect and understand bugs arising from such changes, for example, by allowing the user to specify such events within terminating conditions for movements in time. Such capabilities are useful, for example, in finding the source of memory corruption. A time traveling debugger not employing an improved backend may have limited ability, if any, to locate the cause of a memory change, such as only detecting changes initiated by the application itself. In contrast, a time traveling debugger employing an improved backend can detect memory changes caused by a much wider range of sources, including but not limited to: the application itself, the operating system acting on its own, the operating system acting on behalf of another application or thread of execution, an external event visible to the operating system, such as the arrival of DMA data, or the actions of threads and operating systems running on other CPUs.

Logging Non-Deterministic Instructions

The techniques described herein for logging memory and register changes originating inside and outside of an application are sufficient to capture most changes to the state of an application as it runs. However, there can be additional cases that are not captured that can be handled separately so that an improved backend accurately recreates the state of the system at various points in time.

Some CPU instructions (which may be referred to as "non-deterministic instructions") can produce results that cannot be predicted or inferred from earlier state. For example, a CPU instruction can load into a register the contents of a memory location that cannot be known or inferred from earlier state, such as a memory mapped register, or a section of memory that could be modified by DMA, or memory that is shared with another application whose actions are not being logged, or are otherwise unknown. In another example, a CPU instruction can read from a clock, or a random number generator, or otherwise produce a result that cannot be predicted or inferred from earlier state. In another example, the result of a CPU instruction can be affected by the behavior of non-deterministic sources, such as other parts of the system that operate asynchronously. In such cases, when the result of a CPU instruction is non-deterministic, instrumentation in an improved backend can log the effect of the instruction. An improved backend can use such information at a later time to aid in reconstructing memory and register state.

Logging to Memory

In an embodiment, a portion of or entirety of trace data can be stored in the memory (such as RAM) of the target computer system. In an embodiment, a portion of or entirety of trace data can be stored in the memory of another computer system, such as the computer system which executes the compiler. In an embodiment, storage of trace data can be split across the memories of the target computer system and another computer system.

In an embodiment, an improved backend can comprise instrumentation that logs information to memory, such as RAM, that is writeable by the CPU on which the instrumentation runs. Given that memory is a limited resource, and there is value in maximizing the amount of data that can be logged, an improved backend can employ a strategy for managing the available RAM to make best use of it. An example of such a strategy is a unified log, described herein.

A unified log can draw from one or more pools of available memory (which may be referred to as "unified log memory pools") to allocate memory to one or more logs. For example, a unified log can take two 500 megabyte pools of RAM and allocate them among a kernel log and six application logs. The number of logs can change over time, for example, to provide for changes in the number of instrumented applications running. A unified log divides the available memory from the one or more pools into pieces (which may be referred to as "chunks"), which are then apportioned for use in the one or more logs. Such chunks may all be the same size, or may be different sizes.

Each log can comprise a mechanism for identifying the location of the next entry to be written (which may be referred to as "log pointer"), and a mechanism for identifying the end of the current chunk assigned by the unified log (which may be referred to as "page limit mechanism"). An example of such a mechanism is a data structure containing the bounds of the current assigned chunk, and a pointer to the next unwritten entry in the log.

A unified log can begin by assigning a chunk to each log. In some embodiments, memory in the unified log's pools that is not part of this initial allocation can remain available for later use, as described herein. This initial assignment of chunks can typically involve initializing the log pointer and page limit mechanism for each log accordingly.

An example of initial chunk assignments appears in FIG. 26A. In this example, the unified log manages three logs, Log 1 (X13a-Log1), Log2 (X13a-Log2), and Log 3 (X13a-Log3). The unified log assigns each of these logs an initial chunk (X13a-c1, X13a-c2, and X13a-c3) from the memory pools assigned to the unified log (X13a-MP). Once a log has a current chunk, the current chunk can be filled, for example by instrumentation writing to them and updating the log pointer. When a log's page limit mechanism detects that the current chunk is filled, the unified log archives the filled chunk and assigns the log a new current chunk, updating the log's log pointer and page limit mechanism accordingly. Archiving a filled chunk typically involves keeping track of the filled chunk's location, the identity of the log whose data it contains, the order in which it was filled relative to other chunks filled by the same log, and the order in which it was filled relative to all the chunks managed by the unified log. Once a log's current chunk is archived, the unified log can assign the log a new current chunk. If memory is still available in the unified log's memory pools, the new current chunk can be allocated from the memory pools. If the unified log's memory pools are exhausted, the unified log can in some embodiments recycle previously-filled chunks, as described herein.

Figure 26B:
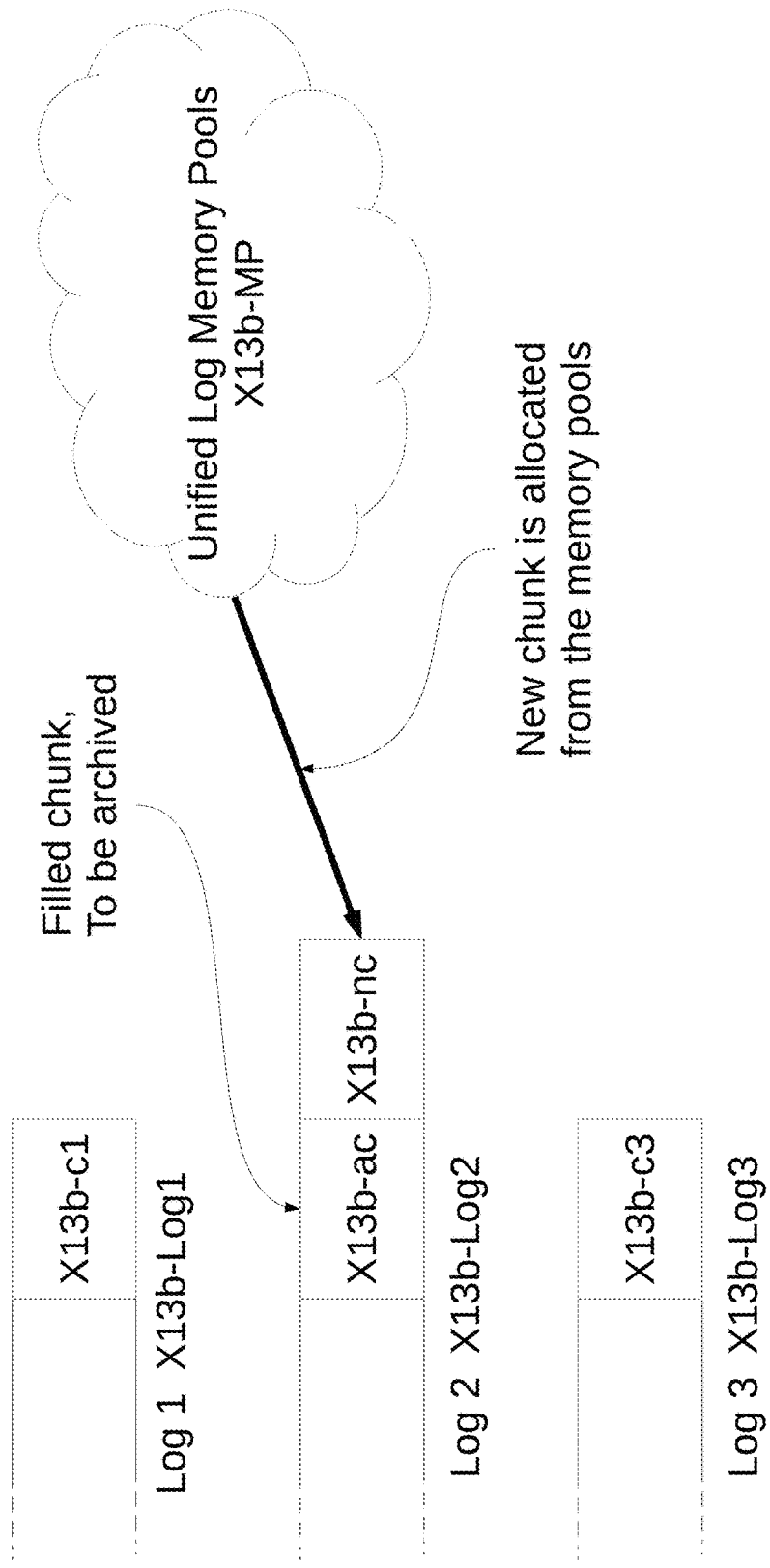
FIG. 26B illustrates chunk archiving according to an embodiment.

An example of archiving a filled chunk appears in FIG. 26B. In the example, Log 2 (X13b-Log2) has filled its current chunk, which is then archived (X13b-ac). In the example, memory is still available in the unified log's memory pool (X13b-MP), so a new chunk (X13b-nc) is appended to Log 2 (X13b-Log2). Logs 1 (X13b-Log1) and 3 (X13b-Log3) and their respective current chunks (X13b-c1, X13b-c3) are not affected.

When no memory remains in the pool, the unified log can recycle chunks that were already filled, allowing the data within those chunks to be overwritten. When employed by an improved backend, a unified log can employ a recycling strategy with the goal of maximizing the amount of log usable by the improved backend. In an embodiment, an improved backend requires contiguous data from all logs, starting with the most recent data. To best support such an improved backend embodiment, a unified log can recycle the chunk that was archived least recently. This recycling strategy maximizes the usable log available to the improved backend, while accounting for differences in memory usage rates between logs. In an embodiment, other recycling strategies can be used, such as recycling the chunk least recently appended to a log. Such other recycling strategies may have different properties with respect to the data ultimately available when the system halts.

Figure 26C:
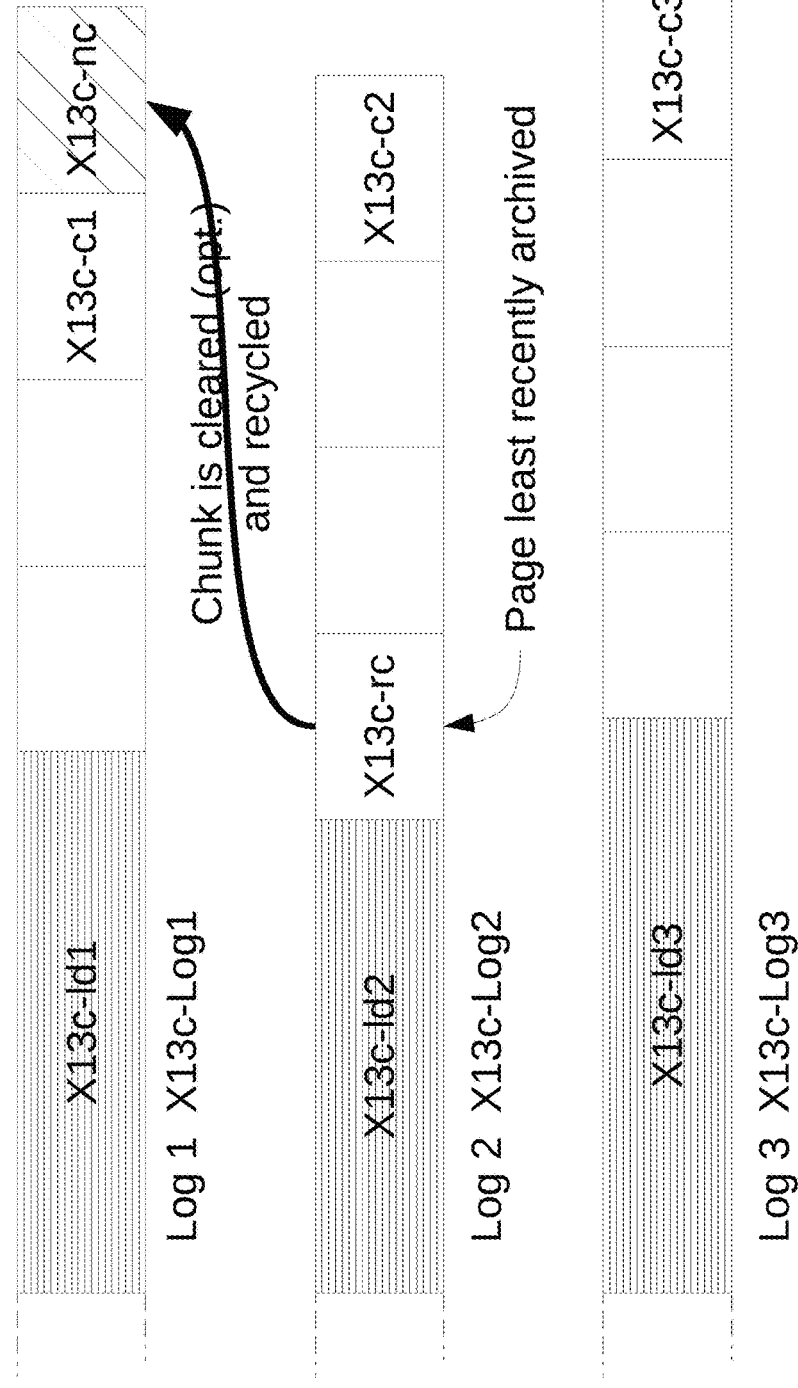
FIG. 26C illustrates chunk recycling according to an embodiment.

An example of chunk recycling is in FIG. 26C. In the example, the unified log is servicing three separate logs (X13c-Log1, X13c-Log2, and X13c-Log3). Each log has a respective current chunk: X13c-Log1 has X13c-c1, X13c-Log2 has X13c-c2, and X13c-Log3 has X13c-c3. Each log also has a body of lost data (X13c-ld1, X13c-ld2, X13c-ld3), formerly stored in chunks that were later recycled. In the example, Log 1 (X13c-Log1) has just filled its current chunk (X13c-c1) and requires a new chunk (X13c-nc). The unified log's memory pools (X13c-MP) are exhausted, so the unified log must recycle a previously-used chunk. To give Log 1 (X13-Log1) a new current chunk (X13c-nc), the unified log finds the page least recently archived to be the recycled chunk (X13c-rc), which could be part of any log, including the log receiving the new chunk. In this example, the recycled chunk (X13c-rc) is part of Log 2 (X13c-Log2). The unified log (optionally) clears the recycled chunk (X13c-rc), and makes it the new current chunk (X13c-nc) for Log 1 (X13c-Log1). The data previously stored in the recycled chunk (X13c-rc) is lost, becoming part of Log 2's lost data (X13c-ld2). As soon as the recycling is complete, Log 1 (X13c-Log1) can begin filling its new current chunk (X13c-nc). The recycling strategy ensures that the remaining data maximizes the amount of log usable by an improved backend.

Note that, in embodiments employing the recycling strategy described herein, if one thread of execution is halted for debugging purposes, or because it encountered an error, or for some other reason, it may be detrimental to allow threads of execution sharing the same unified log to continue executing, as this may result in the recycling of chunks containing data written by the halted thread, overwriting data that may be useful for debugging the halted thread. In such embodiments, it can be advantageous to employ a run-control strategy in which the halting of one thread of execution results in some or all of the other threads of execution in the system halting as well. An improved backend can comprise such a run-control strategy ("synchronous run control").

On CPUs with the necessary capabilities, a unified log can be implemented using the virtual memory capabilities of the CPU. In such an embodiment, the current chunk of each log can be mapped into a fixed window within a virtual address space. Such a window can be called a "logging aperture." In such an embodiment, the page limit mechanism can be implemented by leaving unmapped the virtual memory address or addresses adjacent to the logging aperture in the direction the log is written, such that attempting to write beyond the edge of the logging aperture results in a page fault. In such cases, the unified log can be configured to archive a chunk for the appropriate log when the page fault handler is triggered. Advantageously, in such an embodiment, from the perspective of the target computer program, the log appears to have unlimited capacity for storing trace data because all the details of allocating space for storing trace data are handled by the operating system. This can reduce the impact of instrumentation on the execution of the target computer program and can also reduce the time associated with replay and/or reconstruction of the target computer program. In such an embodiment, instrumentation may not need to contain instructions that check for writing beyond the boundaries of the current log chunk. Removing these boundary checks can reduce the runtime costs of the instrumentation and can also reduce the footprint of the instrumentation, improving one or both of code size and speed.

In some embodiments, use of a logging aperture, as described herein, is advantageous in other ways as well. The total log size can be larger than the virtual memory size. For example, a computer system in which virtual addresses are 32 bits wide can address up to 4 gigabytes of RAM using virtual addresses. Without a logging aperture, such a computer system using RAM-based logging could be limited to logs of less than 4 gigabytes. In some implementations, with a logging aperture, as described herein, the amount of RAM addressable using virtual addresses need not be limited by the virtual address width at all. Further, in certain embodiments, a logging aperture, as described herein, minimizes the amount of virtual memory required for logging, thus maximizing the amount of virtual memory remaining for use by the application for its own program instructions, data, etc.

In an embodiment, a unified log creates one logging aperture per execution unit (for example, per core in a multicore CPU) in each virtual address space. In such an embodiment, when a thread of execution is assigned to run on a core, its log pointer is set by the operating system, or by another body of software associated with the unified log, to point to the logging aperture associated with that core. This allows multiple threads of execution within the same virtual address space to log data simultaneously, each to its own logging aperture, even as threads of execution start and stop executing, and/or migrate from one execution unit to another. In such an embodiment, the total number of logging apertures required per virtual address space is bounded by the number of cores on the CPU.

A faulty software program, by dereferencing an incorrectly set pointer, or by other means, can erroneously write data to the log, for example, by writing within the logging aperture. In an embodiment, the consumer of the logged data, by reading the logged data from newest to oldest, can detect such "bad stores" using the techniques described herein, allowing partial or complete recovery. A bad store will either write to log memory before or after the current log pointer. Bad stores writing to memory after the log pointer have little consequence, as the memory they overwrite does not yet contain valid log data, so no valid log data is overwritten. Further, the garbage data written by a bad store writing to memory after the log pointer will eventually be overwritten by "good" data, produced by instrumentation. In the other case, bad stores writing to memory before the log pointer can overwrite and destroy good log data, often making it difficult or impossible to use data logged at the point of corruption, or earlier in the log. Regardless of the log location corrupted by a bad store, evidence of the bad store itself can be recorded in the log by ordinary instrumentation, such as pre-image instrumentation, as described herein in accordance with some embodiments. The consumer of the logged data, by reading the logged data from newest to oldest, will encounter instrumentation-generated log data corresponding to the bad store before encountering any data corrupted by that bad store. Therefore, in all cases, the consumer of the data can detect the bad store, for example, by recognizing that the store modified a memory address associated with a logging aperture, and take appropriate remedial action. In cases where the address of the bad store relative to the log pointer indicates that the log contains corrupted data, the consumer of the data can stop processing data before reaching the corrupted data, thus preventing misbehavior of the debugging system caused by attempting to process corrupt log data. In all cases in which a bad store is detected, the consumer of the data can inform the programmer, for example, by displaying a warning message, and highlighting the location in the program at which the bad store occurred.

Figure 26D:
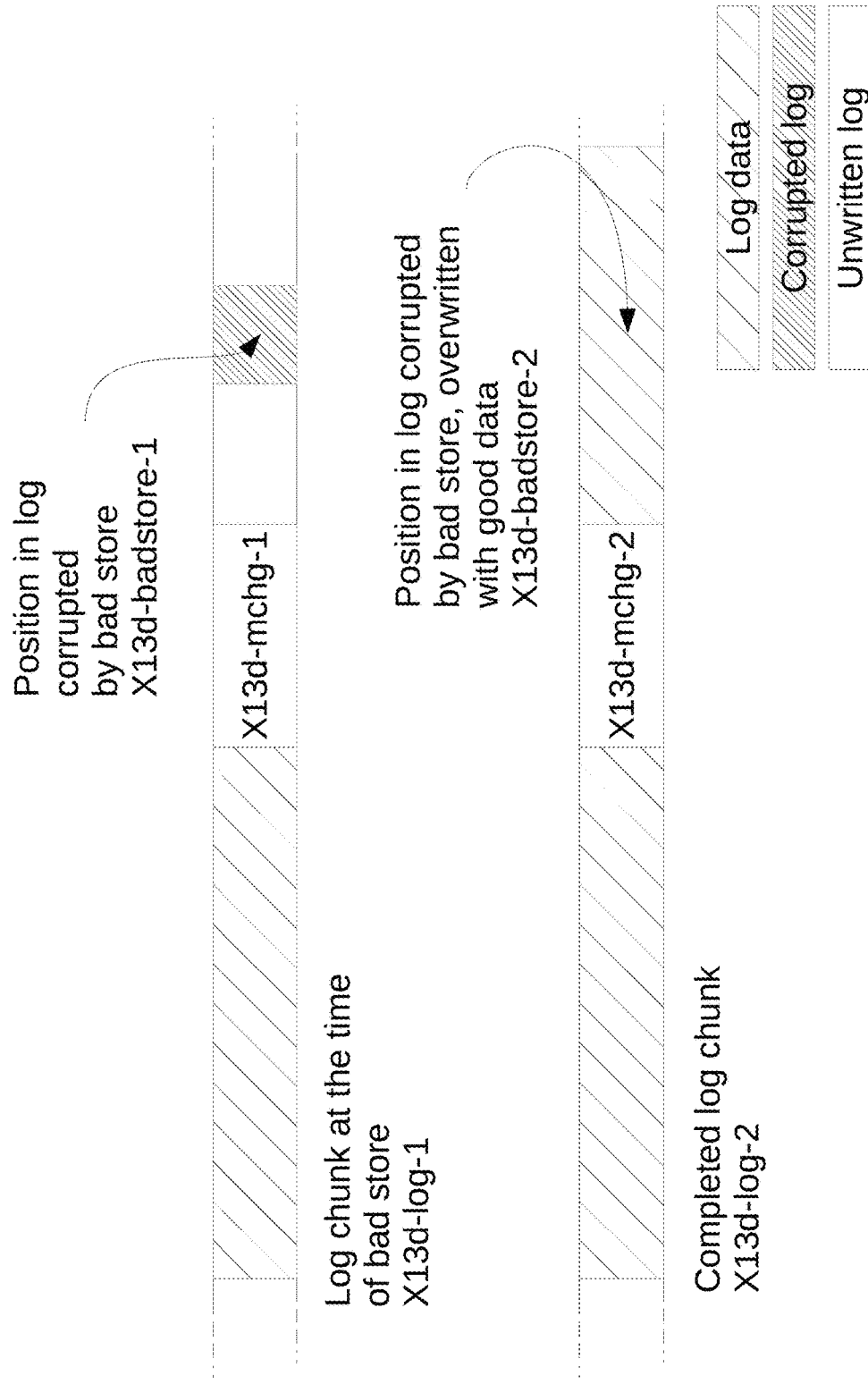
FIG. 26D illustrates bad store recovery according to an embodiment.

An example of bad store recovery appears in FIG. 26D. In this example, the corruption occurs at a point (X13d-badstore-1) in the log (X13d-log-1) that does not yet contain data. The memory store that corrupted the log is itself logged with a memory change record (X13d-mchg-1). In the completed log chunk (X13d-log-2), the location corrupted by the bad store (X13d-badstore-2) has been overwritten with good data. The entire log chunk contains usable information, and when the consumer of the log data encounters the memory change record (X13d-mchg-2) indicating a bad store, it can inform the programmer of the error.

Figure 26E:
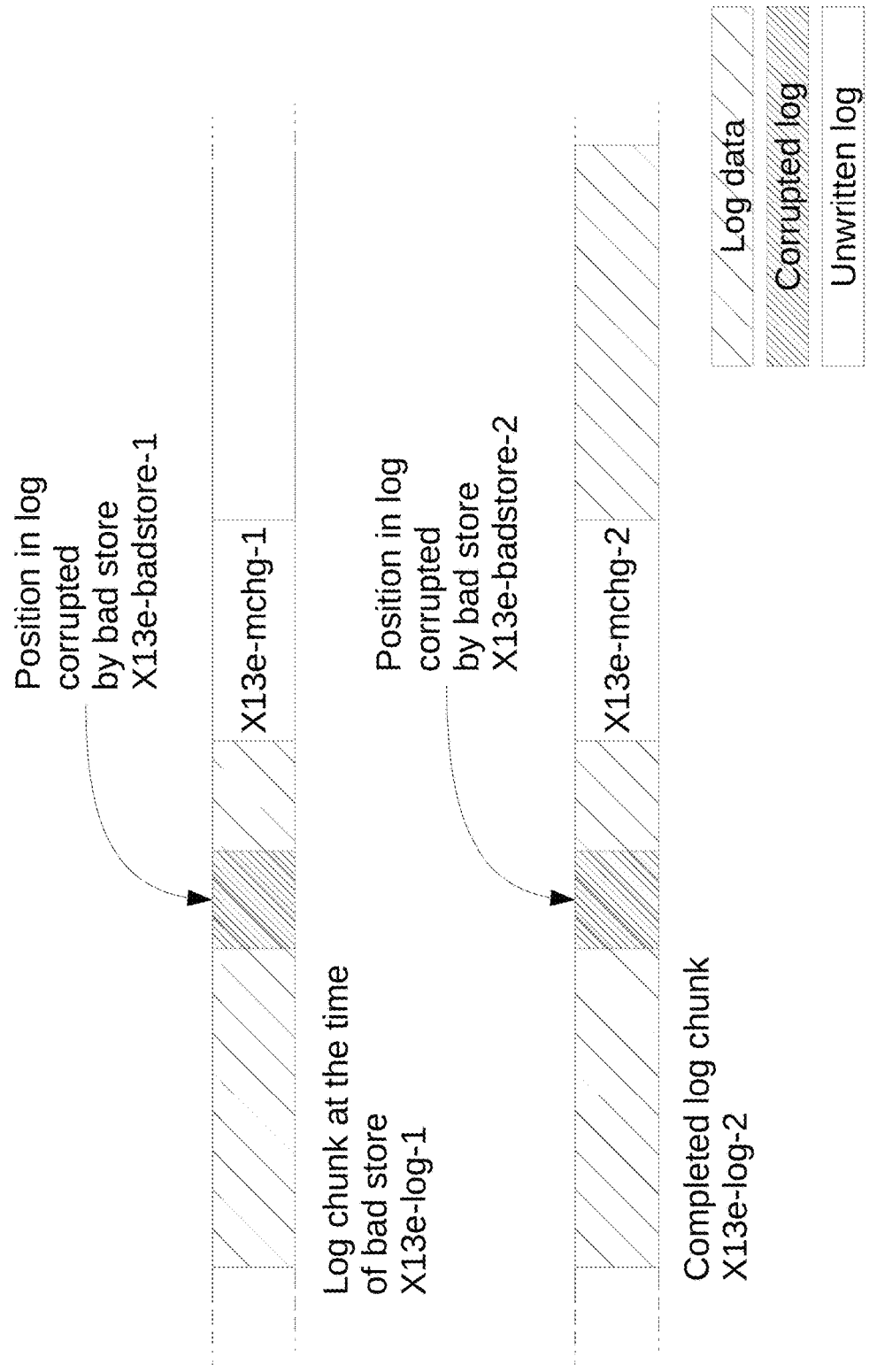
FIG. 26E illustrates bad store recovery according to another embodiment.

A second example of bad store recovery appears in FIG. 26E. In this example, the corruption occurs at a point (X13e-badstore-1) in the log (X13e-log-1) that contained valuable log data. That log data is now overwritten, and cannot be recovered. The memory store that corrupted the log is itself logged with a memory change record (X13e-mchg-1). In the completed log chunk (X13e-log-2), the data is consumed from newest to oldest, meaning the consumer encounters the indication of the bad store (X13e-mchg-2) before it encounters the corruption itself (X13e-badstore-2). The consumer of the data can therefore determine that the log at the corruption point (X13e-badstore-2) is unusable, and can halt processing of the log data prior to reaching the corrupt data. The consumer can also inform the programmer of the error.

It may be advantageous for security purposes or other reasons to guarantee that log data written by one log is not made available for reading by other parts of the system. To that end, in an embodiment, a unified log can clear each chunk before it is recycled. In an embodiment in which the capabilities of the CPU are sufficient, the access permissions on chunks mapped into virtual address spaces can be set "write-only".

In an embodiment, a CPU register (which may be referred to as "log pointer register") can be designated as the log pointer. In such an embodiment, instrumentation instructions used to write to the log can include pre-increment, post-increment, pre-decrement, and/or post-decrement store instructions, if supported by the CPU. Such instructions can improve performance and reduce instrumentation footprint by writing to the log and updating the log pointer in a single instruction.

In an embodiment, an application binary interface (ABI), or another such coding convention, may be defined such that the log pointer register is reserved for logging use. In such embodiments, compilers, assemblers, and other code generation tools would not be allowed to use the log pointer register for non-logging purposes, thus guaranteeing the log pointer register is immediately available for logging purposes. Reserving the log pointer register in this way can improve performance and reduce instrumentation footprint by reducing the number of instructions necessary to write to the log.

In an embodiment, a component that adds instrumentation after compilation, such as a JIT (Just In Time) compiler or a pre-processing pass that adds instrumentation, can rewrite the code to avoid using the log pointer register for non-logging purposes, and/or to make the log pointer register available when it is needed for logging purposes, and/or to use one or more other registers in place of the log pointer register. Reserving the log pointer register in this way can improve performance and reduce instrumentation footprint by reducing the number of instructions necessary to write to the log.

An embodiment may use a memory location as the log pointer register instead of using a CPU register. Using a memory location as the log pointer register may be advantageous on CPUs that support using memory locations or offsets from memory locations as targets for store instructions. In such cases, an embodiment may gain some or all of the advantages of a reserved log pointer register (as described above) without the overhead of reserving a CPU register. Such overhead can include increased code size and/or reduced code performance resulting from the unavailability of a CPU register. In various embodiments, such a memory location used as a log pointer register could be shared across an entire system, or there could be distinct log pointer register memory locations for each address space, or for each thread of execution, or for each log, or log pointer register memory locations could be allocated in another way.

In some implementations, a unified log, as described herein, can have many advantages. For example, configuring a unified log may only require assigning it one or more pools of memory, making it very simple to set up and use. A unified log can maintain a separate current chunk for each thread of execution writing to a log, and as such, contention between threads for shared resources is kept low, making such a unified log efficient and scalable to large numbers of logs and large quantities of log pool memory. A unified log can apportion and re-apportion chunks dynamically to each log, minimizing the amount of memory that is never written, or that is written with data that is never used.

Cache Management

In some embodiments, an improved backend can contain one or more mechanisms by which instrumentation inserted in a computer program can insert data into a log in RAM, such as the logging mechanism described herein. Depending on the CPU architecture and cache structure of the system, writing log data to such a log can cause program data to be removed from the cache, resulting in slower run-time performance of the application program. Various techniques for managing cache usage may allow an improved backend to mitigate or eliminate this performance impact.

Some CPU architectures and cache structures allow the disabling of caching for certain stores, through configuration of the CPU Memory Management Unit (MMU), and/or by use of special instructions in the computer program, or by other methods. In an embodiment, an improved backend disables caching of stores to log memory, reducing or eliminating the impact of log stores on the caches.

In an embodiment, a compiler is configured to generate instructions that manipulate the cache or caches of a processor of a target system. The instructions can prepare the cache or caches for future writes of trace data to a trace buffer so that these writes are performed efficiently and with minimal impact to the execution of the target program. For example, the instructions can allocate and/or reserve space in cache for anticipated future writes to the trace log. In an embodiment, by anticipating future writes to the trace log and allocating/reserving space in cache or memory accordingly, the systems disclosed herein can be configured to limit the impact of write operations to the trace log to a subset of the cache (such as a subset of cache lines) in order to ensure that data stored in the cache by the target program is not evicted by the trace log writes. The instructions can additionally or alternatively reduce cache impact as a result of instrumentation so as to not interfere and/or slow down the execution of the target program.

In an embodiment, on CPU architectures with the necessary capabilities, instrumentation inserted by an improved backend can include, at intervals, instructions for manipulating the cache. Given that use of log memory by instrumentation tends to be very predictable, for example, storing to each log address from lowest to highest in sequence, such cache manipulation instructions can be inserted in such a way to maximize the availability of cache for program memory.

For example, on a CPU architecture on which a program can instruct the CPU to flush a particular range of memory from the cache, instrumentation inserted by an improved backend can include, at intervals, instructions that flush recently-written log memory from the cache, with the goal of keeping the number of cache lines containing log memory as close as possible to 1. If the cache has more than one possible location for a given memory location, the cache can be referred to as a "multi-way" cache. Periodic flushing of cache lines used by log memory can dramatically improve run-time performance by ensuring that no more than 1 way in a multi-way cache is used for log memory, leaving the remaining ways available for caching program memory.

In another example, a CPU architecture allows a program to instruct the CPU to pre-allocate a cache line for a particular range of memory without first fetching the contents of the memory into the cache. By using such an instruction, the program informs the CPU that the current contents of that memory will soon be overwritten, and thus the CPU can avoid unnecessary work and reduce memory bus contention by skipping the usual step of copying the current contents of the memory into the cache. On CPU architectures with such a capability, instrumentation inserted by an improved backend can include, at intervals, instructions that pre-allocate a cache line for the next section of log memory to be written, without first fetching the contents of the memory, as the memory will soon be overwritten. Periodic pre-allocation of cache lines for use by log memory can dramatically improve run-time performance by minimizing the need for the CPU to copy log memory into the cache.

In some embodiments, cache flushing instructions and cache pre-allocation instructions collectively, among others, can be called cache manipulation instructions. If the cache manipulation instructions described herein are executed too infrequently, potential benefits of the cache manipulation can be lost, leaving fewer cache lines available for program data, and reducing run-time performance. If the cache manipulation instructions described herein are executed too frequently, CPU time is wasted executing cache manipulation instructions unnecessarily. When instrumentation inserted by an improved backend into a program includes cache manipulation instructions, the compiler in the improved backend can use code flow analysis to determine appropriate placement of such cache manipulation instructions. For example, such a compiler can insert such cache manipulation instructions with the goal of the program performing the cache manipulation(s) once for each cache line's worth of log data written to the log, thereby maximizing performance gain.

In an embodiment, a compiler can perform code flow analysis to determine appropriate placement of cache manipulation instructions as follows. A compiler can be configured to determine the cache line size of the target CPU. A compiler can further be configured to keep track of the number of bytes written to the log by instrumentation in each basic block. Within a basic block, each time instrumentation is inserted for which the total log data written equals the CPU cache line size, the compiler can be configured to insert the appropriate cache manipulation instruction(s). In an embodiment, a compiler can be further configured to determine the predecessor blocks of each basic block, where "predecessor blocks" can be defined as basic blocks whose execution can be followed immediately by the execution of the block in question. When compiling a basic block, the compiler can use predecessor block information to trace each possible execution path leading to the execution of the block in question. For each such execution path, the compiler can determine the maximum possible number of bytes written to the log since the last cache manipulation, which can be called the "worst-case cache line consumption at block entry." Once the maximum worst-case cache line consumption at block entry is computed for each code path leading to the current basic block, the compiler can insert cache manipulation instructions in the current block at a point in the block where the worst-case cache line consumption (the worst-case cache line consumption at block entry plus the data written to the log since the start of the block) equals the cache line size. Such an algorithm guarantees that no more than one cache line's worth of data has been written to the log since the last cache manipulation.

Figure 28:
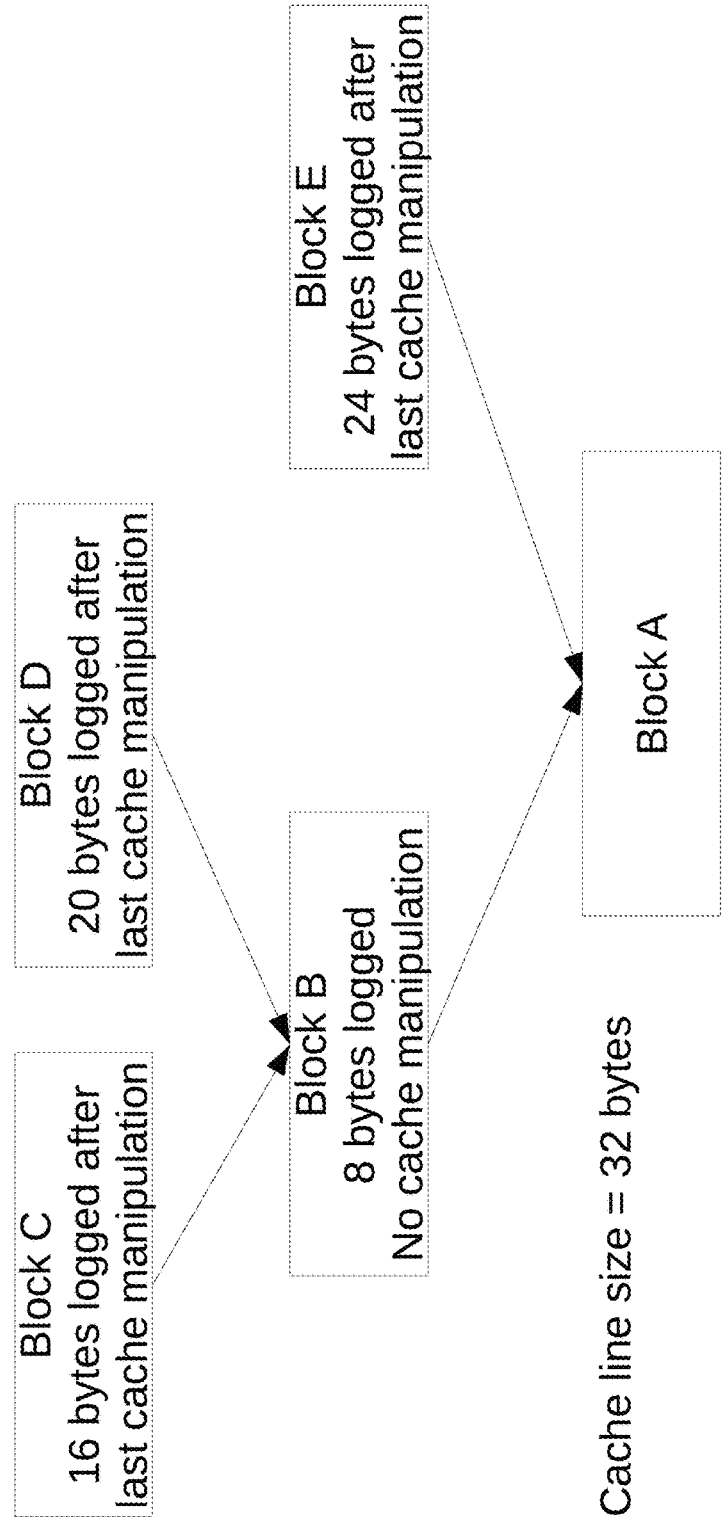
FIG. 28 illustrates code flow analysis for cache management according to an embodiment.

FIG. 28 shows an example of such code flow analysis. The figure depicts a basic block in a program being compiled (Block A), its immediate predecessor blocks (Block B, Block E), and the predecessor blocks of Block B (Block C, Block D.) The compiler in an improved backend is attempting to determine where in Block A, if anywhere, to insert cache manipulation instructions. In the example, the cache line size is 32 bytes. In the path from Block C to Block B to Block A, the worst-case cache line consumption at the entry to block A is 8 bytes (logged in Block B) plus 16 bytes (logged after the last cache manipulation in Block C), or 24 bytes total. In the path from Block D to Block B to Block A, the worst-case cache line consumption at the entry to Block A is 8 bytes (logged in Block B) plus 20 bytes (logged after the last cache manipulation in Block D), or 28 bytes total. In the path from Block E to Block A, the worst-case cache line consumption at the entry to Block A is 24 bytes (logged after the last cache manipulation in Block E.) Therefore, the worst-case cache line consumption at the entry to Block A from all paths is the greatest of the cache line consumptions for each path, or 28 bytes. Subtracting this maximum from the cache line size, the compiler can compute that the appropriate placement of cache manipulation instructions in Block A is after Block A logs 32 bytes-28 bytes, or after Block A logs 4 bytes.

In some embodiments, the run-time performance gain possible by applying cache manipulation and code flow analysis as described herein varies considerably, depending on program behavior, CPU cache architecture, and many other factors. However, run-time performance improvement of 2×, 3×, 5×, or more is not uncommon. In an embodiment, a compiler can be configured to insert cache manipulation instructions and/or perform code flow analysis only in cases where there is likely to be a benefit. For example, a compiler can be configured not to insert cache manipulation instructions when compiling for CPUs in which the cache architecture is unlikely to allow for much benefit.

The following is an example of cache manipulation instructions inserted into instrumented code on a PowerPC CPU:

In the following example, r15 points to the next log location to be written.

```
    li    r17, 0x40                ; Prepare for "dcbal" instruction
    dcbal       r15, r17           ; "Data Cache Block Allocate" -
together with the
                                   ; previous instruction, ensures the next cache line
                                   ; is allocated to the log, without prefetching its contents
    li  r17, 0xffffffc4 ; Prepare for "dcbf" instruction
    dcbf        r15, r17           ; "Data Cache Block Flush" - together
with the
                                   ; previous instruction, flushes the most recently
                                   ; written section of log out of the cache, so it may
                                   ; be reused.
    lis  r17, 0x100                ; Prepare for "stwu"
    addi        r17, r17, 0x164    ; Prepare for "stwu"
    stwu        r17, 4(r15)        ; Perform some actual data logging
```

Gathering Logged Data

In an embodiment, an improved backend gathers logged data from newest to oldest. If the logged data is structured such that interpretation of a given record does not depend on records logged earlier, then the improved backend can make the gathered data available immediately upon retrieval to a time traveling debugger user interface, and the programmer can begin analyzing and debugging the data immediately as it is gathered. As more data is gathered, it is in turn made available to the programmer, until all data has been gathered.

Figure 19:
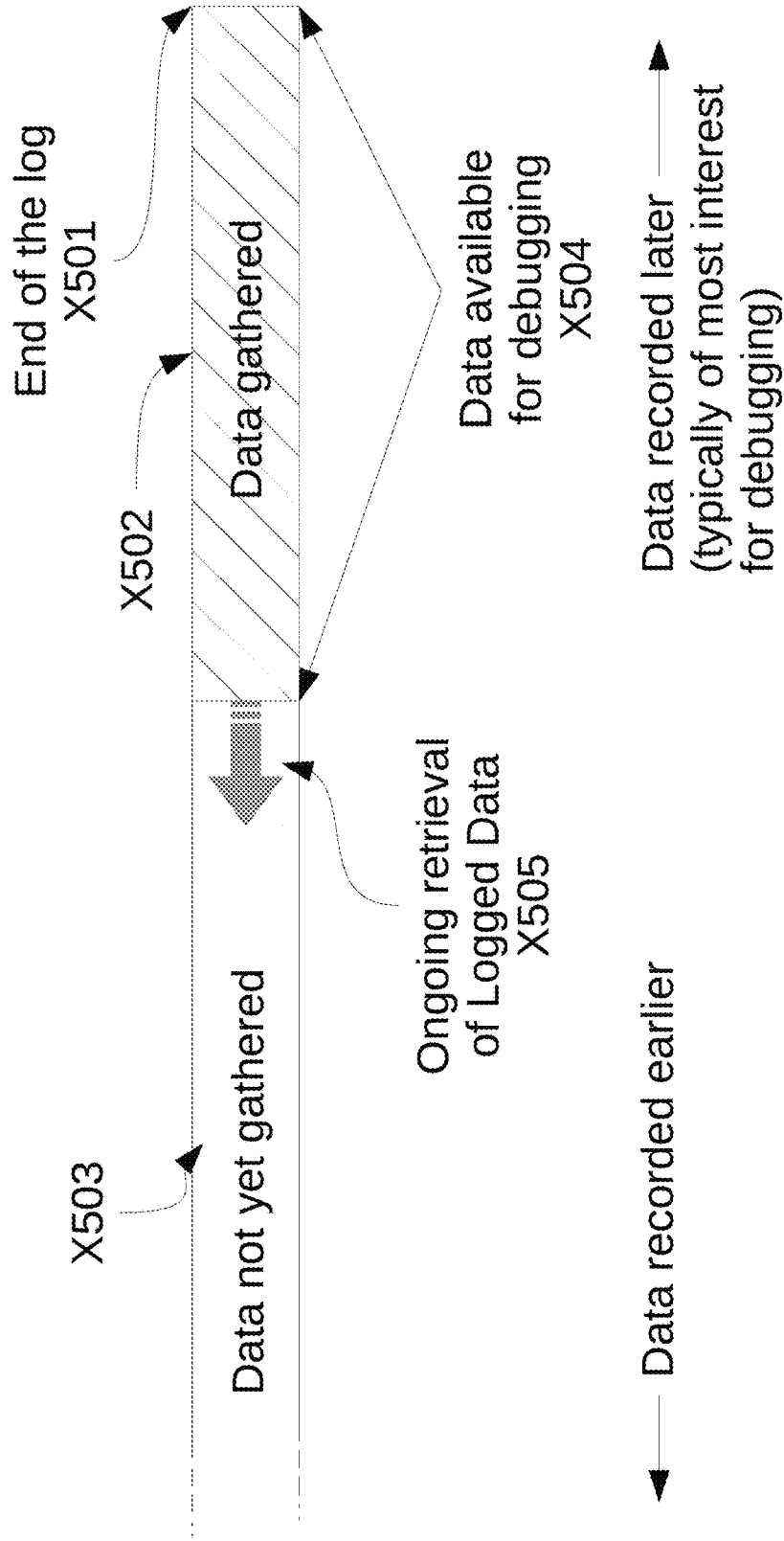
FIG. 19 illustrates availability of data for debugging according to an embodiment.

Availability of data for debugging is depicted in FIG. 19. In the illustrated example, gathering of logged data begins at the end of the log (X501) and proceeds from data recorded later towards data recorded earlier. The region of data gathered (X502) grows over time due to ongoing retrieval of logged data (X505). Note that the region of data available for debugging (X504) is the same as the region of data gathered (X502). Data retrieval continues until all data has been gathered, and the region of data not yet gathered (X503) is reduced to nothing, at which point data from the entire log is available for debugging. Making data available for debugging in this way makes data recorded later, which is typically of most interest for debugging, available to the programmer first. Because data can be made available to the programmer as soon as it is gathered, the amount of time the programmer must wait before analyzing and debugging the latest data is not dependent on the total amount of data to be gathered, making it practical to use arbitrarily large trace logs.

Merging Data From Multiple Logs

An improved backend can log data to multiple logs according to some embodiments. Data logged to multiple logs can be merged, and analyzed as a whole. Logging to multiple logs allows for more efficient logging in systems with multiple threads of execution, in that contention-handling mechanisms such as locks may not be required. Merging data logged from multiple logs allows debugging of SMP systems, and other configurations in which threads of execution may run simultaneously and share memory. Merging data logged from multiple logs allows debugging of distributed systems, and other configurations in which threads of execution run simultaneously and do not share memory. Merging data logged from multiple logs allows debugging of complex systems, such as those with multiple CPUs of different types and/or architectures, those with arbitrary combinations of threads of execution running simultaneously that do and do not share memory, or those in which CPUs communicate with one another by shared memory, or by message passing, or by other means.

In some embodiments, an improved backend can merge data from multiple logs into one or more merged logs. An improved backend merges data from multiple logs by reading the next record to be processed from each log, and deciding which of those records is logically most appropriate to insert next into the merged log. Once a record is inserted into the merged log, it is no longer considered for merging; the next record to be processed from that log is considered instead. Records are considered from each log in the same chronological order, so, for example, if the improved backend is processing log data in reverse-chronological order, then during the merging process, each individual log's records are considered in reverse-chronological order.

Figure 20:
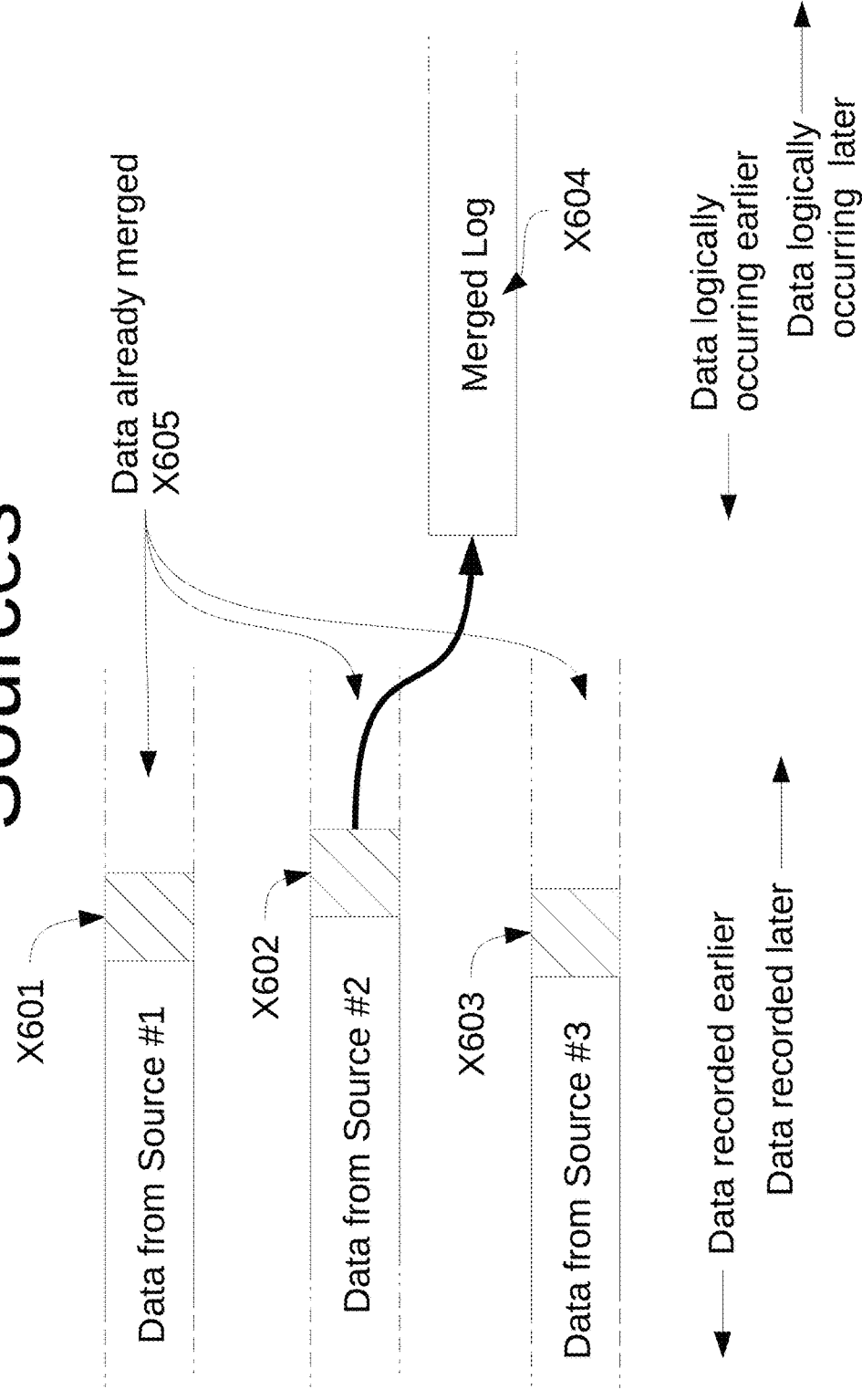
FIG. 20 illustrates merging log data according to an embodiment.

An example of merging log data from different sources appears in FIG. 20. On the left side of the figure are logs recorded by three different sources. In the example, log data is being gathered from newest (data recorded later) to oldest (data recorded earlier.) The next records under consideration (X601, X602, X603) are the latest records not yet merged from each data source. In the example, a decision is made that the most recent record from Source #2 (X602) should be the next record merged, and is therefore prepended to the merged log (X604). When this is done, the most recent record from Source #2 (X602) will be considered part of the data already merged (X605), and will no longer be a candidate for merging. The record just prior to X602 will then become the most recent record from Source #2 under consideration when the process is next repeated.

During the merging process, an improved backend may employ one or more of many different techniques (which may be referred to as "ordering techniques") when determining which record is logically most appropriate to insert next into the merged log. The logically most appropriate order is typically an order in which, in the merged log, records do not occur logically out of order. For example, two records can be considered logically out of order if the record appearing chronologically earlier in the merged log represents an event caused by an event whose corresponding record appears chronologically later in the merged log. Note that, for any given body of log data from multiple sources, there may exist many orderings that do not contain records that are logically out of order. "Synchronization event" may refer to an event for which sequence matters when ordering data from multiple sources. For example, two events are synchronization events if their corresponding records could be out-of-order depending on their relative placement in the merged log. Synchronization events can include, but are not limited to: communication events between CPUs, operating system events, and actions on mutexes or other synchronization primitives.

Figure 21A:
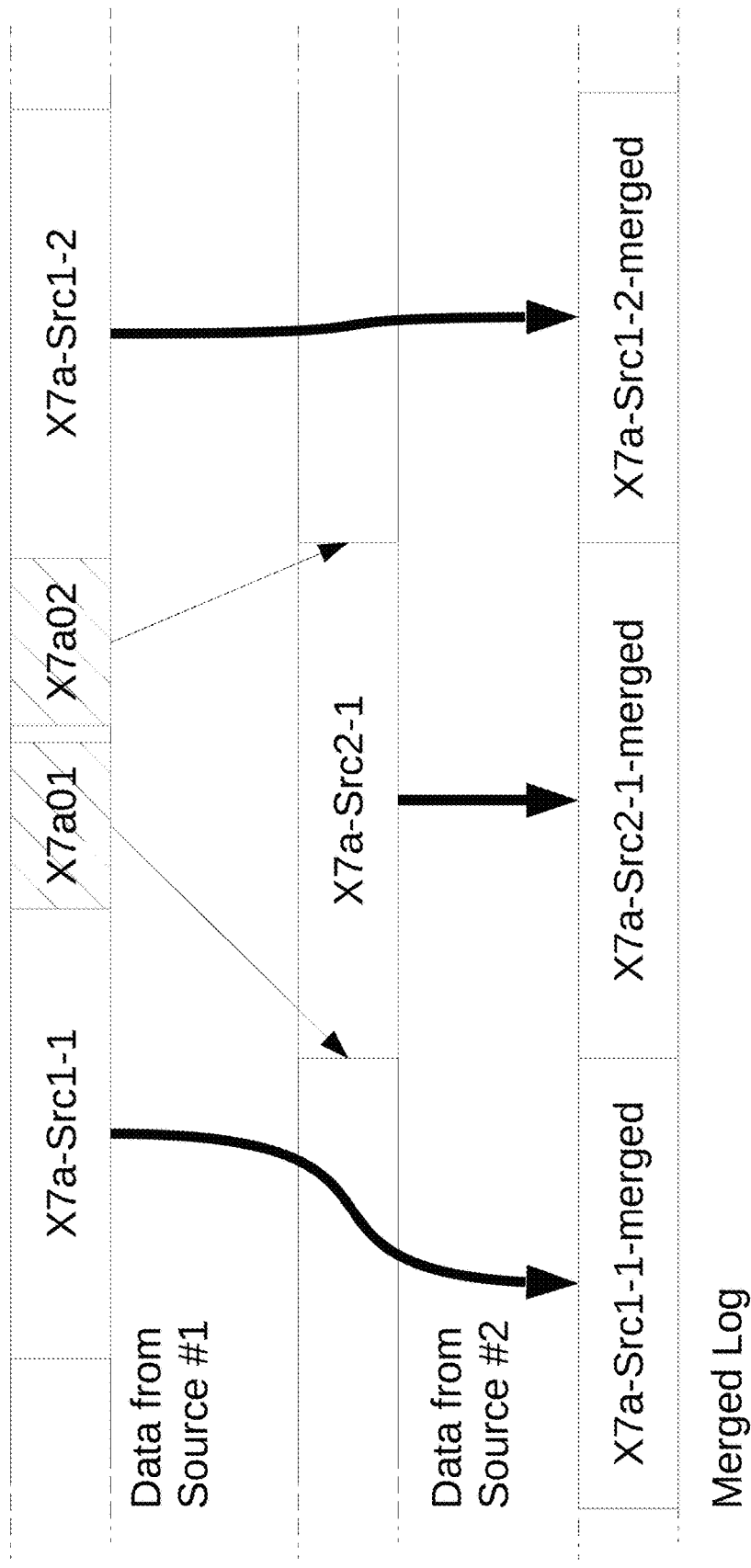
FIGS. 21A, 21B, 21C, and 21D illustrate ordering and merging log data according to some embodiments.

One ordering technique is to use meta-information recorded in one or more of the logs explicitly describing the order in which various sections of data were logged. For example, in a case in which a kernel and an application share a single CPU, the kernel can record in its log the points at which control is transferred to and from the application, and the amount of log written by the application at the point of transference. In this example, this information can be used as input to an ordering technique that can determine the logically most appropriate ordering of data logged by the kernel and the application. An example of this ordering technique is in FIG. 21A. Data from Source #1 includes meta-data records representing the start of logging (X7a01) and end of logging (X7a02), respectively, by Source #2 of a data region (X7a-Src2-1). Using this meta-data, the ordering technique can correctly insert the data from source #2 (X7a-Src2-1-merged) between data regions from source #1 (X7a-Src1-1-merged and X7a-Src1-2-merged) in the merged log. In this example, the meta-data records are represented as two distinct records (X7a01 and X7a02), but in an embodiment, the meta-data can be represented in one or more records. In this example, the meta-data records (X7a01 and X7a02) are omitted from the merged log, but in an embodiment, the meta-data may or may not be included in the merged log.

Figure 21B:
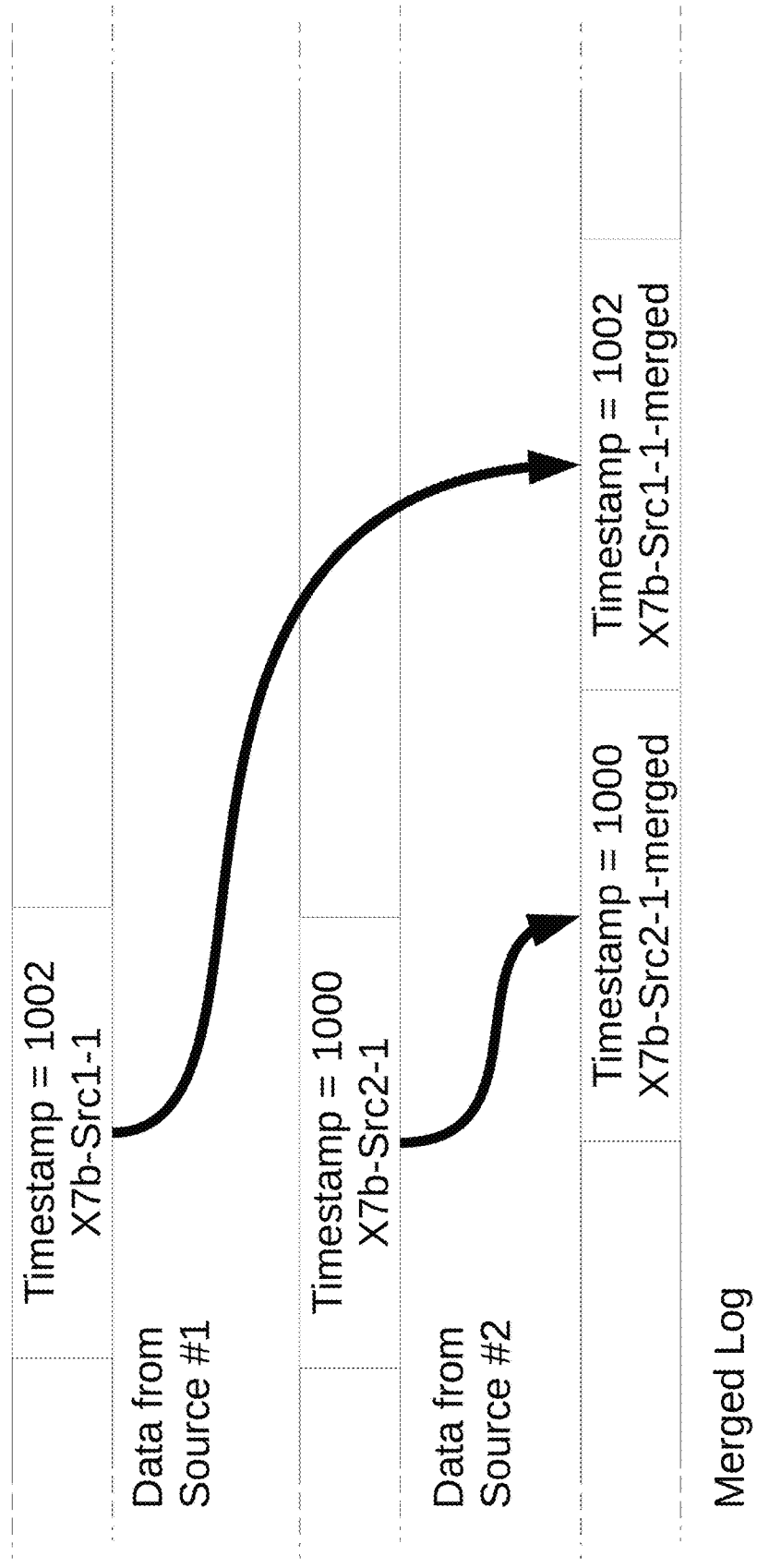

Another ordering technique is to timestamp certain records representing synchronization events. If such timestamps are generated from a single clock, or from multiple clocks that are sufficiently synchronized, then these timestamps can be used for ordering by selecting the record with the highest or lowest timestamp, depending on the direction in which the logs are being read. An example of the timestamp ordering technique appears in FIG. 21B. Given that the timestamp (1002) in the next record from source #1 (X7b-Src1-1) is greater than the timestamp (1000) in the next record from source #2 (X7b-Src2-1), the ordering technique can determine that the record from source #2 (X7b-Src2-1-merged) must appear before the record from source #1 (X7b-Src1-1-merged) in the merged log.

Figure 21C:
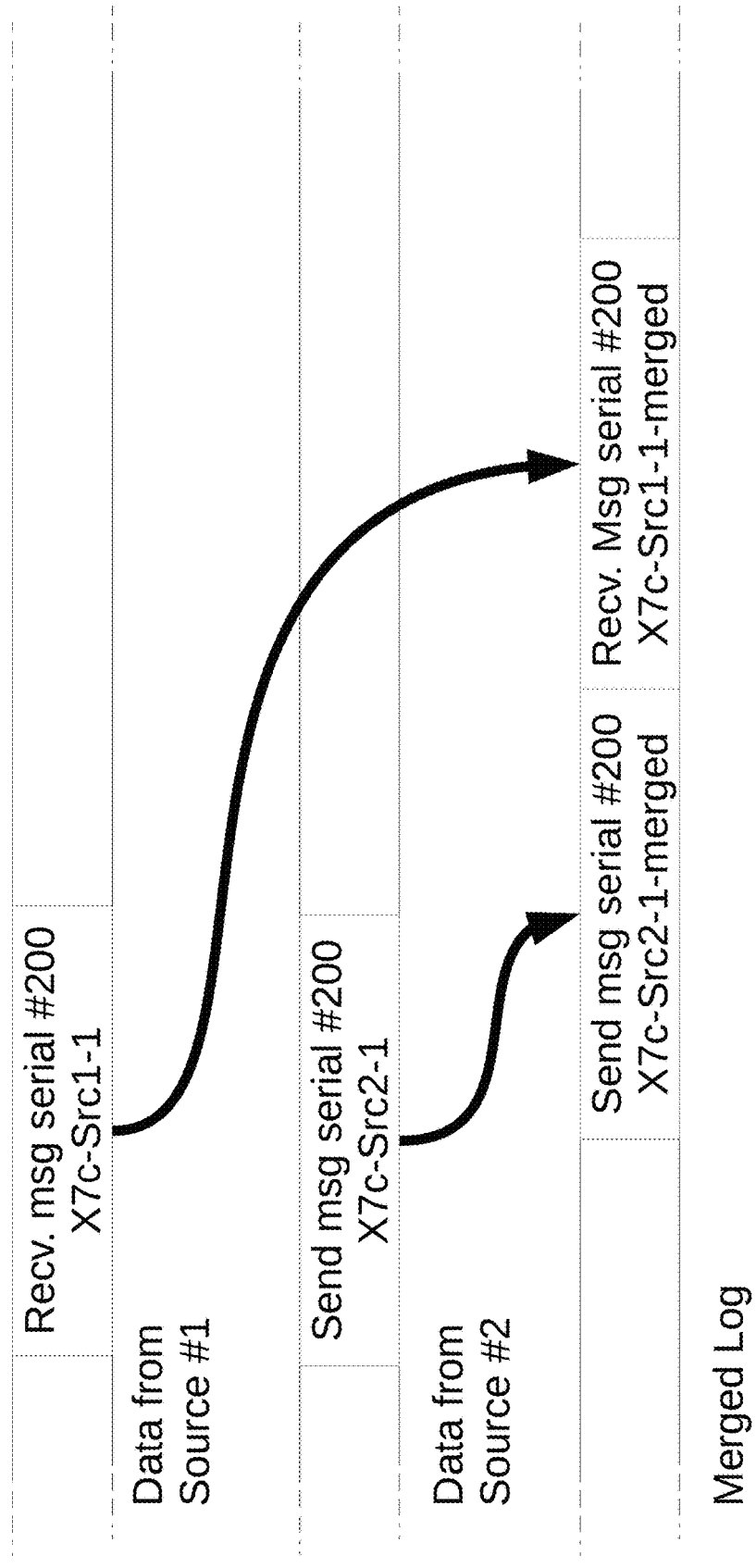

Yet another ordering technique is to tag certain synchronization events with serial numbers or other such identifiers that can be used to determine their order with respect to other synchronization events. For example, if a message sent from one CPU to another results in a message transmission record in one log and a message reception record in another log, and both records contain an identifier unique to that message, then an ordering technique can use the knowledge that the transmission event must have preceded the reception event to order the records in the merged log. An example of the serial number ordering appears in FIG. 21C. Given that record X7c-Src1-1 represents the reception of the message with serial number #200, and record X7c-Src2-1 represents the transmission of the message with serial number #200, the ordering technique can determine that the transmission must have preceded the reception, and therefore record X7c-Src2-1-merged must precede record X7c-Src1-1-merged in the merged log.

Figure 21D:
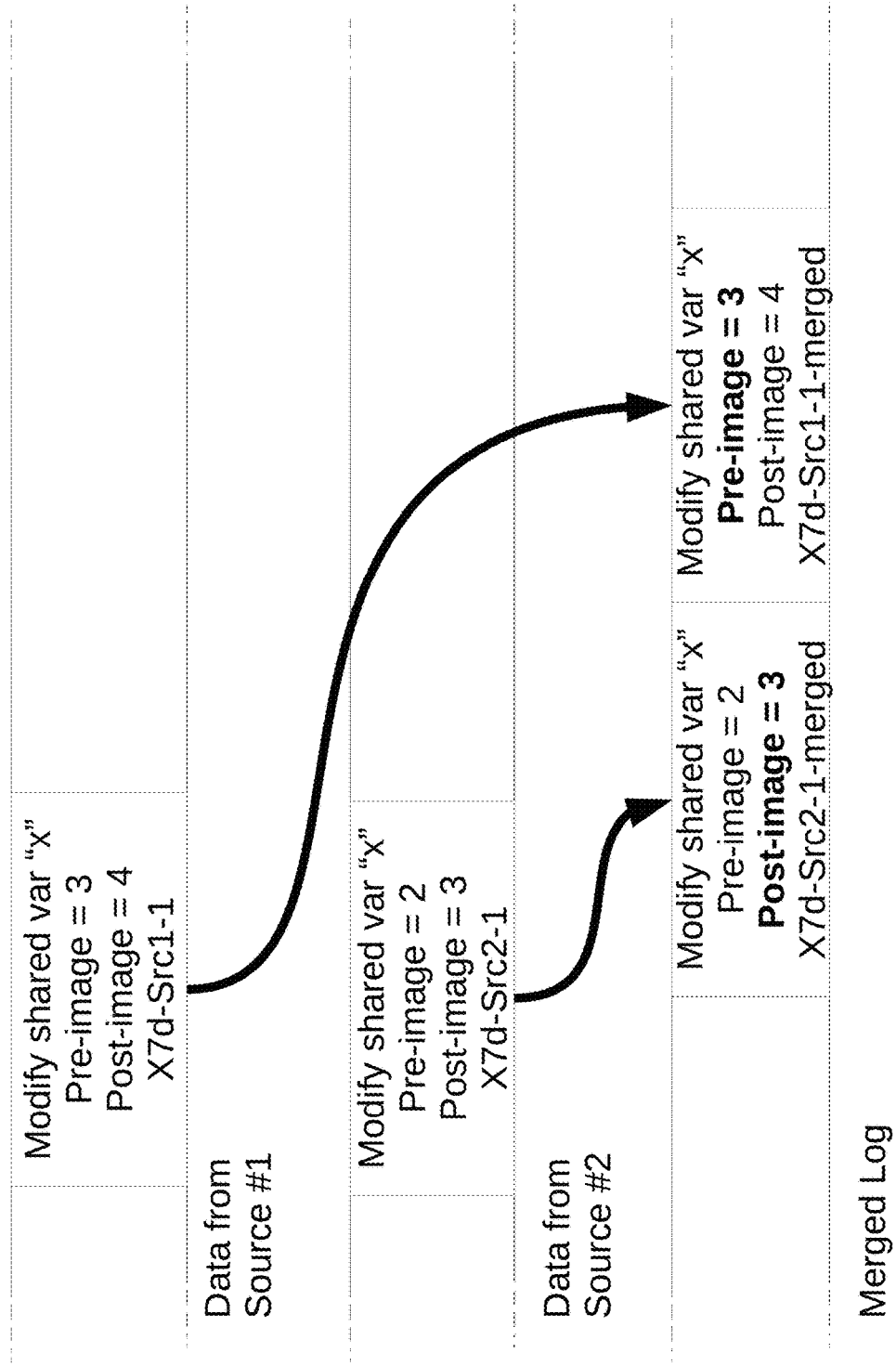

Yet another ordering technique is to use data from the logs, such as pre-image and post-image data, to ensure that records appear in logical order in the merged log. For example, if a shared memory location was written by two different threads of execution in succession, and the pre-images and post-images are known for both threads' stores, and there is only one ordering in which the pre-image of one store and the post-image of the other store match, then an ordering technique can use this information to correctly order the corresponding memory store records in the merged log. An example of data-based ordering is in FIG. 21D. In the example, records from two different sources (X7d-Src1-1, X7d-Src2-1) represent changes to a shared variable "x". The record from source #1 (X7d-Src1-1) includes a pre-image value (the value of "x" prior to the modification represented in the record) of 3, and a post-image value (the value of "x" after the modification represented in the record) of 4. The record from source #2 (X7d-Src2-1) includes a pre-image value of 2 and a post-image value of 3. Therefore, in the example, the data-based ordering technique can determine that record X7d-Src2-1-merged must precede X7d-Src1-1-merged in the merged log, as the post-image of X7d-Src2-1-merged (3) matches the pre-image of X7d-Src1-1-merged (3), whereas the reverse ordering (placing X7d-Src1-1-merged with a post-image of 4 before X7d-Src2-1-merged with a pre-image of 2) does not result in a logical corresponding of the earlier record's post-image and the later record's pre-image.

Reconstructing Memory

An improved backend can reconstruct the state of the memory of the target program at any point in time represented in the log according to some embodiments. The memory state of the target program can be reconstructed as follows, using previously recorded memory change records containing pre-image data.

In an embodiment, the improved backend maintains a representation of the state of the target program's memory at a given time. Initially, this state may be copied from the live target program.

For example, the trace log may contain zero or more memory change records. Each such memory change record may contain sufficient information that the improved backend can determine what memory range was modified, and the "pre-image" value (such as, the value that was present in that memory range before the memory modification took place). In an embodiment, the memory change record also contains an empty space reserved for storing the post-image value.

In an embodiment, the first time the improved backend reconstructs memory prior to the memory change record, the value currently in the debugger's representation of that location is copied into the reserved space for storing the post-image, and the pre-image value is copied from the log into the debugger's representation of the location. This has the effect of recreating the target program's memory state immediately prior to the memory change represented by the memory change record. By repeating the above with successive memory change records from the log, the improved backend may reconstruct the program's memory state at successively earlier and earlier points during the program's original execution. In an embodiment, if the post-image is already present in the memory change record, either because the improved backend has already saved the post-image, or because it was determined by other means, copying the post-image into the log may be omitted.

In an embodiment, this process is reversed to move the program's memory state to successively later points in time. Specifically, the debugger may copy the saved post-image from a memory change record into the debugger's representation of the associated location to reconstruct the program's memory state just after the modification represented by the memory change record. By repeating the above with successive memory change records from the log, the improved backend may reconstruct the program's memory state at successively later and later points during the program's original execution.

Figure 15A:
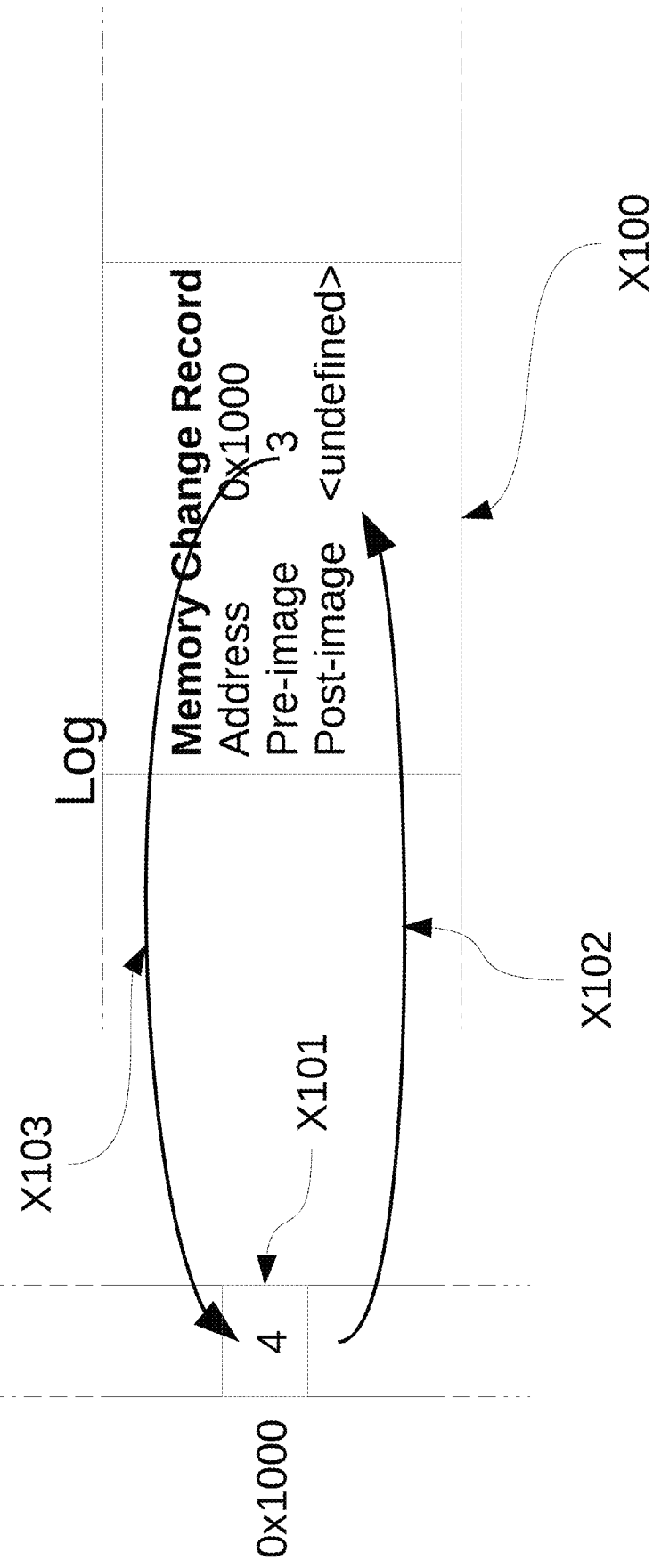
FIGS. 15A, 15B, 15C, and 15D illustrate reconstructing memory according to some embodiments.
Figure 15B:
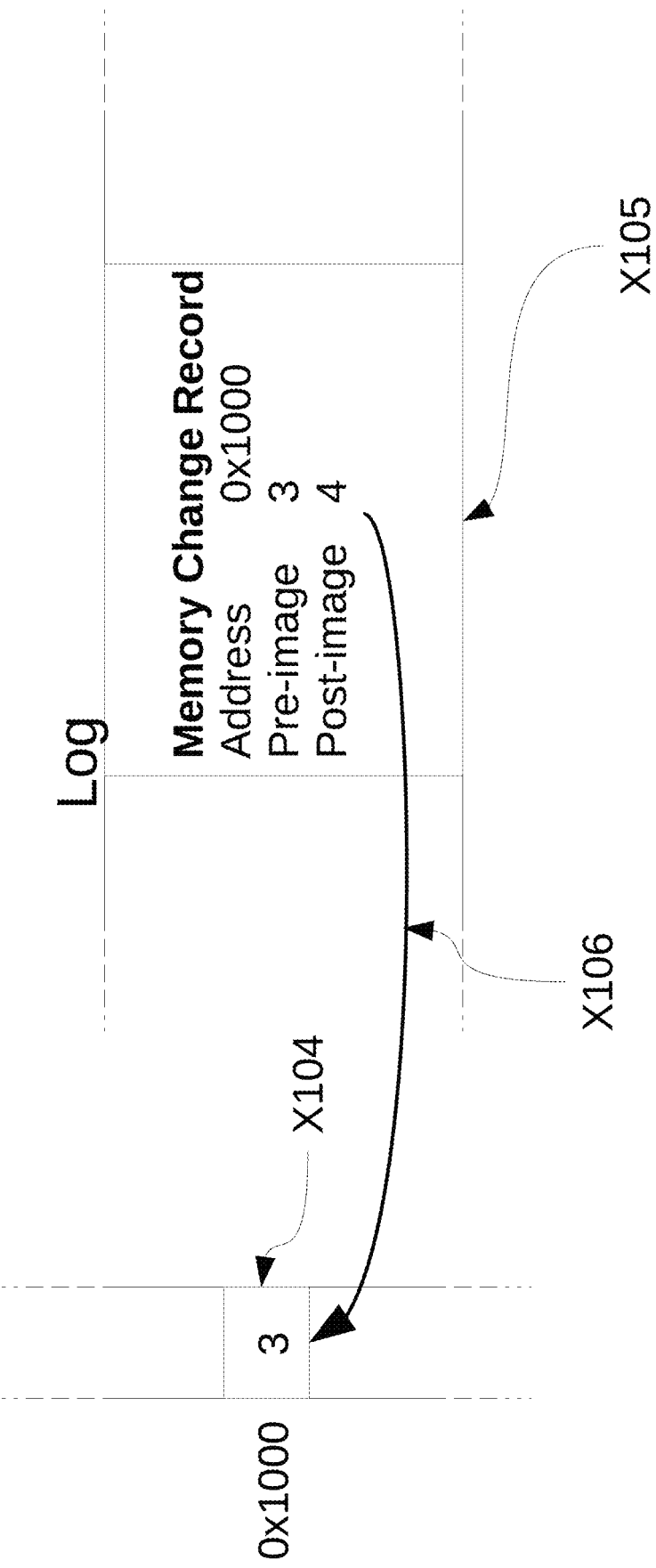
Figure 15C:
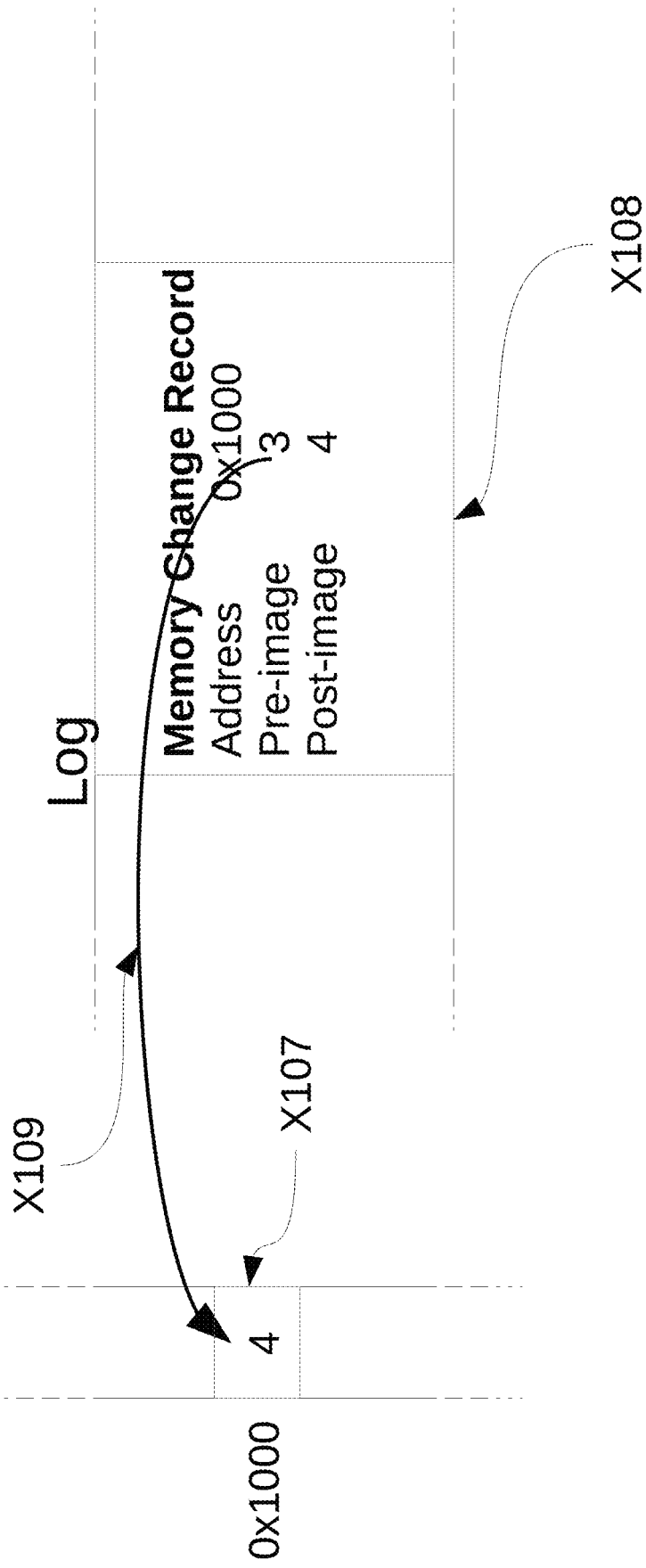
Figure 15D:
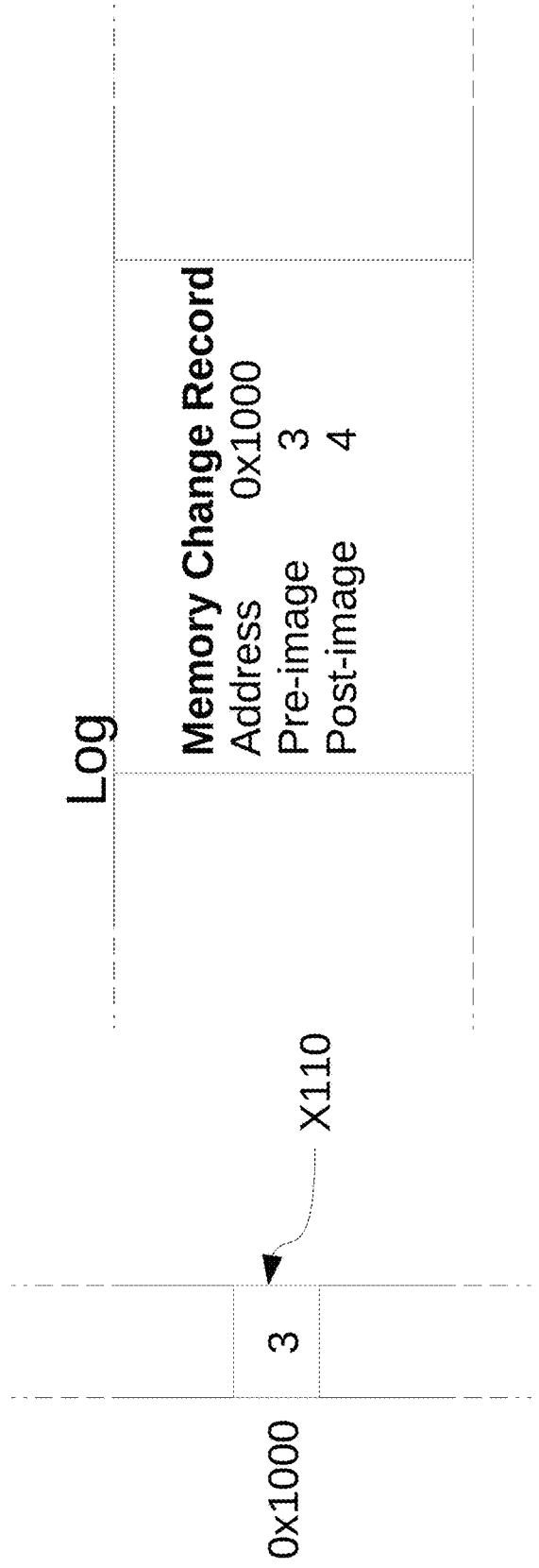

FIGS. 15A, 15A, 15C, and 15D illustrate examples of reconstructing memory. As is depicted, a memory change record in the log (X100) contains an address, and a pre-image; space has been reserved in the log for the post-image, but nothing has yet been written there, so the value is undefined. The simulated memory for that location (X101) contains the initial value "4".

To reconstruct the memory state of the target prior to the memory change recorded in the log entry (X100), the current value in the simulated memory is first copied into the reserved post-image space (X102). Then, the pre-image is copied from the memory change record to the simulated memory (X103). Now, the simulated memory (FIG. 15B, X104) represents the state of the target prior to the memory change record, and the memory change record (X105) contains both the pre-image and the post-image associated with that change.

To move forward in time, reconstructing the memory state of the target after the memory change represented in the log entry (X105), the improved backend copies (X106) the post-image from the memory change record to simulated memory (X104). Now, the simulated memory (FIG. 15C, X107) once again represents the state of the target program after the memory change. Note that the state represented in memory at this point (X107) matches the initial state (FIG. 15A, X101).

To move backward once more, reconstructing the memory state of the target prior to the memory change represented in the log entry (FIG. 15C, X108), the improved backend copies (X109) the pre-image from the memory change record to the simulated memory (X107). There is no need to fill in the memory change record's post-image, because we did so previously. Now, the simulated memory (FIG. 15D, X110) once again represents the state of the target program before the memory change. Note that the state represented in memory at this point (X110) matches the state after the first time the improved backend crossed the memory change record (FIG. 15B, X104).

Figure 16:
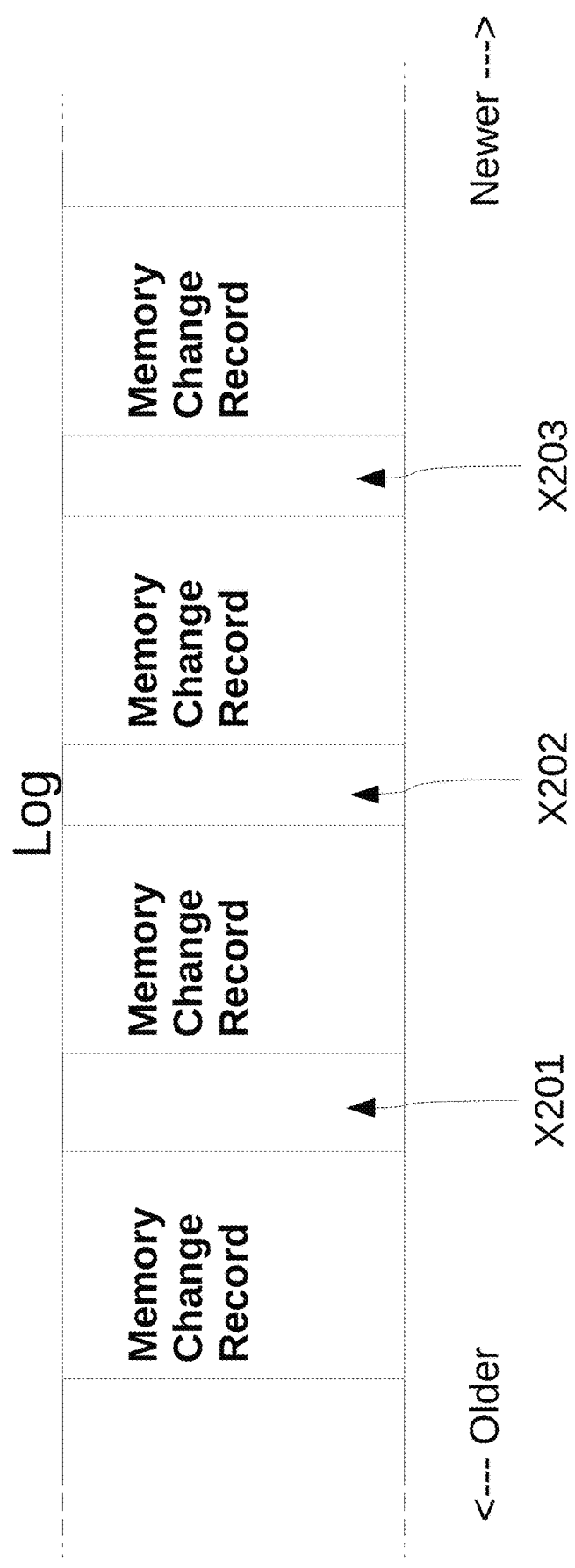
FIG. 16 illustrates reconstruction of memory according to another embodiment.

FIG. 16 shows an example of how such a technique can be used to reconstruct the memory state of the target at different points in time when the log contains many memory change records. In this example, memory change records are recorded in the log in chronological order, with newer records appearing to the right of older records in the figure. Each gap between memory change records (X201, X202, X203) represents a point during the execution of the target program at which the earlier memory changes (appearing to the left of the gap in the figure) had already occurred, and the later memory changes (appearing to the right of the gap in the figure) had not yet occurred. Starting from any given point in time represented by a gap in FIG. 16, an improved backend can move to an adjacent gap, either earlier or later in time, by applying a technique such as the one demonstrated in FIGS. 15A-D. By making such moves repeatedly, the improved backend can reconstruct the state of the target program's memory at any point in time represented in the log.

In an embodiment, pre-images and post-images can be stored in the same location within a memory change record. In such an embodiment, the pre-image and post-image are stored in a single "memory image" location. The memory image location within a memory change record can contain either the pre-image or the post-image, depending on whether the currently-reconstructed point in time occurred before or after the memory change record. If the currently-reconstructed point in time is after a given memory change record, then the memory image location within the memory change record contains the pre-image. When reconstructing backwards in time across a memory change record, the contents of the memory image location is swapped with the contents of the corresponding location in the reconstructed memory, thus converting the value in the memory image location into a post-image. When reconstructing forward across a memory change record, the same swap operation converts the value in the memory image location back into a pre-image. Such a technique is advantageous in that it uses log space more efficiently, as space need not be reserved in the log for post-images.

Baseline Memory Image

Memory change records, as described herein, can represent incremental changes in memory state in some embodiments. By analyzing such changes by themselves, an improved backend can reconstruct the contents of memory locations that change over time. To create a complete image of the memory of the system being debugged, an improved backend can use a baseline image, which contains the contents of some or all of the system's memory at a known point in time. An improved backend can, starting with a baseline image, reconstruct memory forward or back in time using the technique described previously for reconstructing memory using memory change records, or a similar technique. Such a baseline image can be a single snapshot of system memory, or it can comprise multiple snapshots taken at the same time, or at different times. A baseline image can come from any time covered by the log.

In an embodiment, the system is halted for debugging, and an improved backend uses the system memory itself as a baseline image. An improved backend can download memory state from the system's memory all at once, or in sections, as needed. Downloading the target program memory all at once can be inefficient, as the target program memory can be arbitrarily large, delaying the programmer's ability to start debugging for an arbitrary amount of time. In an embodiment, an improved backend can download sections of program memory one at a time, as needed, to bound the time required to begin debugging. Depending on how the system behaves while halted for debugging, it may be possible for memory to continue to change while the system is in a halted state, in which case an improved backend can employ various techniques for assuring the consistency of the memory image, even while that memory is changing, for example, by using the memory consistency technique described in a later section.

In an embodiment, an improved backend can use a previously-saved image of system memory (which may be referred to as "core dump") as a baseline, whether such a core dump was created as the result of an error, by user request, or for some other reason. Such a core dump can consist solely of a memory image, or can include other useful data, including but not limited to register state information, information about threads of execution, and/or information about virtual memory mapping. In an embodiment, log data collected by an improved backend can be stored in memory, or otherwise available in conjunction with a core dump image, allowing a time traveling debugger employing an improved backend to step through the execution history of the application leading up to the point at which the core dump was generated. As such, an improved backend enables a very powerful model of debugging, in which the detection of an error, or user's request, or some other condition results in the generation of a core dump image. Such a core dump image can be analyzed in place, saved for later collection, and/or transmitted to another location for storage and/or analysis. A time traveling debugger employing an improved backend can then interpret such a core dump image, allowing a programmer to perform "post-mortem" debugging of the system from which the core dump image was taken. Post-mortem debugging can refer to debugging one or more programs based on information contained in a core dump, or some other source of information that is accessible after the program has halted, or is otherwise no longer executing. Such post-mortem debugging, when done with an improved backend, can include the capabilities of the improved backend, including, but not limited to: reconstructing the state of the system in the moments leading up to the core dump, stepping through the execution history of the system, and performing various kinds of analysis on the execution.

In an embodiment, an improved backend can use an image of memory saved using a copying technique such as that employed by a copying backend.

Maintaining Memory Image Consistency when Memory is Changing

In an embodiment in which an improved backend downloads sections of program memory one at a time as needed for construction of a baseline memory image, or for some other purpose, it may be possible for the contents of the program memory to change in the interval between when two sections are copied, resulting in an inconsistent image of the program's memory. Some embodiments can employ run control strategies, such as synchronous run control (described herein), to mitigate this problem. However, in embodiments that, due to the run control strategy employed or other reasons, do not guarantee that program memory will not be modified after an improved backend begins downloading such program memory, an improved backend can use a technique, such as described herein, to guarantee a consistent image of the program's memory.

In an embodiment, an improved backend can check the log for memory modification records affecting each section being copied. If such records represent memory modifications that occurred after the first section was copied, then such records (which may be referred to as "late memory change records") represent discrepancies between the first section copied and the current section being copied. An improved backend can then perform memory reconstruction, using a technique such as the one described previously, to apply the late memory change records in reverse chronological order to the memory being copied, or in forward-chronological order to the memory images previously copied. This makes the copied memory section consistent with previously-copied memory sections, eliminating inconsistencies between sections of the program's memory copied at different times.

Figure 24:
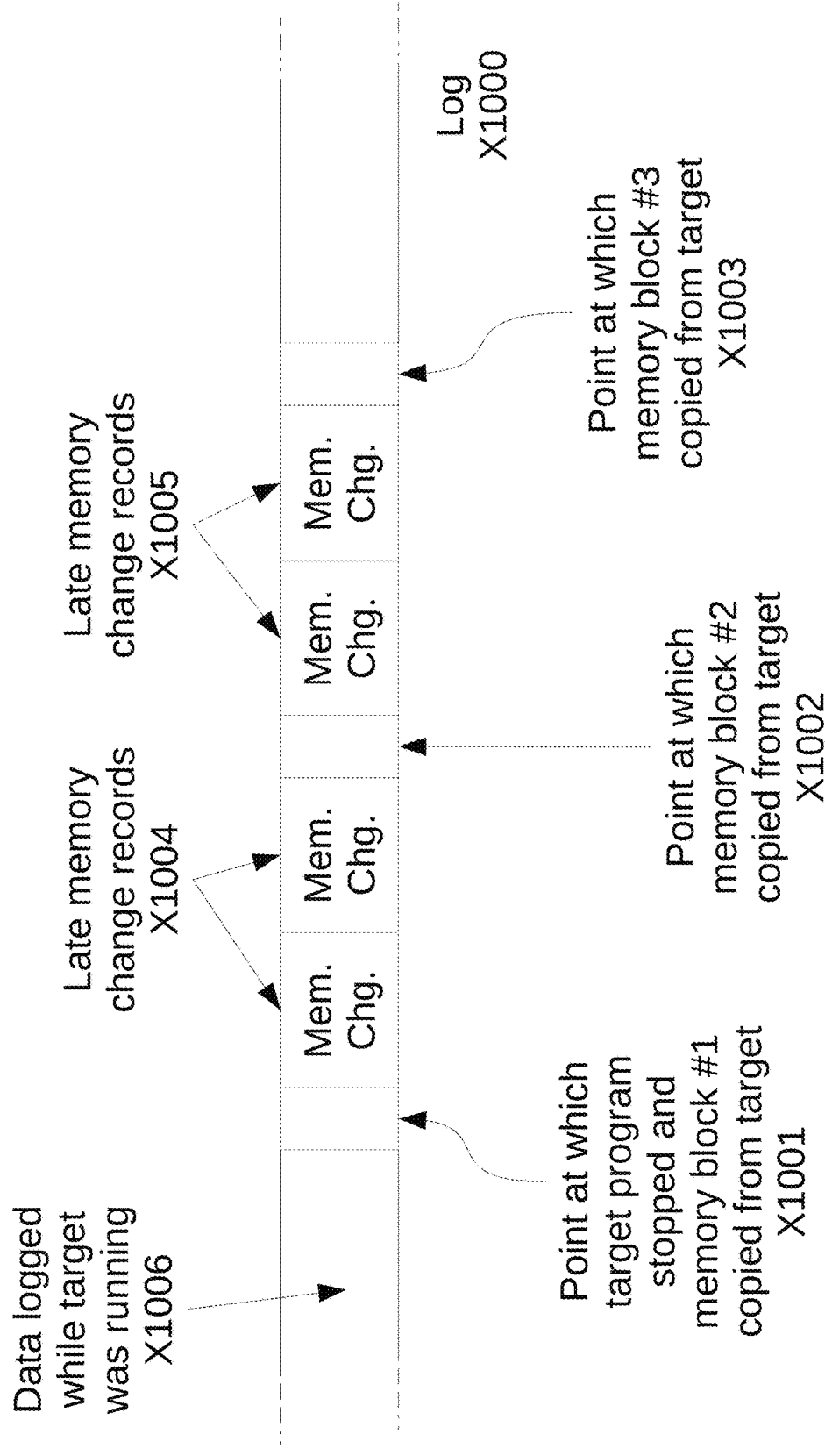
FIG. 24 illustrates an example application of late memory change records according to an embodiment.

FIG. 24 contains an example application of late memory change records. In the illustrated example, an improved backend interprets logged data (X1000). When the target system stops running, the improved backend begins reading data logged while the target was running (X1006) up to the point at which the target program stopped (X1001). At the point the target program stopped (X1001), the improved backend copies memory block #1 from the target, to assist in interpreting the log data. At a later point (X1002), the improved backend requires memory block #2, which it copies from the target. However, between the point at which memory block #1 is copied (X1001) and memory block #2 is copied (X1002), additional memory change records (X1004) were logged. These are called "late memory change records" because they were logged after the target program stopped. The copies of memory blocks #1 and #2 made by the improved backend may be inconsistent, as the late memory change records between them (X1004) indicate that the contents of memory block #2 may have changed since the time when memory block #1 was copied. To make the memory blocks consistent, the improved backend applies the memory change records (X1004) in reverse chronological order to the contents of memory block #2, resulting in a representation of the contents of memory block #2 at the time memory block #1 was copied (X1001). The resulting image is therefore consistent with the copied contents of memory block #1. At a yet later point (X1003), the improved backend copies memory block #3 from the target. The improved backend applies the late memory change records at X1005 and X1004 to the copied contents of memory block #3, making the copied contents of memory block #3 consistent with the contents of memory block #1 copied from the target at X1001. In this way, the improved backend copies memory from the target only as each block is needed to interpret the data logged while the target was running (X1006), yet the improved backend builds a consistent image of target memory, even though the target memory may have changed between the points (X1001, X1002, X1003) when memory blocks were copied.

Virtual Mappings

In some embodiments, when reconstructing the memory of a target system, an improved backend can operate on virtual memory addresses, physical memory addresses, or both. An improved backend can gather virtual memory mapping information from the target system, including information about the relationship between virtual and physical addresses. On CPUs that support such security models, virtual memory mapping information gathered by an improved backend can include information about protection rings, and other means of protecting data from less privileged code. An improved backend can use virtual memory mapping information and other memory protection information to help organize its internal representation of the target system. For example, an improved backend can use virtual memory mapping information to distinguish identical addresses in different virtual address spaces, which can represent different physical memory, and therefore contain different values. An improved backend can use virtual memory mapping information to represent shared memory, in which different virtual addresses in the same or different virtual address spaces represent the same physical memory. By using virtual memory mapping information to represent shared memory, an improved backend can eliminate the need for an improved backend to provide any special instrumentation or logging of stores to shared memory.

Reconstructive Simulation

At times, it may be helpful for an improved backend to be able to perform instruction-level simulation of one or more CPUs, such as reconstructing the actual or theoretical behavior of one or more CPUs in the system being debugged. This can be accomplished by reconstructive simulation.

The following technique for reconstructive simulation can rely on an instruction set simulator, which is any mechanism that, given an initial register state and the initial state of memory, can produce the register state that would occur within the CPU after one or more machine instructions are executed. There are many such mechanisms, including but not limited to: software simulators, just-in-time (JIT) compilers, software and hardware virtualization mechanisms, and CPUs. Such an instruction set simulator may operate on the entire register set of the CPU, or any subset that is sufficient to accurately represent the behavior of the CPU on which the target program ran. Note that, when debugging systems with multiple CPUs of different types, multiple instruction set simulators may be necessary.

Reconstructive simulation may be accomplished by recreating an historical or theoretical environment in which a CPU did or may operate, and applying an instruction set simulator to determine the state of the system at some later point in time. The environment recreated may include, but is not limited to, initial register state, initial memory state, and the creation or re-creation of any outside events that could affect the behavior of the CPU. Such an environment may be created using information logged or reconstructed by techniques described previously, such as register state snapshots, memory reconstructed using techniques described in the section "Memory Reconstruction", and other information logged, collected from the final state of the program being debugged, fabricated, or combined or derived from these various sources.

Reconstructing Register State

Implementation of an improved backend may require reconstruction of CPU register state according to some embodiments. If register state snapshots are logged periodically (as described herein), then the following technique may be used to reconstruct register state at any point in the log (which may be referred to as "destination point") for which there is at least one register state snapshot logged prior to the destination point for each CPU whose register state is unknown at the destination point.

To reconstruct register state at the destination point, a time traveling debugger can first determine the set of CPUs whose register states are unknown at the destination point. This is typically the CPUs that were executing code at the destination point, but there may be reasons to include or exclude some CPUs from that list. Note that if the register state is already known for all CPUs, then use of this or any other register reconstruction algorithm is not required.

Once the set of CPUs whose register states are to be reconstructed is determined, an improved backend can use a technique such as that described in the section "Reconstructing Memory" to reconstruct the state of memory at an earlier point in the log (which may be referred to as "reconstruction point") such that for each CPU whose register state is unknown, there is at least one register state snapshot that was logged between the reconstruction point and the destination point. Then, the debugger may return to the destination point, using a combination of memory reconstruction techniques (such as those described in the section "Reconstructing Memory") and reconstructive simulation techniques (such as those described in the section "Reconstructive Simulation") to ensure that, at each step forward, the correctness of the memory state and register state is maintained. This may be done, for example, by performing the following process:

Starting from the reconstruction point:
At the point of time currently represented by the memory and CPU state in the debugger, determine which CPU will take the next execution step. (There may be many techniques for deciding which CPU will take the next execution step, including techniques described herein).
If there is a register state snapshot associated with the current point in time, store the state in the debugger, making it available for future reconstructive simulation.
If the debugger has accurate register state information for the CPU taking the next step, use a technique (such as that described in the section "Reconstructive Simulation") to determine the target state at a point in time incrementally later. As used herein, the term "incrementally later" can be defined as "one instruction later", or "one cycle later", or in some other way, depending on the capabilities of the simulator used.
If the debugger does not have accurate register state information for the CPU taking the next step, apply a memory reconstruction technique, such as that described in the section "Reconstructing Memory", to move the memory state to a point in time incrementally later.

Repeat the above steps until the destination point is reached.

Figure 17:
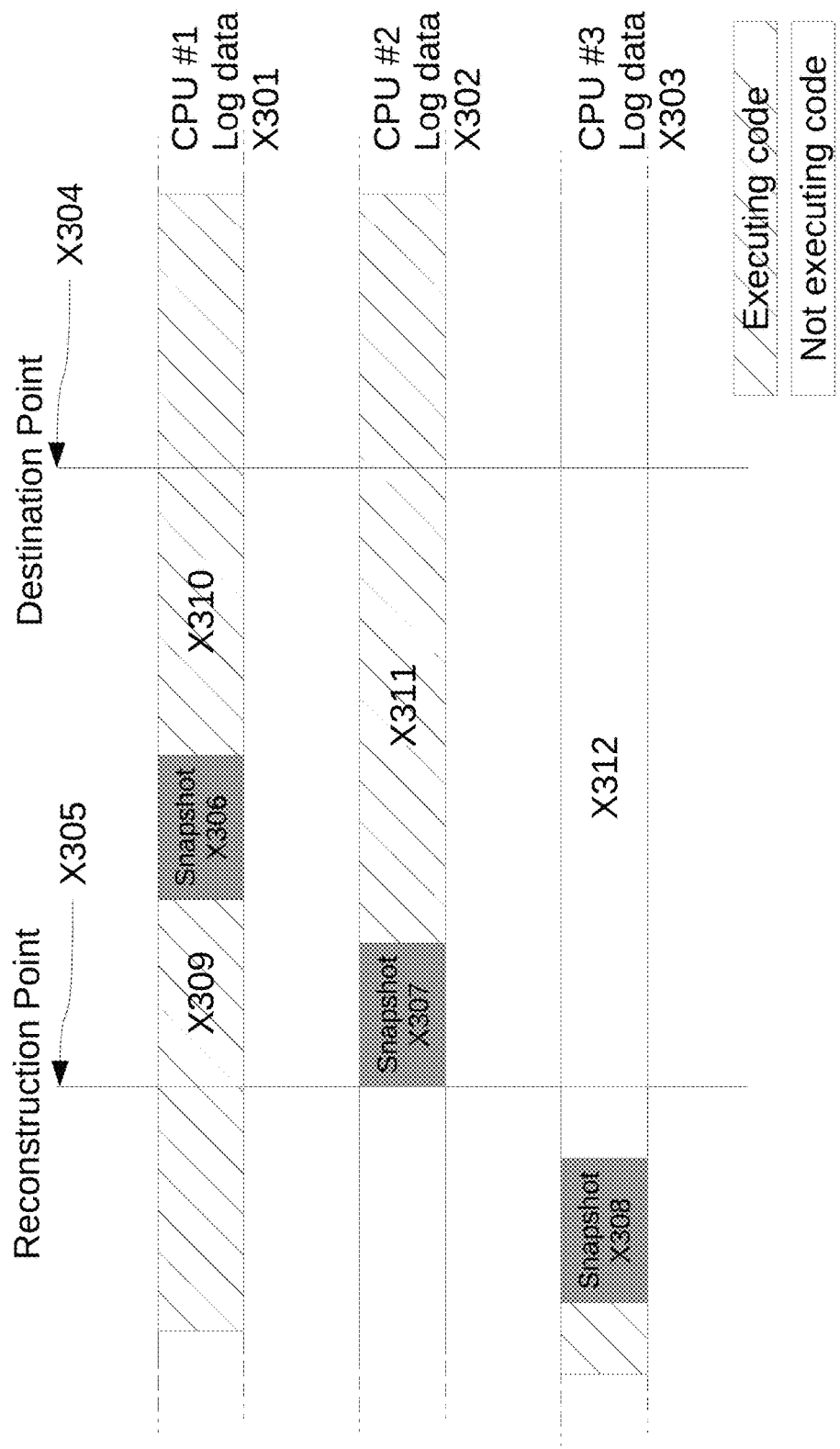
FIG. 17 illustrates reconstruction of registers according to an embodiment.

An example of register state reconstruction in a system comprised of 3 CPUs is in FIG. 17. In the figure, each row (X301, X302, X303) represents data logged for a particular CPU in the system. To reconstruct register state at the destination point (represented by the vertical line at X304), an improved backend can begin by reconstructing memory at the reconstruction point (the vertical line at X305.) Note that the register state of CPUs #1 (X301) and #2 (X302) are unknown at the destination point (X304) because code is executing on those CPUs at that point, so the reconstruction point must be chosen such that snapshots for those CPUs (X306 and X307) occur between the reconstruction point (X305) and the destination point (X304). Since no code is executing on CPU #3 at the destination point, there may be no reason to reconstruct register state on CPU #3, and therefore a register state snapshot on CPU #3 (X308, for example) need not occur between the reconstruction point (X305) and the destination point (X304).

Once the improved backend has reconstructed memory state at the reconstruction point (X305), it may reconstruct memory and registers forward in time, as follows. To reconstruct the state for CPU #1, it may perform memory reconstruction through the region (X309) prior to the register state snapshot (X306), then make the state from the snapshot (X306) available to an instruction set simulator, then use that simulator to perform reconstructive simulation in the region (X310) between the snapshot and the destination point. To reconstruct the state for CPU #2, the debugger may immediately make the state from the snapshot (X307) available to an instruction set simulator, and then use that simulator to perform reconstructive simulation over the region (X311) between the snapshot and the destination point. To reconstruct the state for CPU #3, memory reconstruction may be used over the entire region (X312) between the reconstruction point and the destination point.

Note that if a system contains only one CPU, the described register reconstruction process can be reduced to the following:

Starting from the destination point:
If the state of the one CPU is known, no reconstruction is required. Otherwise, proceed as follows:
Use a memory reconstruction technique, such as that described in the section "Reconstructing Memory", to move the state of memory back to the reconstruction point, such as the nearest point back in time at which there is a register state snapshot for the one CPU.
Store the state from the register state snapshot in the debugger, making it available for reconstructive simulation.
Use a technique (such as that described in the section "Reconstructive Simulation") to determine the target state at a point in time incrementally later.

Repeat the previous step until the destination point is reached.

Running Backwards/Forwards to Particular Destinations

In some embodiments, an improved backend can use the techniques described herein as a basis for performing various time traveling debugger operations, such as running back or forward to particular destinations. Some typical destinations are the next/previous point at which the instruction stored at a particular memory location is executed, the next/previous point at which a particular memory location or register is modified, or a particular event identified by a distinguishing characteristic, such as a particular timestamp.

In most cases, running to a particular destination may be accomplished in three steps: reconstructing memory forwards or backwards until the destination is detected (for example, using the technique described in the section "Reconstructing Memory"), determining the precise instruction at which to stop (for example, by using one of the techniques described herein), and then reconstructing register state at that point in time (for example, using the technique described in the section "Reconstructing Register State").

Debugging Single Threads of Execution and the Whole System

Figure 22:
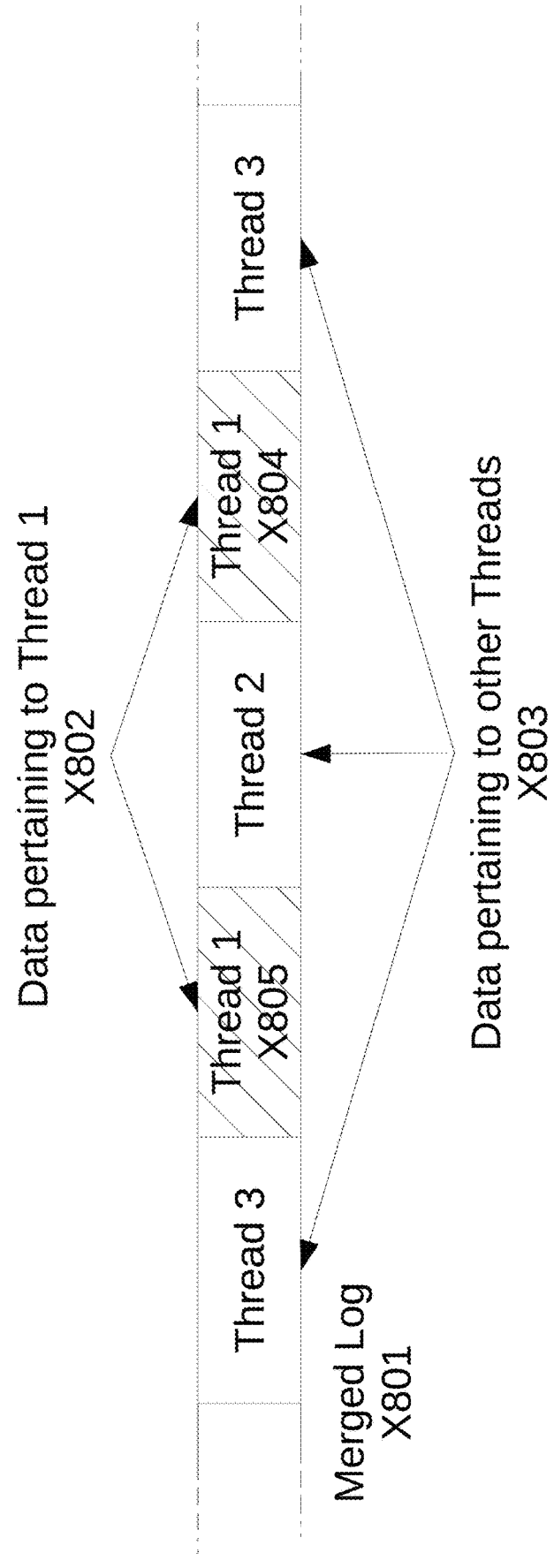
FIG. 22 illustrates utilizing log data for a particular thread from a merged log according to an embodiment.

In some embodiments, an improved backend operating on a log merged from several sources as described herein can perform operations on single threads of execution, a subset of the recorded threads of execution, or on the log as whole, as needed. An improved backend can operate on data from a single thread of execution by ignoring data not pertaining to that thread. For example, FIG. 22 depicts a merged log (X801) containing data pertaining to Thread 1 (X802) and data pertaining to other Threads (X803). The data may have been merged into a single log (X801) using one or more merging techniques, such as those described herein, so that they are not logically out of order in the merged log. In this example, a programmer could request a time traveling debugger perform an operation specific to Thread 1, such as a backstep operation beginning in a later section of log pertaining to Thread 1 (X804) and ending in an earlier section of log pertaining to Thread 1 (X805). For purposes of determining the starting point and ending point of the backstep operation, an improved backend may only need to consider data pertaining to Thread 1 (X802). However, in performing the backstep operation, an improved backend can apply memory reconstruction and register reconstruction using techniques such as those described herein, operating on a range of data from the merged log that can comprise data that does not pertain to Thread 1. As a result, performing an operation that only pertains to a single thread of execution, such as a backstep, can change the simulated state of other threads of execution, keeping the entire state of the system logically consistent.

Further, an improved backend's ability to operate on the system as a whole means it can perform run control operations whose end conditions are based on any conditions in the system as a whole. For example, a user wishing to debug a particular function can run back until any thread of execution, on any CPU executes that function. Or, a user can perform a backstep on one thread of execution, but specify that the backstep should be interrupted if any thread of execution on any CPU modifies a particular memory location. As such, a time traveling debugger employing an improved backend can enable a programmer to detect and debug race condition bugs, memory corruption bugs, and many other kinds of problems that are much more difficult or impossible to track down without an improved backend.

Generating a List of Instructions Executed

Using the capabilities described herein, an improved backend can, in some embodiments, perform some or all of the stepping and running operations typically required by a time traveling debugger. Such operations often operate on a machine instruction granularity, meaning that individual machine instructions executed by the CPUs in the system being debugged are considered distinct points in time for the purposes of performing such operations. An improved backend can represent the execution of an individual machine instruction in a merged log uniquely and unambiguously. An individual machine instruction can be represented uniquely and unambiguously by a location in the merged log and the address of the machine instruction in memory.

In some embodiments, given a unique representation of the execution of an individual machine instruction (which may be referred to as "the starting instruction"), an improved backend can determine the unique representation of the previous instruction executed by that thread of execution (which may be referred to as "the previous instruction"). By analyzing log data, an improved backend can determine if the starting instruction is the first instruction executed in the current basic block or not. If the starting instruction is not the first instruction executed in the current basic block, then the previous instruction is the previous instruction executed in the current basic block. If the starting instruction is the first instruction executed in the current basic block, then an improved backend can find the previous instruction by scanning back in the log for the previous basic block executed by the current thread of execution, and determining the last instruction executed in that basic block.

Figure 23A:
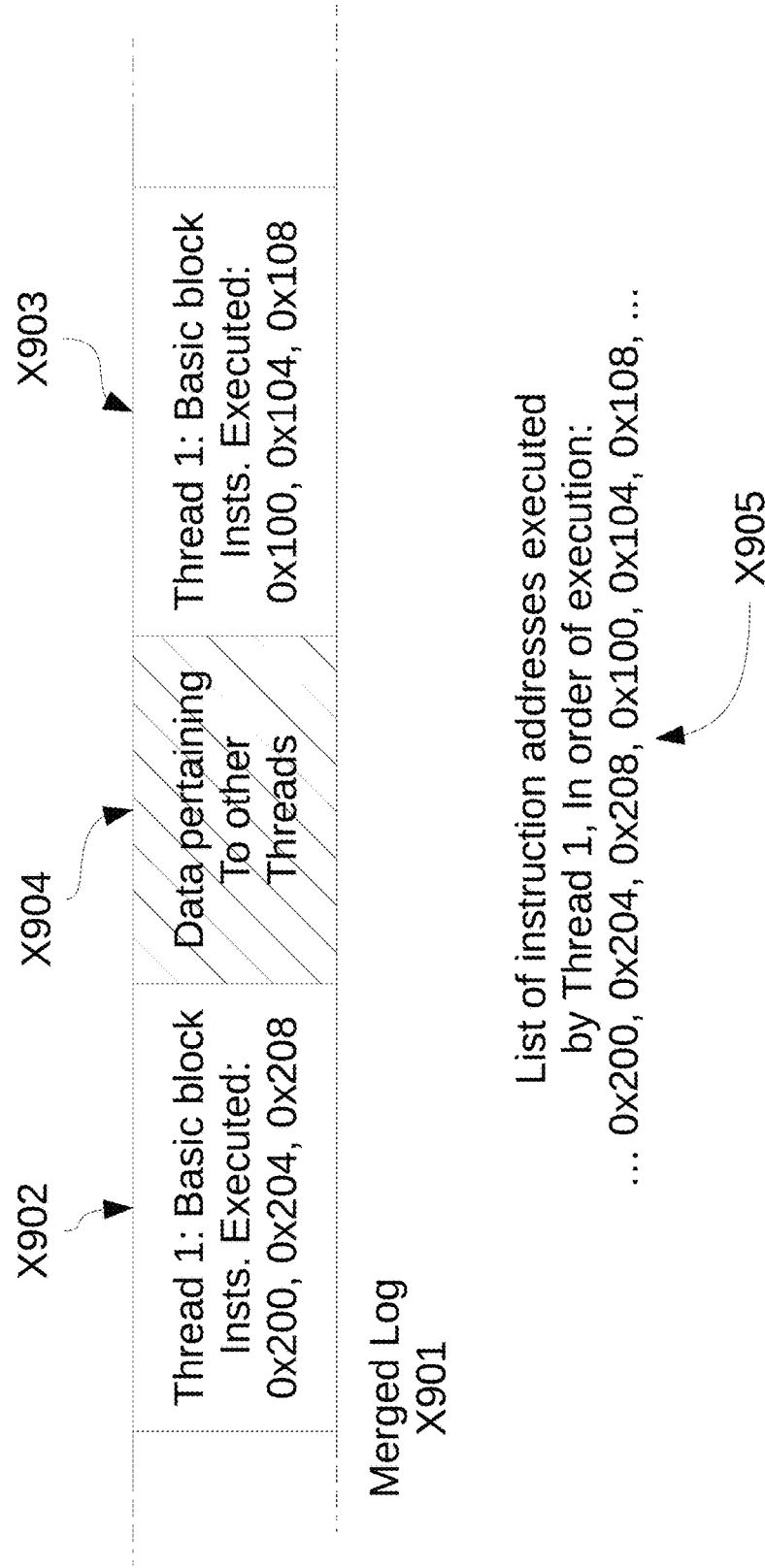
FIGS. 23A and 23B illustrate determining a list of instructions executed by a particular thread according to an embodiment.
Figure 23B:
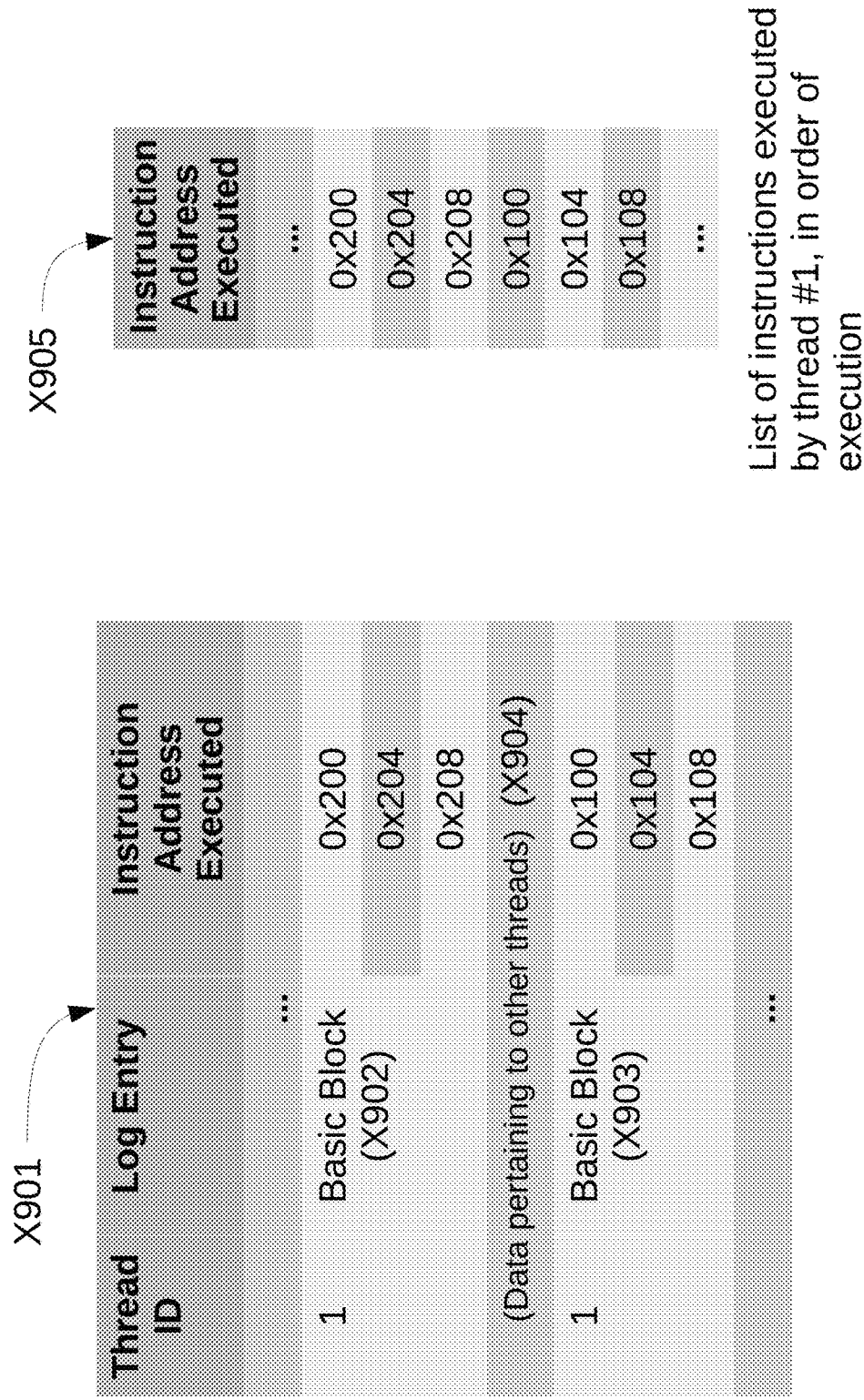

An example is depicted in FIGS. 23A and 23B. In the illustrated example, an excerpt of the merged log (X901) contains two basic blocks (X902 and X903) containing execution data for Thread 1, as well as data pertaining to other Threads (X904).

As an example, the starting instruction could be at address 0x104, which is uniquely identified by the address (0x104) and log position (X903). In this case, the starting instruction (0x104) is not the first instruction executed by the current basic block (X903), and therefore the previous instruction is the previous instruction (0x100) executed within the current basic block (X903). This previous instruction is uniquely identified by the address (0x100) and log position (X903).

As an example, the starting instruction could be at address 0x100, which is uniquely identified by the address (0x100) and log position (X903). In this case, the starting instruction (0x100) is the first instruction executed by the current basic block (X903). An improved backend can determine the previous instruction by scanning back in the log to find the previous basic block (X902) executed by the current thread of execution, and determining the last instruction (0x208) executed by that basic block (X902). This previous instruction is uniquely identified by the address (0x208) and log position (X902).

In some embodiments, given a unique representation of the execution of an individual machine instruction (which may be referred to as "the starting instruction"), an improved backend can determine the unique representation of the next instruction executed by that thread of execution (which may be referred to as "the next instruction"). By analyzing log data, an improved backend can determine if the starting instruction is the last instruction executed in the current basic block or not. If the starting instruction is not the last instruction executed in the current basic block, then the next instruction is the next instruction in the current basic block. If the starting instruction is the last instruction executed in the current basic block, then an improved backend can find the next instruction by scanning forward in the log for the next basic block executed by the current thread of execution, and determining the first instruction executed in that basic block.

As an example, referring to FIGS. 23A and 23B, the starting instruction could be at address 0x104, which is uniquely identified by the address (0x104) and log position (X903). In this case, the starting instruction (0x104) is not the last instruction executed by the current basic block (X903), and therefore the next instruction is the next instruction (0x108) executed within the current basic block (X903). This next instruction is uniquely identified by the address (0x108) and log position (X903).

As an example, the starting instruction could be at address 0x208, which is uniquely identified by the address (0x208) and log position (X902). In this case, the starting instruction (0x208) is the last instruction executed by the current basic block (X902). An improved backend can determine the next instruction by scanning forward in the log to find the next basic block (X903) executed by the current thread of execution, and determining the first instruction (0x100) executed by that basic block (X903). This next instruction is uniquely identified by the address (0x100) and log position (X903).

By repeating the above procedures for determining the next or previous instruction executed by a thread of execution represented in a merged log, an improved backend can produce a list of all instruction addresses executed by a thread of execution (X905) in a merged log. This is comparable to the execution data generated by a hardware trace probe, and as such, is sufficient to support the operations of a time traveling debugger, including forward and back steps, and running forward and back to breakpoints. In an embodiment, an improved backend can interface with a time traveling debugger by providing the debugger with such a list of instructions executed for each thread of execution.

Advanced Stepping, Running, and Breakpoint Support

While the capabilities described herein are sufficient for an improved backend to support a time traveling debugger, it can be more efficient for some embodiments of an improved backend to carry out some of the responsibilities associated with higher-level movements in time. A time traveling debugger can be configured to make use of these capabilities in the improved backend, thereby reducing its own workload.

In some embodiments, an improved backend can perform a back-single-instruction-step operation. Such an operation moves the simulated environment back in time to the point where a specified thread of execution is one machine instruction earlier in its execution. For example, an improved backend can perform a back-single-instruction-step operation using techniques described herein (or different techniques with similar effects.) For example, a back-single-instruction step can be effected by the following process:
  Determine the address and log position of the previous instruction executed by the specified thread of execution using the technique described herein for determining the previous instruction executed, or a similar technique;
  If the log position of the previous instruction is different from the current position, perform memory reconstruction to reach the log position of the previous instruction, using the technique described herein, or a similar technique;
  Perform register reconstruction, using the technique described herein, or a similar technique.

An improved backend can use a similar procedure to perform a forward-instruction-step by targeting the next instruction executed instead of the previous instruction executed according to some embodiments. Alternatively, in some embodiments, an improved backend can perform a forward-single-instruction-step by use of reconstructive simulation, as described herein, or a similar simulation technique. In cases like this, where multiple techniques are available to perform a given movement operation, an improved backend can be configured to select a technique based on the expected efficiency of the technique under the current circumstances, or based on other criteria.

In some embodiments, an improved backend can move forward or back in time until a particular condition is met. Such conditions can include, but are not limited to, executing an instruction at a specified address or range of addresses, possibly within a specified subset of the threads of execution within the system; encountering a memory modification targeting a specified memory address or set of addresses; encountering a particular logged event, or type of logged event, such as the creation of a new thread of execution; encountering the earliest or latest event in the log; encountering a logged event that occurred at a particular time, as indicated by a logged or synthesized timestamp; encountering some other condition that may be of interest to the programmer; or any more complex condition comprised of these or other conditions. Such movements can typically be accomplished by an improved backend by reconstructing memory forward or backward in the log, as appropriate, using the technique described herein or a similar technique, until a log location or executed instruction is encountered that satisfies the condition or conditions for stopping. An improved backend can then use the register reconstruction technique described herein, or a technique with a similar effect, to complete the movement, reconstructing the state of the system at the desired point in time.

In some embodiments, an improved backend can be augmented by logging or synthesizing additional log data, increasing the kinds of conditions under which a movement operation can stop. For example, an improved backend can log or synthesize information about which CPU registers are modified within each basic block. Such information can be used to stop movement when specified registers are modified.

Advanced Debugging Capabilities

In some embodiments, an improved backend can provide many powerful debug capabilities that are not possible with debuggers not employing an improved backend. For example, an improved backend can be used to detect bugs involving memory corruption and/or races that debuggers not employing an improved backend cannot detect as easily, or at all. Whereas debuggers not employing an improved backend are typically limited to detecting such bugs when they occur on a single CPU, an improved backend can detect and help programmers debug such bugs when they occur on a single CPU; or on multiple CPUs sharing memory, such as in an SMP configuration; or in a distributed environment in which CPUs communicate by message passing or by other means; or in complex systems involving one or more of the above, or other, configurations. For example, a race can occur when a memory location is read and/or written by multiple threads of execution. Such a race can lead to unpredictable system behavior, and other such hard-to-diagnose bugs.

As an example of such advanced debugging capabilities, consider a complex system in which memory becomes corrupted, causing a thread of execution within the system to fail. A programmer using a time traveling debugger employing an improved backend can configure the system to halt when the thread of execution fails; then instruct the improved backend to run backwards, halting the run when the corrupted memory is modified. A time traveling debugger without an improved backend would only be able to use this technique to find the source of the corruption if the corruption were caused by the thread of execution that failed; or perhaps by another thread of execution running on the same CPU as the thread that failed. A time traveling debugger employing an improved backend would be able to use this technique to find the source of the corruption if the corruption were caused by the thread of execution that failed, or by another thread of execution running on the same CPU as the thread that failed; or by a thread of execution running on a different CPU; or by the kernel, acting on its own, or acting on behalf of another thread of execution; or by another thread of execution that corrupts the memory by writing to a virtual memory address that, correctly or erroneously, maps to the same physical memory as the corrupted memory.

Callstack Depth Calculation and Exception Handling

In some embodiments, an improved backend can log or synthesize information about changes in callstack depth over the course of time, which, combined with the movement technique described herein or a similar technique, can allow an improved backend to implement stack-depth-sensitive movements. Examples of stack-depth-sensitive movements include, but are not limited to: source-level forward- and backward-stepping, which can step forward or back (respectively) between lines of source code at a fixed callstack depth; and forward- and back-step-up, which steps to the function that called the current function. For example, a source-level back-step can be implemented as a backwards movement that continues as long as the current instruction falls within the instruction range associated with the previous source line and the callstack depth remains unchanged.

In some embodiments, an entry block can be defined as the first basic block executed in a function as a result of a call to that function. An exit block can be defined as any basic block containing code that returns execution to a function's caller. An improved backend can log callstack depth information by instrumenting the entry and exit blocks of functions to log records indicating that the stack depth has increased and decreased, respectively. An improved backend can also synthesize such records after the data is gathered from the system being debugged, by scanning the log for basic block records, and determining if the associated basic blocks are entry blocks and/or exit blocks. Such determinations can be made in many ways, including disassembly and analysis of the program's machine instructions, or by consulting meta-information produced by the compiler and/or other tools used in the process of converting the program from source code to machine code. An improved backend can use logged or synthesized entry and exit records, or on-the-fly detection of entry and exit blocks, to recognize changes in callstack depth while interpreting the log.

On some CPU architectures, an improved backend can also gather information about the current stack depth by analyzing the stack pointer register (which may be referred to as "SP"). In some embodiments, an improved backend can determine the value of the SP using register state snapshots and register reconstruction techniques, such as those described herein, or other techniques for reconstructing CPU register values. In some embodiments, an improved backend can also comprise instrumentation that logs changes to the SP. In some embodiments, an improved backend can synthesize SP change records after log data is gathered from the system by techniques such as analyzing basic blocks for instructions that modify the SP, or by reading meta-information produced by the compiler or other tools used to convert source code to machine code.

Computer programs can use mechanisms for exiting several levels of callstack at once (which may be referred to as "exception handling mechanisms"), for example, the C++ try/catch mechanism and the C longjmp mechanism. While SP-based determination of callstack depth generally works in the presence of such exception handling mechanisms, instrumenting entry and exit blocks is not sufficient by itself to compute relative callstack depth accurately when multiple callstack levels can be exited simultaneously. In such cases, an improved backend can use additional instrumentation in the exception handling code that determines the number of callstack levels that are undone and logs the change accordingly.

An improved backend can, in some embodiments, use a combination of SP-based callstack depth determination, entry/exit-block-based callstack determination, or other callstack determination techniques to best suit the circumstances, or to make best use of the strengths and weaknesses of each approach.

Identifying Logged Events Uniquely

In certain implementations, it may be useful to be able to identify logged events uniquely. For example, a time traveling debugger, or other debug tool making use of data collected by an improved backend, may offer the programmer a graphical representation of the data. For example, such a debug tool can use data from an improved backend to display a timeline of interesting events that occurred during the system's execution. Through means of a user interface, such as by clicking within this representation, the programmer can indicate a desire to have the time traveling debugger travel to the corresponding point in time. To accomplish this, the time traveling debugger can specify to an improved backend the desired destination, and an improved backend can then reconstruct the state of the system at the desired time. To accomplish this, an improved backend can provide a unique identifier for every distinct point in time (which may be referred to as a "moment") in the log. Moments can include, but are not limited to, the execution of a single machine instruction, a single operating system event, or a single instance of communication between two threads of execution. In some embodiments, an improved backend can accept such identifiers as components of the conditions controlling the stopping points of movement operations, as described herein. In another example, an improved backend can assign a unique timestamp to each moment for use in a user interface that graphically displays the data collected by the improved backend. Such a user interface can be used for many things, including but not limited to: visualization and analysis of program performance; analysis of the timing characteristics of a system; and detection and analysis of race conditions and other concurrency-related aspects of a system. In some embodiments, the user interface is dynamically updated or changed in response to a user activity, such as selection of a point of time for reconstructing the state of the system. For instance, the user interface can be updated or changed to display the state of the memory and/or registers at the selected point of time (for example, values stored in the memory and/or registers). The state of the system can include the state of one or more CPUs of the system.

In an embodiment, an improved backend can identify each moment uniquely with an identifier comprising a linear measurement of time (which may be referred to as "timestamp") and (optionally) a CPU identifier. The CPU identifier, if included, can represent the CPU or thread of execution on which the event occurred or was logged, and as such, serve to disambiguate cases in which two different CPUs or threads of execution performed events simultaneously, within the precision the timestamps. A CPU identifier can be an integer, or something else, that uniquely identifies an execution unit, such as a CPU or core. For example, if the system being debugged comprises a single multi-core processor with 4 execution units, the units can be identified uniquely by the CPU identifiers 0, 1, 2, and 3. As another example, if the system being debugged comprises 20 separate computer systems communicating over a network, and each of those systems contains an 8-core CPU, then there are 8×20, or 160 total execution units, which can be assigned CPU identifiers 0 through 159. Log entries resulting from execution on a given execution unit can be tagged with the corresponding CPU identifier so an improved backend can reconstruct the history of the system's execution accurately.

In some embodiments, to assign a unique timestamp to each moment in a CPU's execution, an improved backend can use a linear counter, which is advanced at least one unit for each moment; or a measurement based on the actual time, as measured by a clock; or an estimated time; or a measurement based on the position of the moment in the log; or other linear measurements; or a combination of these or other linear measurements.

In certain implementations, a clock used by an improved backend for generating timestamps may not have sufficient precision or accuracy to assign a unique time to each moment, and it may not be feasible to log a timestamp for each moment. In such cases, an improved backend can employ an interpolation method, such as the following method, to ensure that each moment has a unique identifier. In an embodiment, an improved backend can synthesize unique timestamps (which may be referred to as "synthesized timestamps") based on values read from a clock (which may be referred to as "actual timestamps"). If the precision of the actual timestamps is insufficient to represent each moment uniquely, an improved backend can optionally append one or more bits of extra precision (which may be referred to as "sub-timestamp bits") to each actual timestamp. An improved backend can then use a process of timestamp interpolation to assign unique synthesized timestamp values to each moment that does not correspond to an actual timestamp. For purposes of interpolation, an improved backend can subdivide the time between actual timestamps evenly, or unevenly. Specifically, an improved backend can use estimates of the relative durations of logged events to subdivide an actual timestamp unevenly, such that the synthesized timestamps are reasonable estimates of the actual time of each moment. Such unevenly-assigned synthesized timestamps can be particularly useful if the timestamp data generated by the improved backend is used for visualization and analysis of software performance.

An example of an improved backend performing timestamp interpolation is in FIG. 25A. In the example, two moments (X11a.1 and X11a.7) have actual timestamps, perhaps recorded from a real-time clock and logged with the corresponding events. The remaining moments (X11a.2-X11a.6) do not have actual timestamps. To allow for interpolation, the improved backend in the example appends 12 sub-timestamp bits, represented by three hexadecimal 0's, to each actual timestamp. Finally, the improved backend in the example assigns synthesized timestamps to each of moments X11a.2-X11a.6 by evenly subdividing the time elapsed between moments X11a.1 and X11a.7.

An example of an improved backend performing timestamp interpolation with uneven subdivision is in FIG. 25B. This example is similar to that in FIG. 25A, except that in this example, the improved backend deems moments X11b.3 and X11b.4 to be of longer duration than the other moments (X11b.1-X11b.2 and X11b.5-X11b.7), and unevenly subdivides the elapsed time between moments X11b.1 and X11b.7 accordingly.

Bookmarks and Undo

If a user or programmer, through the course of using a time traveling debugger implemented with an improved backend, encounters an interesting moment, the improved backend may be instructed, for example at the user's request, to save an identifier corresponding to that moment (which may be referred to as a "bookmark"). In an embodiment, an improved backend is able to save the identifier and recall it later, allowing the user to return easily to the bookmarked moment. According to some embodiments, an improved backend can use such bookmarks as part of a condition for termination of a movement operation, as described herein. For example, an improved backend can be asked to perform a movement in time, reconstructing the state of the system being debugged at the moment represented by a specified bookmark. Programmers can use bookmarks for many purposes, including but not limited to: recording and revisiting interesting moments in the execution of a system; and communicating interesting moments to other programmers.

In some embodiments, an improved backend can be configured such that, automatically, it will maintain a history of moments visited over the course of one or more debugging sessions. Such a history allows an improved backend to provide an "undo" feature to a time traveling debugger, such that by means of a single keystroke, or other user interface command, the programmer can instruct the time traveling debugger to activate the improved backend's undo feature, returning it to the most recent moment visited. For example, a programmer can debug a system with a time traveling debugger employing an improved backend; the programmer accidentally issues a run command to the debugger, resulting in a movement to a point far from the time of interest; without an "undo" feature, it can be difficult for the programmer to return to the point of interest in the system; with an "undo" feature, the programmer can return with, for example, a single keystroke.

In an embodiment, successive applications of the undo feature can walk the system state represented in the improved backend back through the history of the programmer's debug session. A second keystroke or user interface command can perform a "redo" command, similarly walking the system state represented in the improved backend forward through the history of the programmer's debug session. In this way, an improved backend can allow a programmer to step through not only the execution history of the system being debugged, but the history of the debug session itself. As such an undo feature in a word processor allows a writer quickly and easily to undo mistakes made while editing a document, an undo feature in an improved backend can allow a programmer quickly and easily to undo mistakes made while debugging. As such an undo feature in a word processor allows a writer to move back and forth through the revision history of a document, an undo feature in an improved backend can allow a programmer to move back and forth through the moments visited during a debugging session. In some embodiments, activating one or more of the "undo" or "redo" features, causes the user interface to be dynamically updated or changed in response to the user selection of the "undo" or "redo" feature to update the history of the debugging session, such as, the history of moments.

Automated Analysis of Logged Data

In addition to supporting a time traveling debugger, in some implementations, an improved backend can perform (among other tasks) automated analysis of logged data, detecting many different kinds of bugs, even in cases where such bugs did not result in incorrect application behavior while the application was running. Such bugs may manifest as misbehavior of the application only under certain difficult-to-reproduce circumstances, or only very rarely, making them very difficult and time consuming to find and fix without the assistance of an improved backend.

In an embodiment, an improved backend can use automated analysis of logged data to detect race conditions in multi-threaded applications. An improved backend can perform such detection after the application or system has run, thus incurring no additional runtime performance penalty on the system. Such an improved backend collects data on memory accesses (reads and writes) and the use of synchronization primitives, such as semaphores and mutexes, and then analyzes the data, looking for unsafe use of shared memory and/or other shared resources. For example, two threads of execution writing to the same memory location without proper synchronization can indicate a race that could result in bugs that are difficult to find, and that only rarely result in misbehavior of the application. An improved backend can detect such races automatically, and report them to the programmer. Such a report can include useful information for fixing the bug, including but not limited to: the contended memory location or shared resource, the identities of the threads involved in the race, and the addresses of the instructions unsafely contending for the same shared resource. This is typically sufficient information for the programmer to fix the bug quickly.

In an embodiment, an improved backend can use automated analysis of logged data to detect memory accesses to stack and/or heap locations that fall outside of the corresponding stack frame or heap allocation. Such memory overflow bugs may only manifest as incorrect application behavior in rare circumstances, and therefore may be difficult to detect, find, and fix without an improved backend.

Many debuggers and development tools, including both time traveling debuggers and non-time-traveling debuggers, have features in which instrumentation (which may be referred to as "run-time error checking instrumentation") may be inserted manually or automatically into a computer program, to assist in the detection of various bugs. Such run-time error checking instrumentation can detect many problems, such as memory accesses through bad pointers, memory accesses that exceed array bounds, divide-by-zero errors, incorrect usage of memory allocation and deallocation libraries, etc. Such run-time error checking instrumentation adds overhead in program footprint and runtime performance. Such overhead can cause changes in an application's behavior, to the point where certain problems no longer manifest, or the application fails to work efficiently and/or correctly. In some embodiments, an improved backend can use automated analysis of logged data to perform the same checks, but without requiring additional instrumentation or overhead in program footprint and runtime performance beyond the overhead of the improved backend instrumentation. An improved backend, therefore, can subsume the functionality of run-time error checking instrumentation, but in a much more versatile way. An improved backend can perform a wide variety of checks on a single body of collected data, without requiring the application program to be recompiled or rerun. An improved backend can also perform checks that, due to computation required or other factors, would be too disruptive or onerous to perform at runtime.

In certain implementations, an improved backend can make the results of automated analysis available to a debugger and/or other tools and user-interfaces. In an embodiment, bugs, potential bugs, races, and other interesting occurrences discovered by an improved backend during automated analysis can be treated as conditions for halting an improved backend's reconstruction of the past state of the system, making it easy for a programmer to step or run through the logged history of the system, stopping at occurrences of latent bugs, or other such interesting occurrences that could be much harder to find without an improved backend.

In an embodiment, bugs, potential bugs, races, and other interesting occurrences discovered by an improved backend during automated analysis can be displayed in a graphical form, such that the user can click on individual occurrences (or select them by means of another user interface), resulting in one or more of several actions, including but not limited to: displaying information about the occurrence, and/or causing the improved backend to reconstruct the state of the target at the time of the occurrence, so the user can examine such state in the debugger. Such a user interface, which can be dynamically updated or changed in response to a user activity or selection, can allow the user to navigate quickly through any bugs, potential bugs, or other interesting occurrences discovered by an improved backend during automated analysis, and quickly glean information about their causes and/or the frequencies and patterns of their occurrences. In an embodiment, such a user interface can display the results of automated analysis on a graph, chart, table, or other form of visualization, with a time axis. Such a display can make certain time-based patterns very evident that would otherwise be difficult to detect. In an embodiment, the user interface for displaying these events can provide the means to hide, reorder, dismiss, and/or otherwise organize and control the events displayed, making it easier for the user to focus on the events of most immediate interest.

Code Coverage and Profiling Analysis

In some embodiments, analysis of data logged by an improved backend, as described herein, can be used to generate code coverage data for the execution represented in the log. Code coverage data can comprise information about the subset of executable code within the software program that was executed while the program was running. Code coverage data can be generated by scanning the log produced by the improved backend, and aggregating the basic block execution information, producing a list of each basic block (or portion thereof) executed during the time represented in the log. This list can then be compared against a list of all executable code within the program, or a subset of code within the program that interests the programmer (for example, just the user-written code, omitting system and/or third-party libraries.) In an embodiment, the resulting code coverage data can be displayed within a table. In an embodiment, the resulting code coverage data can be presented in conjunction with the source code, for example, by highlighting unexecuted lines of code in a source code editing window, or in a source-level debugger, or in other ways. In an embodiment, the techniques described herein can be used to generate code coverage information while running a test suite, to determine how well the test suite covers the execution paths within the software program. In an embodiment the resulting code coverage data can be used for Modified Condition/Decision Coverage analysis ("MC/DC analysis") or other such software testing analyses. In an embodiment, the resulting code coverage data can be used for many kinds of software certifications requiring code coverage analysis, including but not limited to DO-178B ("Software Considerations in Airborne Systems and Equipment") certification, IEC 61508 ("Functional Safety") certification, ISO/IEC 15408 ("Common Criteria") certification, and others. Generating code coverage data from data logged by an improved backend is advantageous because no additional instrumentation is required to generate code coverage data beyond what is already required by the improved backend, and there is no need to resort to imprecise techniques such as periodic sampling to generate the code coverage data.

In certain implementations, analysis of data logged by an improved backend, as described herein, can be used to generate profiling data for the execution represented in the log. Such profiling data can include, but is not limited to, information about how often each basic block is executed and/or information about how often a given memory address is accessed. Such information can be generated by scanning the produced by an improved backend and aggregating the data by producing a count of each basic block (or portion thereof) executed, and/or a count of each memory address written. In an embodiment, such profiling data can be presented to the user in tables, and/or overlayed on a memory map (for example, by color-coding the memory addresses written most frequently), and/or overlayed on a representation of the source code (for example, by displaying the number of times each source line is executed, or the percentage of overall execution time represented by each source line, within a source code editor, source-level debugger, or in other ways.) Such profiling data may be used by a programmer to improve the program's performance, such as by streamlining the most heavily-executed sections of code, or by moving the most frequently accessed sections of code and data to sections of memory where the speed of the memory and/or cache effects are most beneficial to the execution speed of the program. Generating profiling data from data logged by an improved backend is advantageous because no additional instrumentation is required to generate the profiling data, and there is no need to resort to imprecise techniques such as periodic sampling to generate the profiling data.

In an embodiment, code coverage and/or profiling data generated as described herein can be used in manual and/or automated regression testing, to verify various metrics including but not limited to software performance and test coverage have not degraded over time.

Unknown Values

While in most cases, certain implementations of an improved backend can reconstruct the contents of memory and registers accurately, there can be cases in which reconstruction of data values is not possible. For example, there are cases in which an improved backend may not log the preimage value for a memory change, for example when storing to side effect volatile memory. Also, automated analysis of logged data, or other such analysis techniques, may result in situations in which a memory or register value is unknown because the improved backend cannot be certain of the correct order of logged events. Such situations generally arise due to race conditions in the software being analyzed, when such software is run in SMP environments, but other causes are possible as well. Without special handling for such cases, it would be possible for a debugger to report the contents of memory or registers incorrectly to the programmer, leading to confusion and difficulty finding and fixing bugs.

In an embodiment, an improved backend treats unknown memory and/or register values differently from known values. When such unknown values are detected, an improved backend can track which memory locations and/or register values are unknown. An improved backend can report unknown memory locations and/or register values to the debugger, such that they are displayed differently to the programmer, allowing the programmer to distinguish them from known values.

In an embodiment, an improved backend operating on unknown values, for example, when performing reconstructive simulation (described herein), can propagate the unknown-ness to the results of computations. For example, an improved backend simulating an instruction that adds the values of two registers and places the result in a third register can mark the third register's value as unknown if either or both of the addends is unknown. Similarly, an improved backend that simulates loading a value from memory into a register can mark the register's value as unknown if the memory value being loaded is unknown. Using such a propagation technique, an improved backend can guarantee that it will only report a value as "known" if it is actually known.

In an embodiment, an improved backend can be aware of cases in which the unknown state of a value should not be propagated. For example, an improved backend simulating an instruction that subtracts the values in two registers may mark the result as "known" even if the values being subtracted are unknown, if the subtracted values are known to be the same, as such a subtraction always results in a zero result.

In an embodiment, an improved backend can mark unknown values as known when their values become known. For example, when the value of a register can be determined from a register state snapshot, an improved backend can mark the value of that register as known. Similarly, when an instruction is simulated that overwrites the contents of a register with a known value, the contents of the register can be marked as known, even if the value was previously unknown. Using such a technique, an improved backend can guarantee that it will only report a value as "unknown" if it is actually unknown. In typical cases, register state snapshots and memory store records containing pre-images can occur frequently, so the duration that a given value remains unknown within the logged history of an application or system is typically limited.

In an embodiment, unknown memory and/or register values are often caused by races in the program or system being debugged, and as such, can be a useful indication to a programmer that a latent bug is present. Expressed another way, if an improved backend cannot determine, in an embodiment, the correct value of a memory location or register, it can indicate that the computer system and software are constructed in such a way that the programmer cannot be sure of the correct value either, indicating a flaw in the system that the programmer most likely would want to correct. The ability of an improved backend to detect such cases automatically, and express them to the programmer, is therefore an extremely valuable debugging tool. In an embodiment, an improved backend can be configured to show the programmer details of such race conditions, either directly or by interfacing with a time traveling debugger or other such user interface, which can be dynamically updated or changed in response to user activity or selection. Details of race conditions detected and shown to the programmer can include, but are not limited to: the locations in the source code of the conflicting accesses to the same memory location, the time or times during the logged execution at which such conflicts occurred, and the possible values of the memory location during and after each such conflict.

Example Use Case: SMP Race Condition

In some embodiments, an improved backend, as described herein, when used in conjunction with a time traveling debugger and/or other debugging and analysis tools, can allow programmers to diagnose and debug problems in complex computer systems in ways that are not otherwise possible. Through use of the systems and techniques described herein, difficult bugs that might otherwise take weeks or months to find and fix, or that might never be fixed at all, can typically be resolved in a few hours or days.

For example, a common kind of bug is a race condition in which accesses to a memory location shared by concurrent threads of execution are not adequately guarded, resulting in various kinds of erratic behavior. With the increasing use of multicore CPUs (for example, dual-core, quad-core, etc.,) such bugs are becoming increasingly common, particularly as legacy code written for single-core CPUs is ported to more modern CPUs. Traditional debugging techniques offer little help in tracking down such bugs, leaving programmers little recourse but to analyze the code carefully, a process that can take weeks or longer, and may never yield results.

An example of a race condition appears in FIGS. 27A-D. In the example, a counter ("counter") is incremented twice. The initial value of "counter" is 4, so the final value of "counter" should be 6, reflecting two successful increment operations. Each increment operation consists of a read operation (for example, X14a-read1) and a write operation (for example, X14a-write1).

In the single core example (FIG. 27A), both increment operations are executed by a single core (X14a-core0), so no race occurs. The increment operations (X14a-inc1, X14a-inc2) take place sequentially, and the underlying read and write operations (X14a-read1, X14a-write1, X14a-read2, X14a-write2) also occur in strict sequence.

Figure 27A:
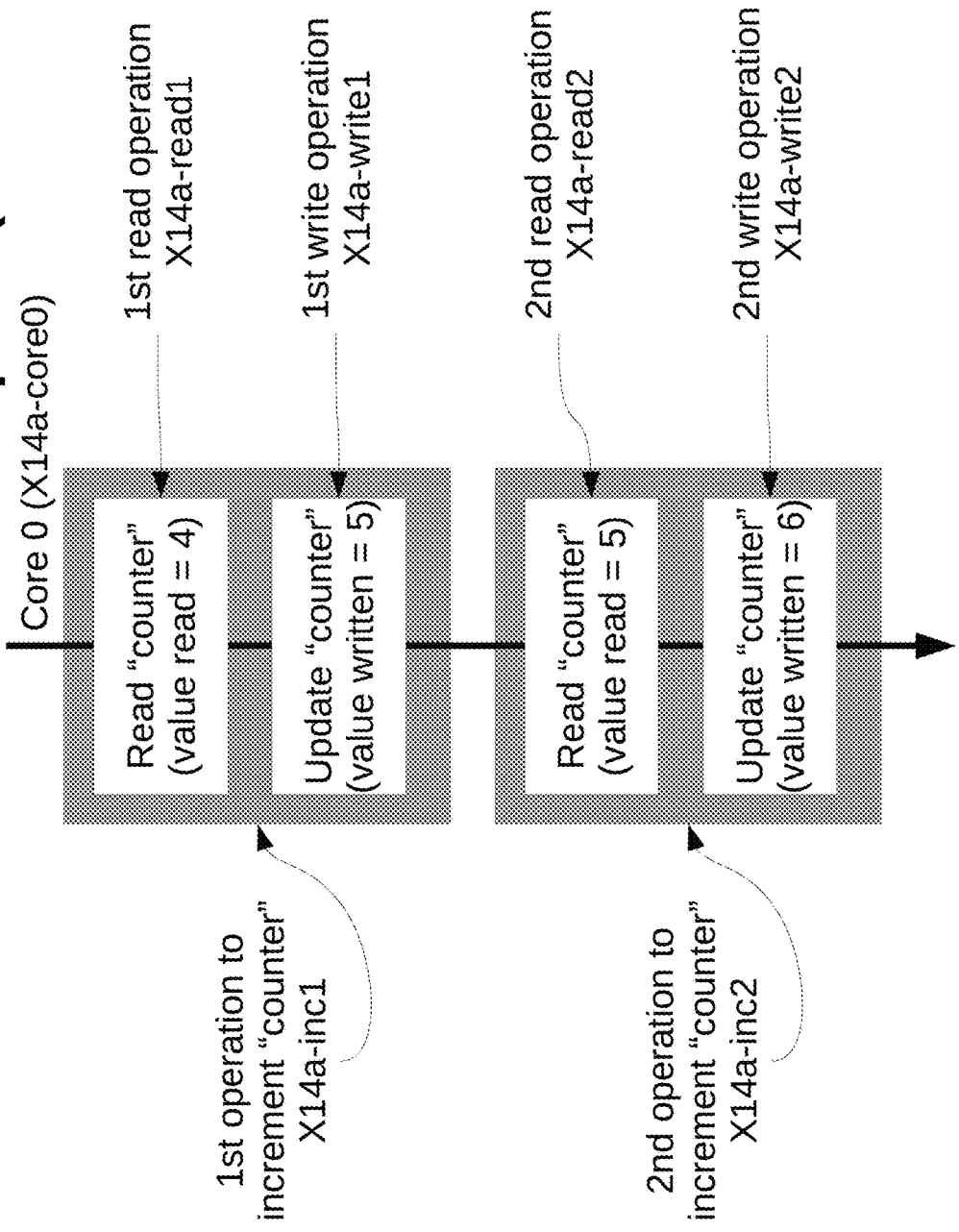
FIGS. 27A, 27B, 27C, and 27D illustrate race conditions in a SMP system according to some embodiments.
Figure 27B:
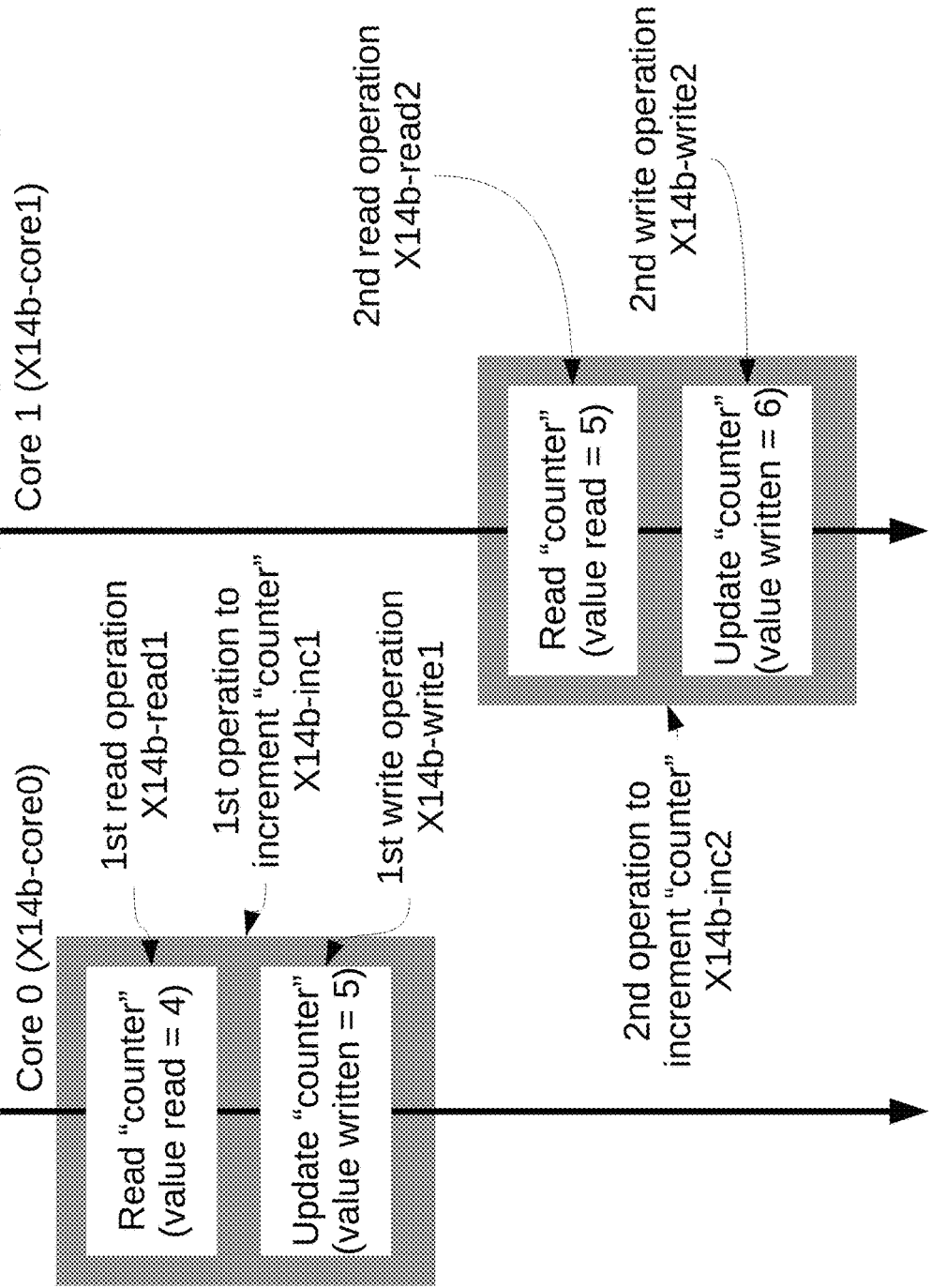

FIG. 27B shows the same pair of increments running in a dual-core SMP environment. The first increment operation (X14b-inc1) takes place on Core 0 (X14b-core0) and the second operation (X14b-inc2) takes place on Core 1 (X14b-core1). In this case, we are lucky, and the two increment operations (X14b-inc1 and X14b-inc2) are disjoint in time, and execute sequentially. The final value of "counter" is 6, as expected.

Figure 27C:
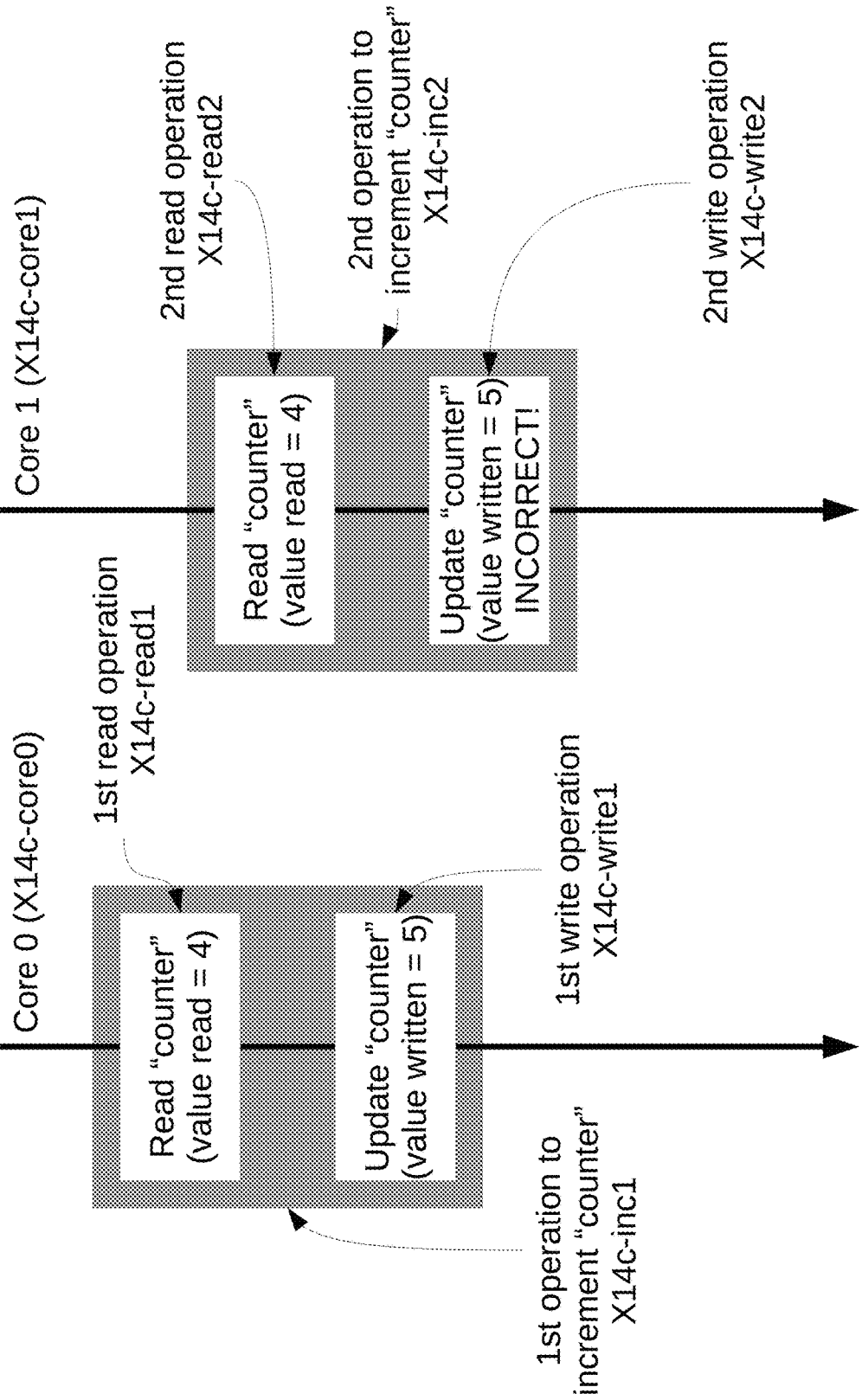

FIG. 27C is the same as FIG. 27B, except we are unlucky and the two increment operations (X14c-inc1, X14c-inc2) overlap in time. The second increment operation (X14c-inc2) performs its read operation (X14c-read2) before the first increment operation (X14c-inc1) is complete, and specifically before the first write operation (X14c-write1) has occurred. As a result, the value read in the second read operation (X14c-read2) is 4 instead of 5. When the second write operation occurs (X14c-write2), the final value written to "counter" is 5 instead of 6. Because of the race condition, the value of "counter" advances from 4 to 5 instead of from 4 to 6, in spite of the execution of two increment operations.

Problems such as those demonstrated in FIG. 27C may only occur erratically, as they are dependent on the relative timing of the increment operations (X14c-inc1, X14c-inc2) on the two cores (X14c-core0, X14c-core1). Further, such bugs can be very difficult for a programmer to identify by reading the source code, as the source code looks correct, showing two increment operations; it is not obvious why two increment operations would cause "counter" to only advance by 1. Without an improved backend, time traveling debuggers are not very useful for finding and fixing this kind of bug, as they typically require running the program on a single core (as shown in FIG. 27A), preventing the problem from occurring.

In certain implementations, a programmer using a time traveling debugger and/or other visualization tools with an improved backend (described herein) can use one or more of several techniques to find quickly and easily a bug such as shown in FIG. 27C. For example, a programmer suspecting a race condition can use automated analysis of logged data (described herein), and the improved backend will detect that the first and second write operations (X14c-write1, X14c-write2) are not properly guarded, and inform the programmer. Note that the automated analysis technique will identify the potential problem, even if the actual execution resembles FIG. 27B, in which the correct final value is produced.

This automated analysis technique for finding race conditions can be extremely powerful. The vast majority of debuggers in common use assist a programmer who notices a problem with a software application, or is informed about a problem by a user, to find the cause of the problem. In contrast, this automated analysis technique can find problems with a software application that the programmer and the users of the program have not yet noticed, and/or that have not yet manifest as incorrect behavior. Due to variations in input timing, cache behavior, CPU behavior, interrupt timing, and/or other hard-to-reproduce factors, such potential bugs may only manifest as incorrect behavior one time in 100, one time in 1,000, one time in 1,000,000, or even less frequently, and at seemingly random times. In released software products, or products reliant on software to operate correctly, such as cellular phones, automobile engines, avionics devices, etc., such bugs can result in erratic behavior that isn't noticed until the product is in widespread use, which can be very costly both to the product developer's reputation and in the effort it takes to find and patch the bug. Such expenses, which can range into the millions of dollars or more, and can result in unrecoverable loss of market share, can be avoided entirely by use of the automated analysis technique for finding race conditions, thus making such a debugging feature extremely valuable to software developers.

There are other ways in which, according to some embodiments, an improved backend can be valuable to a programmer in tracking down this sort of race condition. In a second example, a programmer noting a suspicious value of "counter" can use a time traveling debugger equipped with an improved backend to run back in time through the execution of the program, stopping at points in time when the value of "counter" is modified, and displaying the reconstructed value of "counter" at those points in time. The programmer will notice that two operations adjacent in time that are supposed to increment "counter" instead both set its value to 5, indicating that the increment operations may be interfering with one another.

In a third example, a programmer can use embodiments of an improved backend to provide data to a graphical tool that graphs the value of "counter" over time and highlights points at which "counter" is modified. In such a tool, the programmer can easily see that two increment operations occur nearly simultaneously, and the value of "counter" only changes by 1. If the programmer wishes to examine the operation of the program more closely, clicking on one of the increment operations can cause a time traveling debugger, equipped with an improved backend, to display the activities of both cores at the selected point in time.

All three of these examples rely on the unique capabilities of an improved backend according to some embodiments. Whereas a time traveling debugger without an improved backend generally cannot debug problems arising from simultaneous execution at all, an improved backend can do so, allowing for the detection and debugging of race conditions, such as those described herein. Using techniques such as those described herein, enabled by certain implementations of an improved backend, the programmer can identify the cause of the problem in a matter of minutes, whereas without an improved backend, a programmer would be forced to rely on much less efficient techniques, or outright guesswork, to identify the problem, which could take days, weeks, or longer, often making it impractical or economically infeasible to fix the problem at all.

Figure 27D:
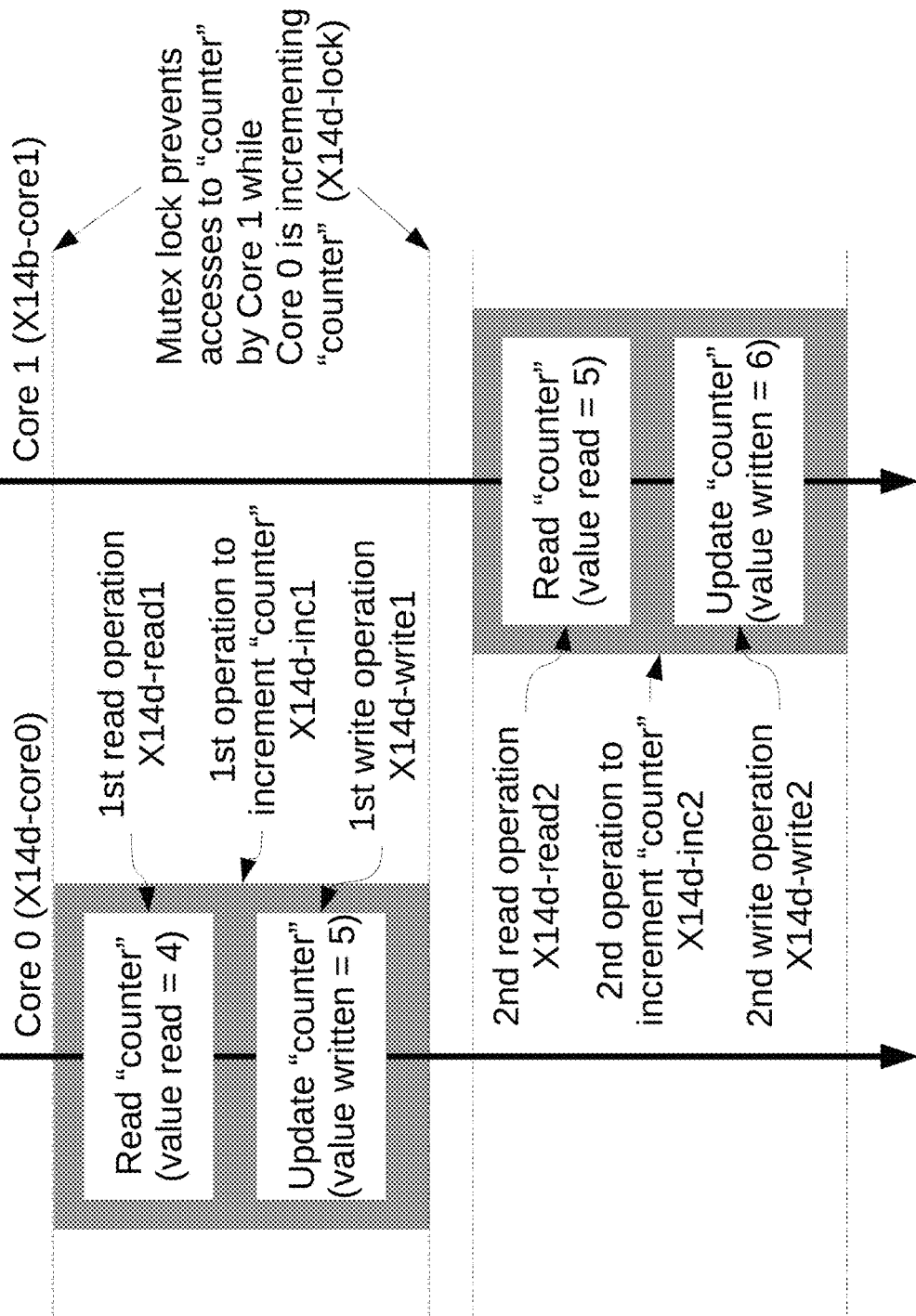

Once the programmer has identified the cause of the race, the problem is relatively easy to fix, as shown in FIG. 27D. Applying a synchronization primitive, such as wrapping the increment operations (X14d-inc1, X14d-inc2) in a mutex lock (X14d-lock), forces the underlying read and write operations (X14d-read1, X14d-write1, X14d-read2, X14d-write2) to occur in strict sequence in all cases, resulting in the correct final value of 6 for "counter", regardless of the relative timing of the cores (X14d-core0, X14d-core1).

Other Variations

The disclosure herein provides methods, systems, and devices for a vertically integrated instrumentation and trace reconstruction system that dramatically improves the functioning, speed and operation of debugger computer technology as compared to traditional debuggers. In an embodiment, the systems and methods disclosed herein can be configured to effect an improvement in the software debugger technical field by reducing in some cases by a factor of 10 or more the time to present a replay and/or a reconstruction of events that occurred during the execution of a target program.

In an embodiment, the systems and methods disclosed herein can be configured to generate trace data having no or substantially no gaps or missing data in the trace data logs. By comparison, traditional debugger systems will generally generate trace data log files having gaps or missing elements or data in the trace data especially during a sequence of instructions in the target program that generates a significant number of memory accesses that make it difficult for the system to record trace data to the trace data log file. To achieve the foregoing improvements in the technical field of software debuggers, the systems and methods disclosed herein employ a variety of features, techniques, and methodologies.

As new high technologies require ever more complicated software programs to operate, the need for embodiments of software debugging systems and methods as disclosed herein becomes increasingly important. For example, smartphones increasingly require complicated software to run the various system components in the phone. In general, a typical smartphone requires millions of lines of computer code that is in some cases developed by large teams of programmers. As the number of lines of code increases, and as more programmers are involved, the number of bugs in software code also increases. In many instances, these software bugs are increasingly more complex to resolve. For example, some software bugs arise intermittently and/or infrequently, meaning once a day, once a week, once a month, once a year, or less frequently.

Traditional software debugging programs can often be cumbersome and inefficient when trying to debug software wherein the bug only arises intermittently and/or infrequently. In contrast, software bugs that are "reproducible" are in general easier for computer programmers to identify and/or fix. As used herein, the term "reproducible bug" generally refers to a bug that manifests itself in the same way every time a program is executed with the same user-controllable input. In general, reproducible bugs often occur in a predictable manner during the execution of a program whereas software bugs that arise infrequently generally do not occur in such a predictable manner during the execution of a program.

In an embodiment, the system disclosed herein is configured to generate trace data and to capture all such trace data being generated efficiently as the target computer program is being executed without using a hardware trace port, detector, or probe. In an embodiment, the system is configured to more efficiently generate trace data by saving to storage only certain data elements relating to the target program as it is being executed. In contrast to traditional debugger programs that collect unnecessary data elements and/or omit valuable data elements relating to the computer program, the system can be configured to more efficiently generate the necessary trace data to reconstruct the state of the target computer program.

In an embodiment, for example while merging log data from multiple cores in multicore system, if an improved backend determines that the order of trace data is ambiguous, it can indicate a possible bug in the target program. For example, ambiguity in the order can be due to the target program executing tasks, such as one or more computer program instructions, whose order of completion is not predictable, and whose output depends on the order of completion. This is sometimes referred to as a hazard, which can potentially lead to incorrect execution. There generally can be three types of hazards: data hazards due to modification of data by different instructions, control hazards due to ambiguities in a branch target, and structural hazards due to memory being simultaneously accessed by different instructions. Hazards can occur in single-core and multi-core systems. In multi-core systems, hazards can occur due to two or more different cores executing instructions simultaneously.

The operating system is typically managing a plurality of threads of execution that are coming in and out of existence. With traditional software debugger systems, the data relating to threads of execution that are coming in and out of existence is generally not collected. In contrast, embodiments of the systems and methods disclosed herein can be configured to work in conjunction with a specialized operating system that is configured to collect all the trace data associated with thread creation and destruction. An operating system capable of executing multiple threads of execution can be referred to as a multi-task operating system. Embodiments of the systems and methods disclosed herein can be used to debug any of the tasks from a plurality of tasks being executed by the multi-task operating system. Debugging is not limited to the current thread of execution being executed; one or more of the threads of execution that have been executed by the operating system can be debugged. In an embodiment, in case a target system is a multi-processor or multi-core system executing more than one thread of execution in parallel (or at the same time or substantially at the same time), multiple currently executed or previously executed tasks can be debugged. Although for ease of understanding, the present disclosure may refer to debugging a computer program being currently executed by the operating system as a thread of execution (or a plurality of threads of execution), a person of ordinary skill in the art will understand that embodiments of the disclosed systems and methods can be used for debugging any one or multiple threads of execution being executed by a multi-task operating system.

In an embodiment, the system can be configured to take trace log data and decode it such that the system can be configured to tell a user the state of the target computer system at any point in time prior to stopping the execution of the target program. Reconstructing the state of the target computer system can in turn facilitate the programmer's determination of what the target program was doing at that point of time, enabling identification and repair of one or more errors encountered during the execution.

In an embodiment, when a processor and/or core executes the instrumentation code, more code is being executed than otherwise would be executed, and consequently there is an unavoidable delay and/or slowdown of in the operation/function of the target program. After the debugging process has been completed, the system can be configured to compile the target program without having to insert instrumentation code into the target program (or instrumentation code can be disabled or removed during linking), thereby allowing the target program to operate at peak performance. As is explained herein, one or more instrumentation instructions can be stripped during linking, which can result in the target computer program executing more efficiently (for example, faster) than if full instrumentation is retained. In contrast, traditional debugging systems generally cannot control the speed of operation of the target program while it is in execution mode (and in such systems that can stall the computer processing unit ("CPU") to wait for trace data, such systems do not always properly work or can be unpredictable). Accordingly, traditional debugging systems can lose valuable trace data and create gaps in the trace data log files wherein such gaps prevent or make difficult the replay and/or reconstruction of the events leading up to a halting condition of the target program, which can include one or more of a crash, breakpoint, access to particular memory address, user request to halt execution, and the like. When the operating system cannot control the speed of the target program, the processor of the computer can at times get too busy to store trace data into a log file, which in turn creates gaps in the trace log file.

It can be very disruptive to a programmer that is attempting to debug a target program if the programmer has to wait 20 minutes or more in order to replay and/or reconstruct the events of a target program. If the programmer has collected more data, then the wait time may be even longer, because traditional software debugging programs have a decoding time that is proportional to the amount of trace data collected. For example, a programmer can lose his train of thought in debugging a target program when a programmer has to periodically wait over 20 minutes in order to simply replay and/or reconstruct the events leading up to the crash in the target program. Accordingly, it can be advantageous for a programmer to utilize a system that can be configured to replay and/or reconstruct the events of a target program within a few seconds or minutes. In an embodiment, the system is configured to replay and/or efficiently reconstruct the events leading up to a crash in the target program by analyzing the trace data starting from the end, meaning starting with the trace data associated with the event that occurred just prior to the crash of the target program.

In an embodiment, the compiler is configured to generate instrumentation based on different components, functions, events, or the like identified in the source code of a target program. In an embodiment, the compiler is configured to insert instrumentation based on the identification of basic blocks in the target program. In some cases, a basic block is a set or sequence of instructions with one entry point and one exit point. That is, a basic block typically may have no incoming branches except for entry into the block and no outgoing branches except for exit out of the block. In an embodiment, a sequence of instructions forms a basic block provided that the following two conditions are met: (i) the instruction in each position always executes before all subsequent instructions and (ii) no other instruction executes between two instructions in the sequence of instructions. In an embodiment, for example in systems using superscalar CPUs that can be configured to execute many instructions simultaneously, a sequence of instructions can form a basic block when the instruction in each position executes simultaneously with one or more subsequent instructions and/or when one or more instructions are executed between two instructions in the sequence of instructions. In an embodiment, the output and/or result of the instructions are stored or applied or combined in the order or sequence of the instructions in the basic block even though such instructions may be processed simultaneously, such as in certain system environments configured with a superscalar CPU.

Timestamp Interpolation

In an embodiment, timestamps are not inserted at the time of entry into the basic block or exit from the basic block. Instead, timestamps are inserted for other operations, such as FEE instrumentation (explained herein) and communicating with the operating system, among others. Interpolation can be used to determine execution time of one or more instructions or a plurality of instructions. For example, the system can estimate or measure the average execution time of a set of instructions, such as 10 instructions, and this average execution time can be used to determine the execution time of a particular plurality of instructions for which specific timestamps were not inserted. In particular, the average execution time of an instruction can be calculated by finding two logged timestamps, counting the number of instructions executed between the points at which those two timestamps were logged, and dividing the elapsed time between the timestamps by the total number of instructions executed.

Function Entry and Exit Logging

In an embodiment, the compiler is configured to insert instrumentation based upon entering a function and exiting a function. The foregoing may be called FEE instrumentation, which stands for "Function Entry and Exit" instrumentation. As used herein, the term function generally refers to a named section of a software program or a group of instructions that performs a specific task. FEE instrumentation can provide an accurate estimate of the amount of time used for executing a function. This information can be helpful not just for debugging, but also for optimization, such as reducing the amount of time and/or resources spent executing a particular function. For example, information based on FEE instrumentation can be used to present the call stack visually. In an embodiment, the instrumentation can insert timestamps at the time of entry into the function and exit from the function. In an embodiment, interpolation can be used to determine execution time of one or more instructions, such as one or more instructions of a function that are between entry and exit points, whose executions occur between, for example, a pair of timestamps. Interpolation can be linear, weighted, non-linear, and the like, as is described herein. In an embodiment, one or more timestamps can be additionally or alternatively inserted into trace data after entry into a function but prior to exit from the function. FEE instrumentation can be used instead of or in combination with the basic block instrumentation. In an embodiment, the compiler can be configured to skip instrumenting a function whose execution can be determined from the execution of another function.

In certain cases, when FEE instrumentation is used in isolation, it can produce inaccurate results. The timestamp logged at function entry can be slightly late, in that the instrumentation used to record the timestamp can occur several instructions after the actual function entry. Similarly, the timestamp logged at function exit can be slightly early, in that there can be several instructions between the recording of the timestamp and the actual function exit. Such inaccuracies, if not corrected, can lead to many problems, including misleading analysis of the performance of the software program. Such misleading data can make it much harder for a programmer to maximize the performance of the software program.

In an embodiment, timestamp interpolation (described herein) is used in conjunction with FEE instrumentation to correct these inaccuracies. Timestamp interpolation can be used to determine timestamps more accurately representing the first and last instructions of a function. For example, if the timestamp at function entry is calculated 11 instructions after the actual function entry, then the timestamp can be adjusted by subtracting the average time taken to execute 11 instructions, resulting in a more accurate function entry timestamp. A similar adjustment can be made to function exit timestamps, by adding to them the average time to execute an instruction multiplied by the number of instructions executed between the point at which the function exit timestamp was determined, and the actual end of the function. These interpolated timestamps can then be used in place of the timestamps logged by the FEE instrumentation when presenting information about function entry and exit to the programmer, or when using the FEE data in other ways. Using timestamp interpolation to correct inaccuracies in FEE data can enable much more accurate analysis of program performance.

System Architecture

FIG. 1A illustrates a block diagram of a general hardware and software architecture comprising a debugger and a compiler. Typical debugger systems include a host system 118 that has a compiler and linker program 108 for generating an executable computer program. The debugger program includes a log downloader 112 which is configured to collect trace data and store such data in a log file during or after execution of the computer program. In general, the compiler program and linker 108 generate the target program 114 from programmer-written source code (not shown). The compiler program and linker 108 can also generate data files (not shown) used by the debugger program 110, containing information that aids in the operation of the debugger program 110. In general, the debugger program 110 can interact with elements of the target system 120 in order to allow the user to debug a target program 114. In many instances, traditional debugger systems comprise an interface manager 116, which can be configured to provide a graphical user interface for a user to interact with the debugging program 110. The compiler and linker program 108, debugger program 110, log downloader 112, and interface manager 116 are executed by the host system 118, which interfaces with a target system 120 on which the computer program is executed, for example, as a target program 114 through a debug connection 117. The target system includes hardware 102 that runs an operating system 104, which can be different from the hardware and operating system (not shown) of the host system 118. The operating system 104 is system software that generally manages computer hardware and software resources. The operating system 104 works in conjunction with system libraries 106 in order to provide common services for computer programs, such as the target program 114. The operating system 104 can include an agent 122 that is configured to provide debugging data to the debugger program 110. The debugger program 110 can provide instructions and data to the agent 122.

Figure 1B:
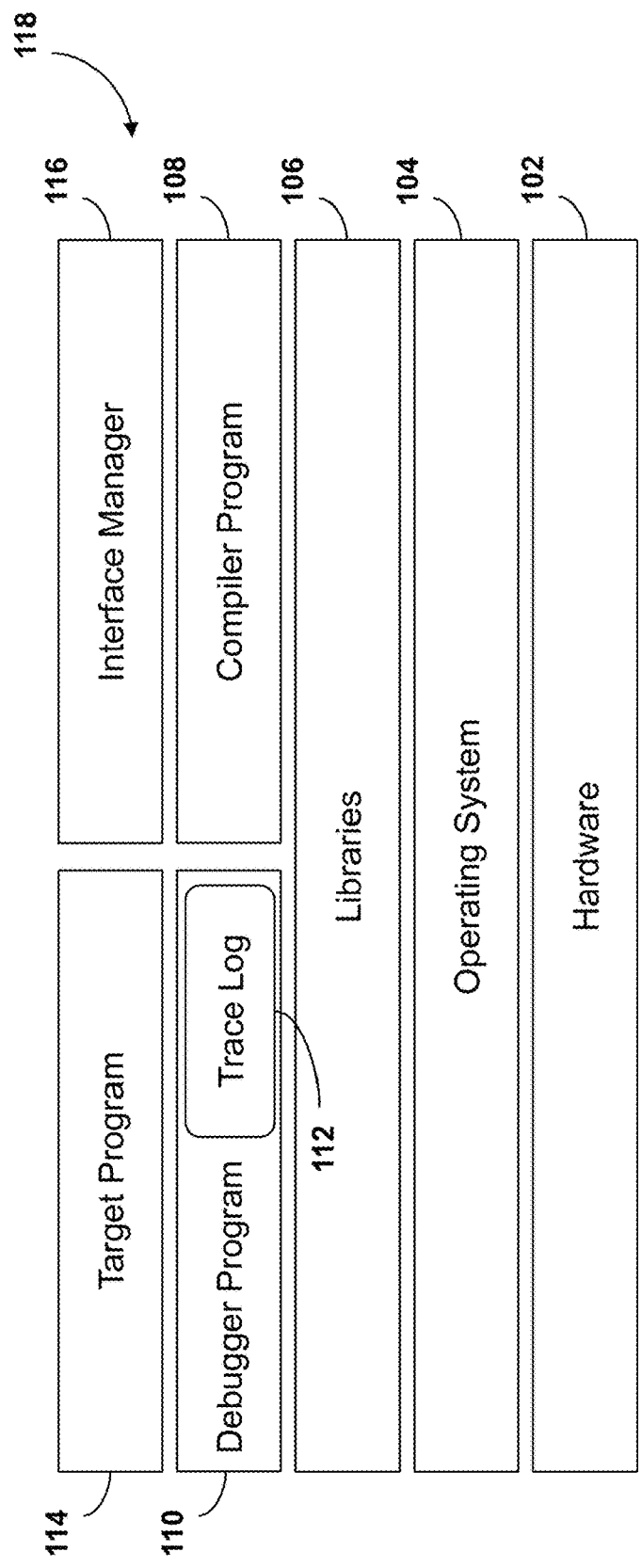
FIG. 1B illustrates another block diagram of a general hardware and software architecture comprising a debugger and a compiler.

FIG. 1B illustrates another block diagram of a general hardware and software architecture comprising a debugger and a compiler. Unlike FIG. 1A, the target computer program is executed on the host system 118. For example, FIG. 1B illustrates a case when a Windows program is compiled and linked as well as executed on a computer system running Windows.

Figure 2:
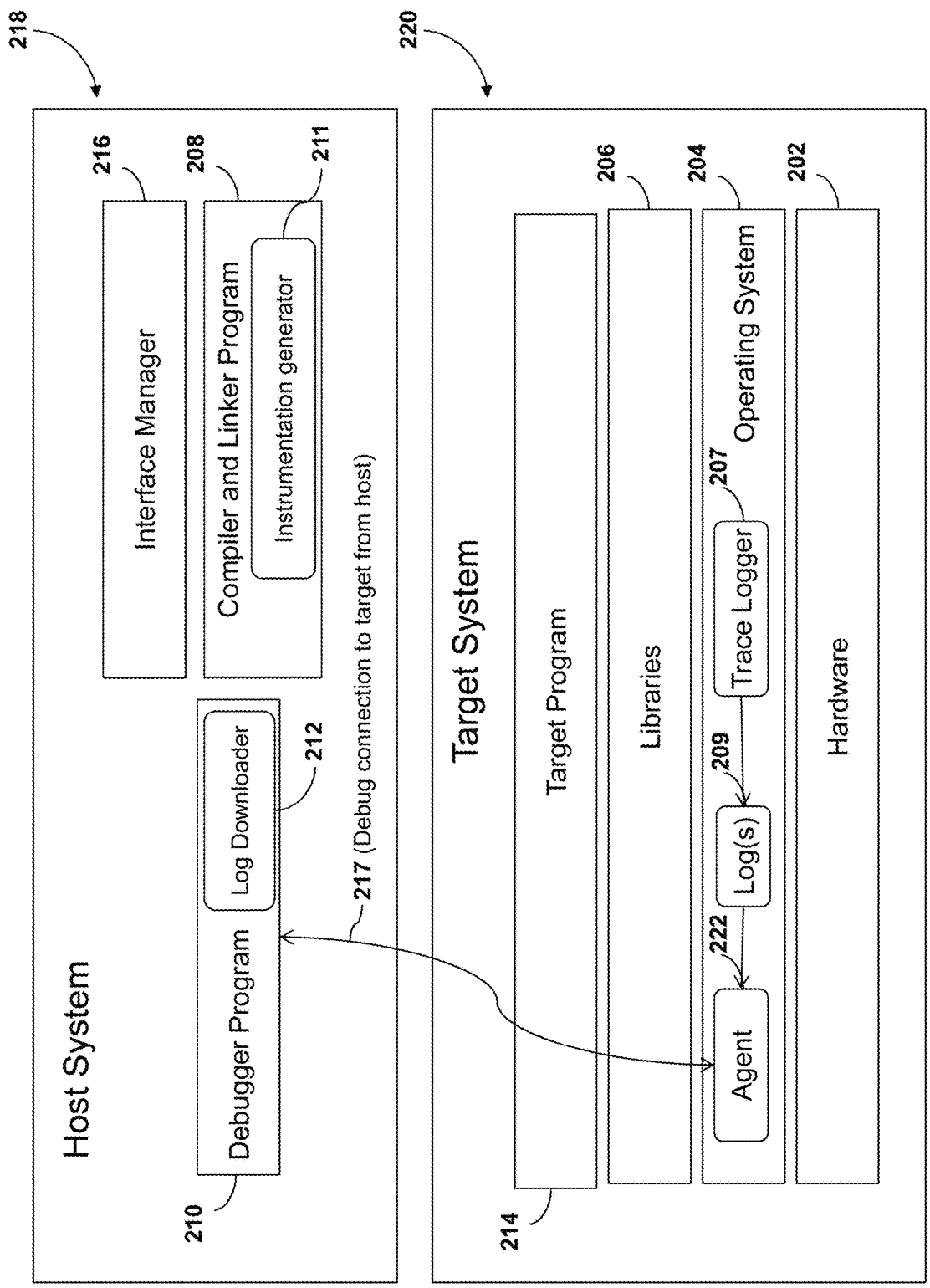
FIG. 2 illustrates a block diagram of a hardware and software architecture comprising embodiments of the debugger and compiler systems and methods disclosed herein.

FIG. 2 illustrates a block diagram of a hardware and software architecture comprising embodiments of the debugger and compiler systems disclosed herein. In an embodiment, the systems disclosed herein comprise a hardware layer 202 that is operated and managed by an operating system 204. Unlike many traditional debugger systems, the systems disclosed herein can comprise a trace data logger 207, such as a unified log (described herein). In an embodiment, the trace data logger 207 is configured to collect trace data generated from the execution of the target program 214. In an embodiment, the operating system 204 can comprise an agent 222 that is configured to access the trace data logger 207 in order to provide trace data to debugger 212. In an embodiment, the agent 222 can be configured to communicate with the target program 214. For example, the system can utilize the agent 222 to retrieve trace data that is not otherwise directly accessible by the target program 214 and to perform other debugging tasks. In an embodiment, the operating system 204 (such as the kernel) is modified to record trace data that is not otherwise directly accessible by the target program 214 including operating system events, such as accesses to memory outside of the operating environment of the target program, register data, and the like, perform buffer management, and perform additional tasks associated with debugging. In an embodiment, the debugger 210 can be configured to communicate with the agent 222 via a log downloader 212 in order to access trace data stored by the trace data logger 207.

In an embodiment, the debugger 210 is configured to decode and process the trace data in order to present the replay and/or reconstruction of the events leading up to the crash or the stoppage of the target program. In an embodiment, the interface manager 216, which can comprise a time traveling debugger (described herein), as well as other components, can be configured to provide a graphical user interface for displaying the replay and/or reconstruction of the events based on the trace data. In an embodiment, the compiler and linker program 208 can be configured to receive source code to be compiled into object code and linked into executable code. The linker can be configured to link the compiled object code with the necessary libraries 206 into the executable code.

In an embodiment, the compiler and linker program 208 comprises an instrumentation generator 211. In an embodiment, the compiler and linker program 208 is configured to analyze the target program and/or identify places in the code of the target program where instrumentation code should be inserted in order to generate useful trace data while the target program is executing. In an embodiment, the instrumentation generator 211 is configured to generate and/or insert code into the identified place(s) in the target program based on the analysis of the compiler and linker program 218. In an embodiment, the instrumentation code is inserted into the code of the target program in order to allow the compiler and linker program 218 to compile code of the target program, as well as the instrumentation code that is embedded in the code of the target program, into a binary target program 214 for a computer to execute. In an embodiment, the instrumentation code is also inserted into the code of the target libraries 206.

In an embodiment, the trace logger 207 and instrumentation code generated by the instrumentation generator 211 are configured to generate trace data for storage in the one or more trace data logs 209. For example, trace data logs 209 can include a first log for storing trace data associated with the execution of instrumentation code (of one or more threads of execution being executed by the operating system 204) and a second log for storing trace data associated with tasks performed by the operating system respectively. As another example, a single combined trace data log 209 can be used for trace data generated by the instrumentation code and by the operating system.

In an embodiment, the system can be configured to collect trace data for debugging a target program without having a debugger 210 being a part of the system. For example, the system can include a compiler, such as the compiler and linker 208 having the instrumentation generator 211, configured to insert instrumentation into the target program. Said instrumentation is configured to generate and/or collect trace data, which can be retrieved from a remote location or the field in which the target program is operating. The retrieved trace data can then be analyzed on another system that has a debugger to resolve a bug in the target program. As another example, the system may not include the compiler and linker 208 having the instrumentation generator 211 and may execute a previously instrumented (and compiled) target program configured to generate and/or collect trace data, which can then be retrieved and analyzed on another system that has a debugger. As is illustrated in FIG. 1B, the system of FIG. 2 can be modified so that the compiler and linker 208 and the interface manager 216 are executed on the same computer system as the target program 214.

Figure 3:
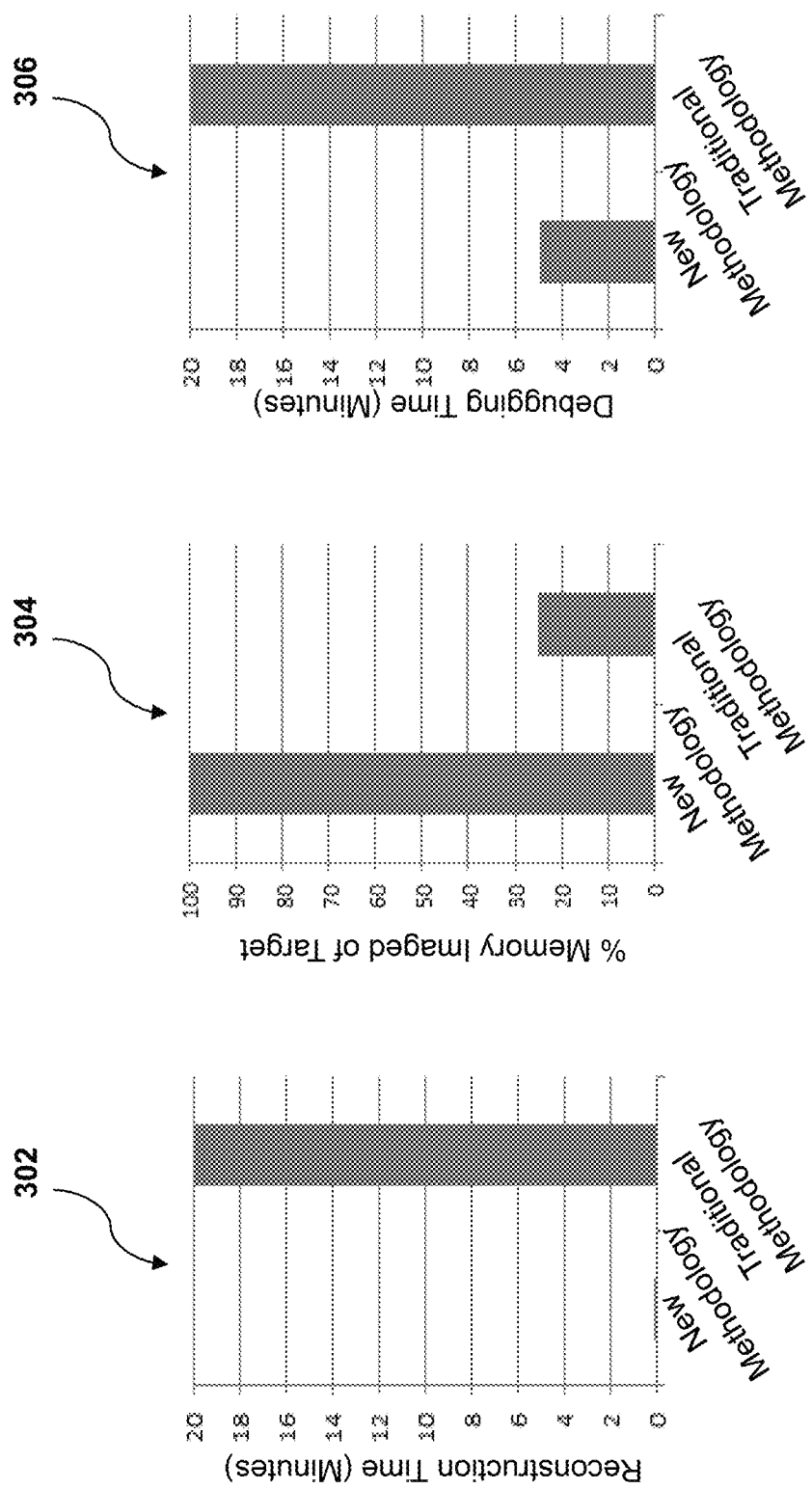
FIG. 3 illustrates bar graphs showing example advantages of the debugger and compiler systems and methods disclosed herein.

FIG. 3 illustrates bar graphs showing example advantages of the embodiments of the debugger and compiler systems (or embodiments of an improved backend) disclosed herein. With reference to graph 302, there is illustrated an example of technical improvement achieved by embodiments of the systems disclosed herein over traditional debugging systems. In an embodiment, the system can be configured to replay and/or reconstruct events leading up to the crash or other stoppage of the target program, such that the user of the system can begin debugging within one second. Using a traditional debugging system, the replay and/or reconstruction of the events leading up to the crash or other stoppage of the same target program would take time proportional to the size of the log. In this example, the traditional debugging system would take about 20 minutes to analyze about one gigabyte of trace data starting from the beginning of the trace data file. By utilizing embodiments of the systems and methods disclosed herein, it would only take about one second to process or provide a user with access to a one gigabyte trace data file because the systems herein can be configured to analyze the trace data files starting from the end of the file, providing the user with usable information within seconds (thereby avoiding the significant time needed to process the entire one gigabyte data file, which some traditional debugging systems require).

With reference to graph 304, there is illustrated an example of a portion of memory of a target computer system that is imaged during execution of a target program. In an embodiment, the systems disclosed herein can be configured to image any subset of the memory, up to and including 100% of the memory. In comparison, some traditional debugger systems may only image 25% or less of the memory being utilized during the execution of the same target program.

With reference to graph 306, there is illustrated an example of the time savings that a programmer can achieve using embodiments of the systems disclosed herein as opposed to traditional debugging systems. For example, a programmer can resolve a bug in a program in as little as five minutes, or less, by utilizing embodiments the systems disclosed herein. By contrast, the same programmer using a traditional debugger should spend at least 20 minutes, and possibly much longer, attempting to resolve the same bug in the same target program. In general, programmers can be more efficient in resolving bugs by utilizing embodiments of the systems disclosed herein because there is less time spent waiting for the debugging program to process the trace data log file. When a trace data log file can be processed within seconds, the programmer can more easily focus on resolving the bug. In contrast, when a programmer has to wait 20 minutes or more to process the trace data log file, a programmer can start to lose focus on resolving the bug in the program.

Compiling and Debugging

Figure 4:
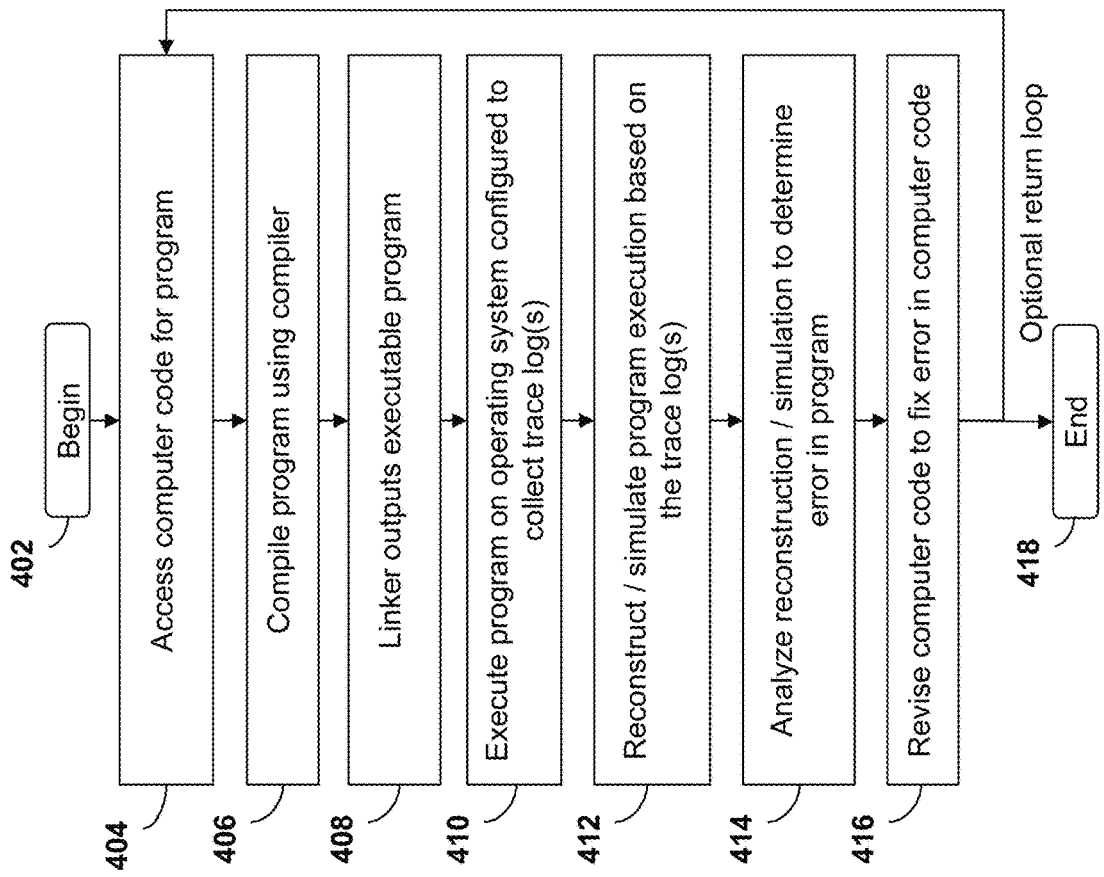
FIG. 4 is a flowchart depicting an embodiment of a high-level process for compiling and debugging a task.

FIG. 4 is a flowchart depicting an embodiment of a high level process for compiling and debugging a computer program. Embodiments of the systems disclosed herein can comprise a compiler and a debugging system for reconstructing and/or simulating a target program's execution. By reconstructing and/or simulating the target program's execution, a programmer can utilize such information in order to debug a computer program quickly, efficiently, and accurately. In an embodiment, the high level process can begin at block 402 and at block 404 the system can be configured to access the source code file of the computer program. At block 406, the system can be configured to compile the source code associated with the target program using the compiler of the system. The compiler can be further configured to instrument the source code by inserting instrumentation instructions configured to generate trace data. At block 408, the system can be configured to utilize the linker to output an executable machine readable program. At block 410, the system can be configured to execute the machine readable program on an operating system configured to collect trace data and store such data in a log file. At block 412, the system can be configured to utilize a debugger system in order to reconstruct and/or simulate the program's execution based on the stored trace data. At block 414, a programmer can utilize the graphical user interface of the debugger system in order to analyze the reconstruction and/or simulation. The graphical user interface can be dynamically changed or updated. Through this analysis, a programmer can identify bugs in a program and resolve any such errors. At block 416, a programmer can revise the source code of the target program based on his analysis of the reconstruction and/or simulation generated by the debugger system. Optionally this process can return to block 404 and start the process again. Alternatively, the process can end at block 418. In an embodiment, the process can be performed for multiple threads of execution (including for all threads of execution) being executed by an operating system.

Figure 5:
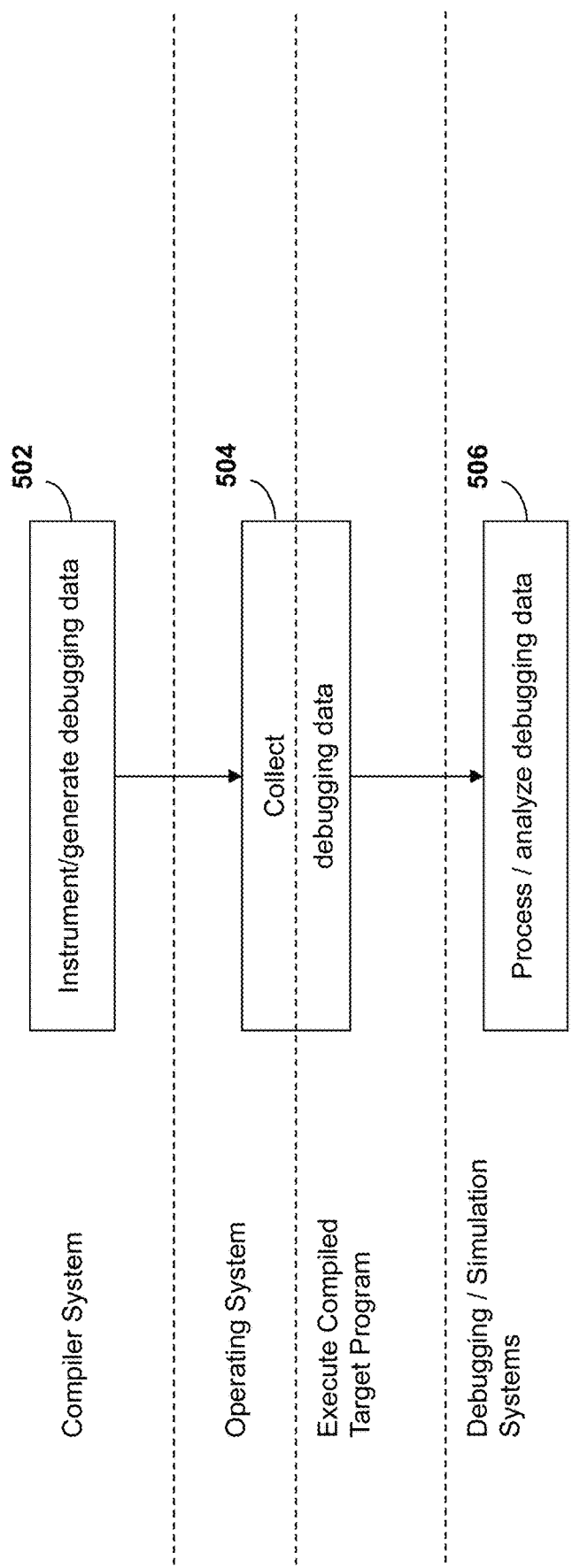
FIG. 5 is a block diagram depicting a high level overview of an embodiment of a compiler system and a debugging system interacting with an operating system and a target task.

FIG. 5 is a block diagram depicting a high level overview of an embodiment of a compiler system and a debugging system interacting with an operating system and a target program. In an embodiment, the systems disclosed herein can comprise a compiler system (which can also include a linker system), an operating system, and/or a debugging simulation system. In an embodiment, at block 502, a computer program is compiled and linked using the compiler system. The computer program is also instrumented to generate trace data. In an embodiment, in block 504, the compiled target program is executed in the application layer, in the operating system, or in both. The target program can be configured to output trace data to a log file during execution. The collection of trace data can be partially completed by the operating system. In an embodiment, the operating system is modified (for example, its kernel is modified) to record as trace data those actions performed by the operating system on behalf of the target program that the target program does not have access to, such as (i) calls to operating system services (for example, APIs), (ii) changes performed by the operating system in target program's memory (for example, in response to an operating system service or API), including recording one or more pre-write values, (iii) operating system services performed on behalf of the target computer program, (iv) task switching, and the like. Trace data can be collected by both the execution of the compiled target program and by the operating system. In one embodiment, the trace data collected by the operating system and the target program are stored in a single trace data log file. In another embodiment, the trace data collected by the operating system and the target program are stored in two or more separate trace data log files that may or may not be combined during a decoding process. The debugging/simulation system can be configured to process and decode at block 506 the debugging data generated from executing the target program. The decoded debugging data can be presented to the user in a graphical user interface to facilitate identification and resolution of one or more bugs. The graphical user interface can be dynamically changed or updated.

Figure 6:
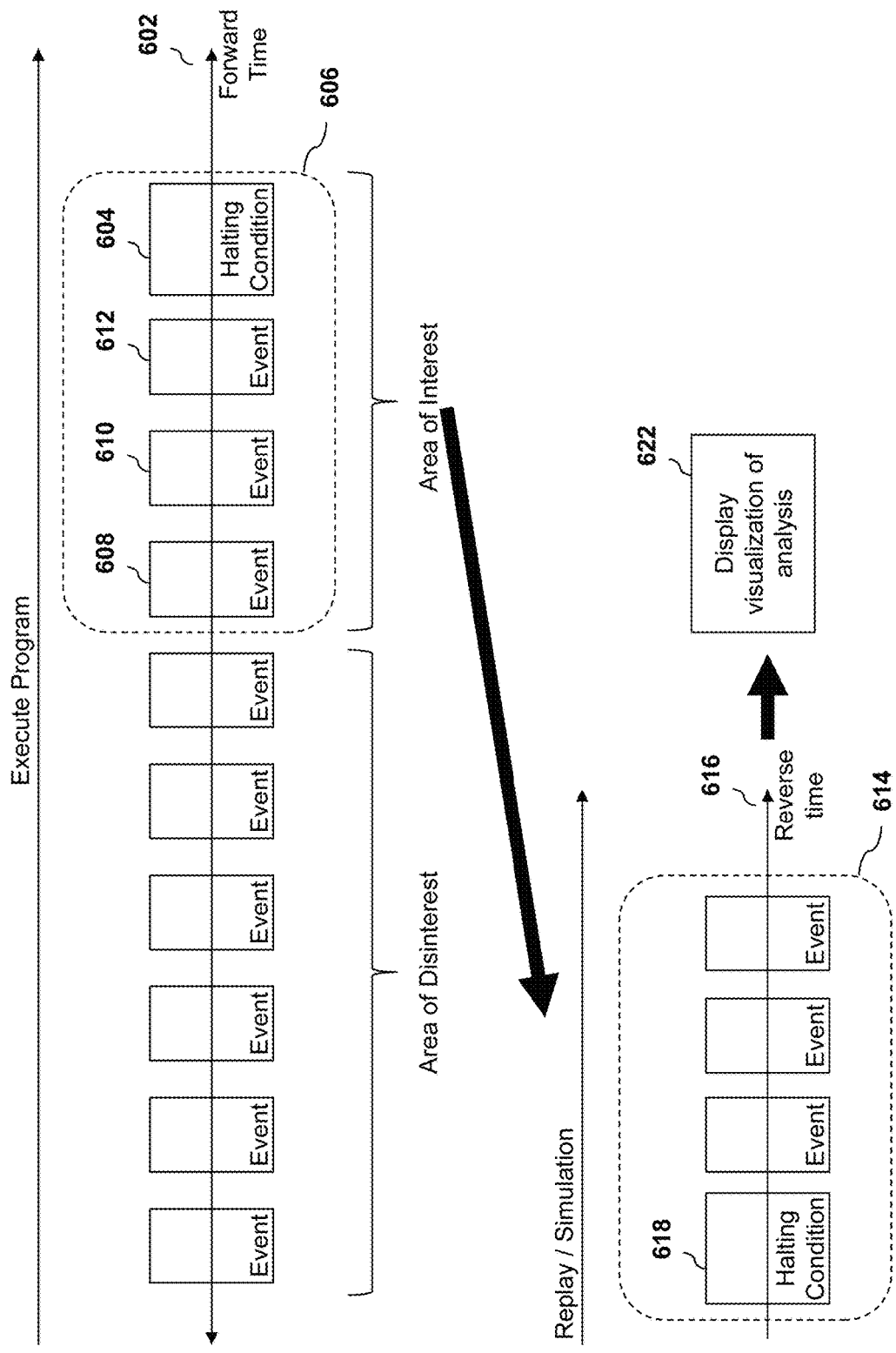
FIG. 6 is a block diagram depicting a high level overview of an embodiment of a debugging system configured to replay and/or simulate events occurring during the execution of a task.

FIG. 6 is a block diagram depicting a high level overview of an embodiment of a debugging system configured to replay and/or simulate events occurring during the execution of a target computer program. Timeline 602 is an illustration of an execution of the target program. As illustrated, timeline 602 comprises a number of events, such as memory accesses, function calls, and the like, that occur as the program is executed. Eventually, the target program reaches a halting condition 604, which can include one or more of a crash, breakpoint, access to a particular memory address, user request to halt execution, and the like. There is a region of interest 606 that can comprise a series of events 608, 610, 612 that lead up to the halting condition 604. The area of interest 606 is very important for debugging the target program because often the events immediately leading up to the halting condition provide programmers with the most critical insight into the nature of the bug in the software. By understanding the nature of the bug, a programmer can more easily fix the error in the program. In an embodiment, the system can be configured to present the series of events 614 to the programmer using one or more user interfaces, such as time traveling debuggers, and graphical display tools. Such user interfaces can be dynamically changed or updated. The events are decoded in reverse time order 616 starting from the halting condition 618, so as to make the most relevant information available to the programmer first. For example, the time it takes the system to step backward from the halting condition 604 to event 612 can be approximately one second, the necessary computations being carried out by the system with constant algorithmic complexity. Additional details of trace data collection and replay and/or simulation are described in U.S. Pat. Nos. 7,653,899; 8,015,552; 8,132,159; 8,136,096; 8,271,955; 8,584,097; 8,789,023; and 8,914,777 and in Patent Publication No. 2014/0298301, the disclosure of each of which is incorporated by reference in its entirety.

In an embodiment, at block 622, the system can be configured to display a visualization of the analysis and/or the state of the target computer system performed by the system, which in turn allows the programmer to identify errors in the software program.

Figure 7:
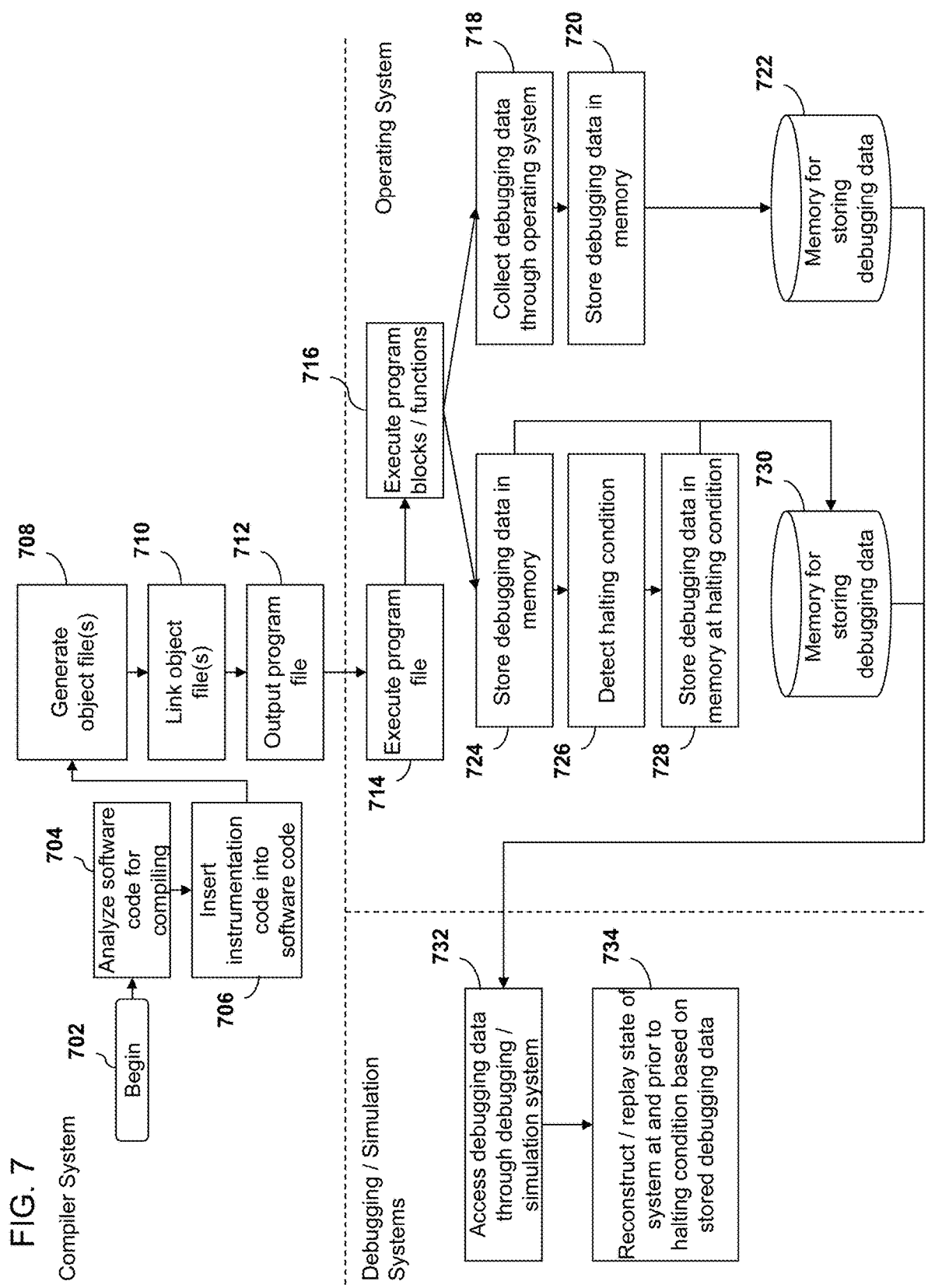
FIG. 7 is a flowchart depicting an embodiment of compiling and debugging a task.

FIG. 7 is a flowchart depicting an embodiment of compiling and debugging a computer program. In an embodiment, the system can comprise a compiler system (which also includes a linker system), operating system, and a debugging/simulation system. In an embodiment, the process can begin at block 702 with the compiler system analyzing at block 704 the software code for compiling. At block 706, the compiler can be configured to insert instrumentation code into the software code. At block 708 the compiler system can be configured to generate object file(s). At block 710, the linker system can be configured to link object file(s). Optionally, at block 710, the linker system can link one or more library object file(s). At block 712, the compiler system can be configured to output an executable machine readable program file. At block 714, the operating system can be configured to coordinate the execution of the program file that was outputted by the compiler system (which can be executed by the operating system as a task). At block 716, the operating system can be configured to coordinate the execution of the program blocks, such as basic blocks, and/or functions within the program. At block 718, the operating system can be configured to collect debugging data (for example, operating system events), including through the operating system's access to various memory values, processor registers, and the like. Debugging data collected at block 718 can include register snapshots and memory accesses (such as pre-write values). At block 720, the operating system can be configured to store debugging data into memory, for example log or database 722 that is designated for storing debugging data.

At block 724, the system can be configured to execute instrumentation instructions of the program's instructions to store debugging data in memory. Debugging data collected at block 724 can include, but is not limited to, pre-write memory values for nonvolatile memory locations and volatile memory locations without side effects, values read from volatile memory locations with side effects, values indicating entries into basic blocks, and/or FEE data. At block 726, the system can be configured to detect a halting condition, which can include a crash, break point, memory access, user intervention, or the like. At block 728, the system optionally can be configured to store debugging data in memory, for example, the memory values in the operating system at the time of the halting condition. This debugging data can include a memory image of the target computer system (or values stored in the memory of the target computer system) and/or one or more register snapshots at the time of crash or execution of one or more conditions that have triggered the halting condition. In an embodiment, the database 730 is utilized for storing the debugging data at blocks 724 and 728. In an embodiment, databases 722 and 730 can be consolidated into a single database. At block 732, the debugging/simulation system is configured to access the debugging data stored in the databases 730, 722. At block 734, the debugging/simulation system is configured to reconstruct/replay the state of the system at, and prior to, the halting condition based on the stored debugging data.

Figure 10A:
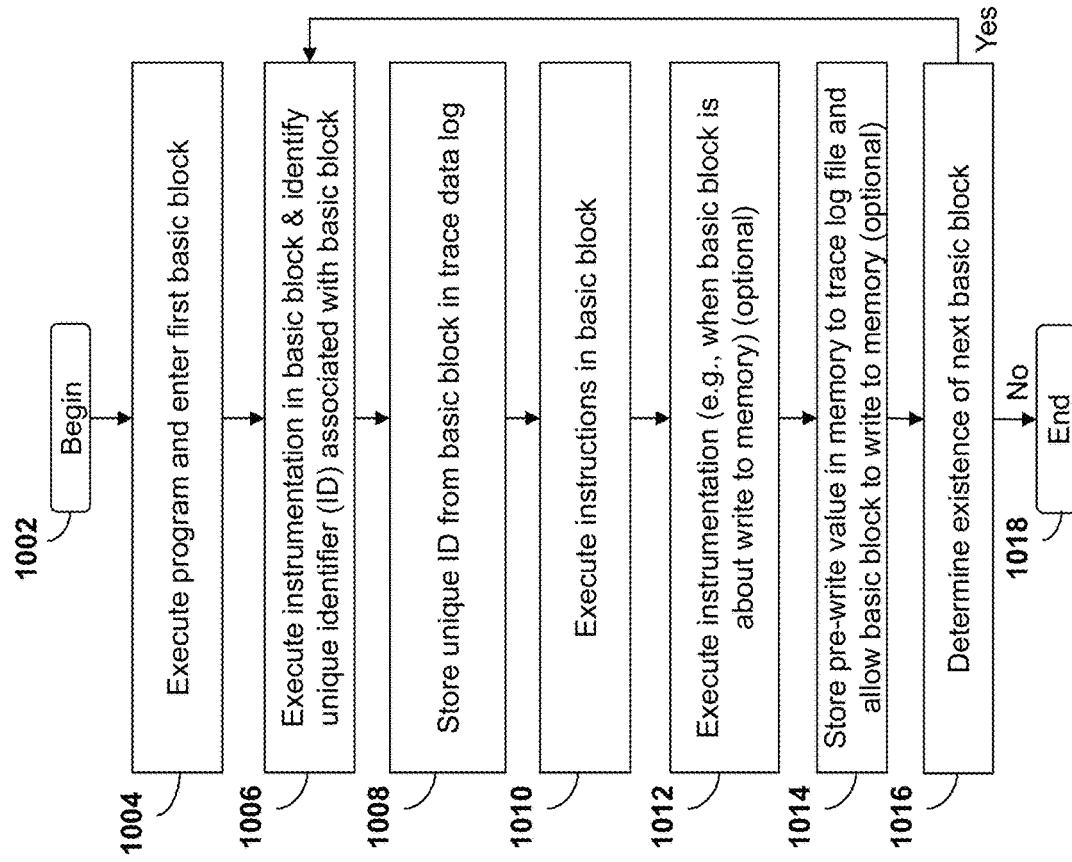
FIG. 10A is a flowchart depicting an embodiment of a process for generating trace data during the execution of a task.

FIG. 10A is a flowchart depicting an embodiment of a process for generating trace data for debugging during execution of a computer program. In an embodiment, the execution of the compiled software program will cause the execution of the instrumentation code that was inserted into the software program during the compiling process. For example, the execution of the instrumentation code can cause pre-write memory values to be stored in a trace log file during execution of the target program. The trace log file can then be utilized to replay and/or reconstruct the events leading up to a halting condition.

The process for executing the target computer program can begin at block 1002 and at block 1004 the program can be executed by entering the first basic block of the computer program. At block 1006, the instrumentation in the basic block is executed and the unique identifier associated with the basic block (or another value identifying the fact that the basic block is being executed) is identified. At block 1008 the unique identifier is stored in a trace data log. In an embodiment, the unique identifier can be stored in memory that is pointed to by a pointer stored in a register (such as a reserved register) at block 1008, which may speed up execution of the instrumentation code and thereby reduce the impact on the execution of the target computer program. At block 1010, the instructions in the basic block are executed. At block 1012, additional instrumentation is optionally executed. In an embodiment, the instrumentation when the basic block is about to write to memory is optionally executed at block 1012. The instrumentation can be configured to read and/or store the pre-write value from a memory location to the trace log file before the basic block writes to the memory location. Optionally, at block 1014, the instrumentation of block 1012 will cause the pre-write value in memory to be stored to the trace log file and the basic block is allowed to write to memory. Even if blocks 1012 and 1014 are not executed to save pre-write memory values in the trace data log, the basic block may still be allowed to write to memory. At block 1016, the process determines if there is a next basic block for execution. If such basic block is identified then the process can return to block 1006. If no such basic block is detected, then the process can end at block 1018.

When deferred trace data optimization is utilized, blocks 1006 and 1008 are not executed as is illustrated in FIG. 10A. Rather, blocks 1006 and 1008 are executed at the end of the basic block, such as after block 1014.

Figure 10B:
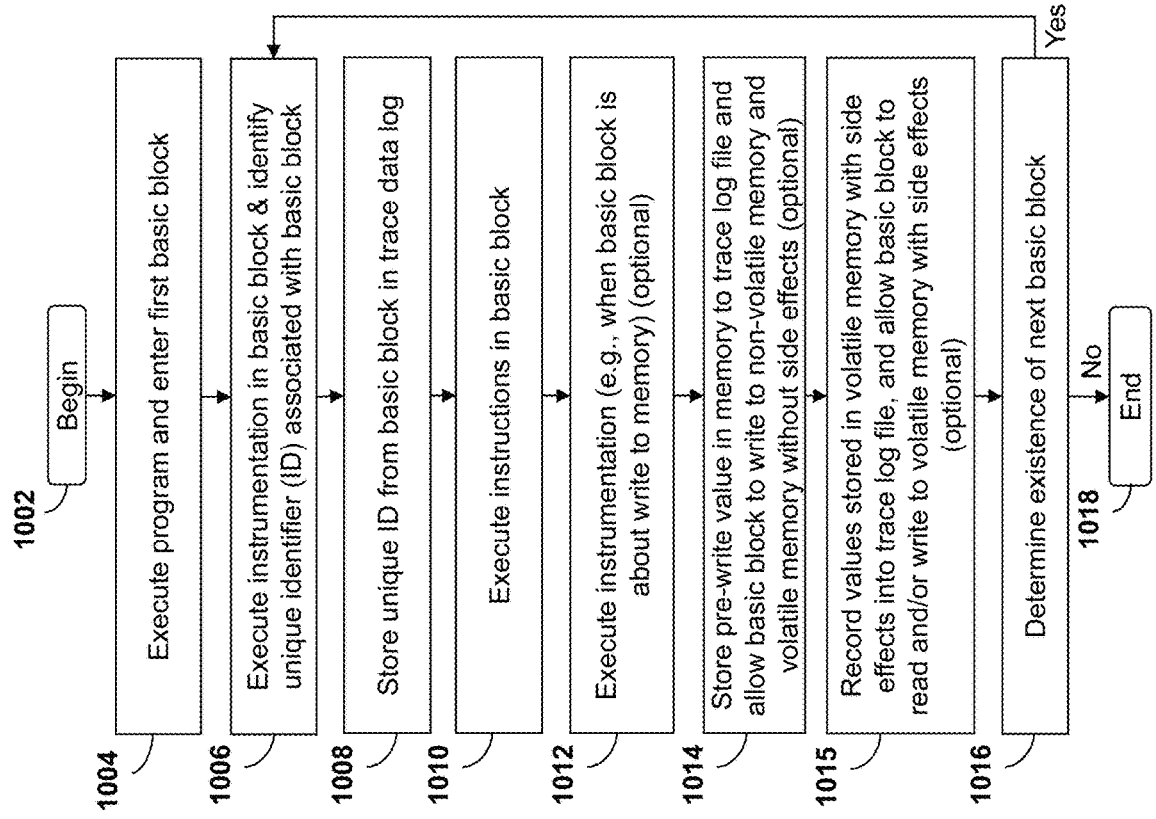
FIG. 10B is a flowchart depicting an embodiment of a process for generating trace data during execution of a task.

FIG. 10B is a flowchart depicting an embodiment of a process for generating trace data during execution of a computer program. Operation of blocks 1002-1014, 1016, and 1018 have been described in connection with FIG. 10A. Similar to the process in FIG. 10A, in an embodiment, the system disclosed herein can be configured to store not only pre-write values stored in nonvolatile memory locations and volatile memory without side effects locations to a trace data log file. The system also can be configured to record the addresses of volatile memory with side effects memory locations accessed by the instructions of the basic block. At block 1015, the process optionally records the addresses of stores by the program to volatile memory with side effects locations. As explained herein, values stored in volatile memory with side effects locations can be changed by other programs and/or reading such volatile memory locations can change the stored values. Accordingly, instrumentation for recording pre-write values may not be used for such volatile memory locations. Even if block 1015 is not executed, the basic block may still be allowed to access such volatile memory locations.

Function Entry and Exit (FEE) Instrumentation

Figure 11:
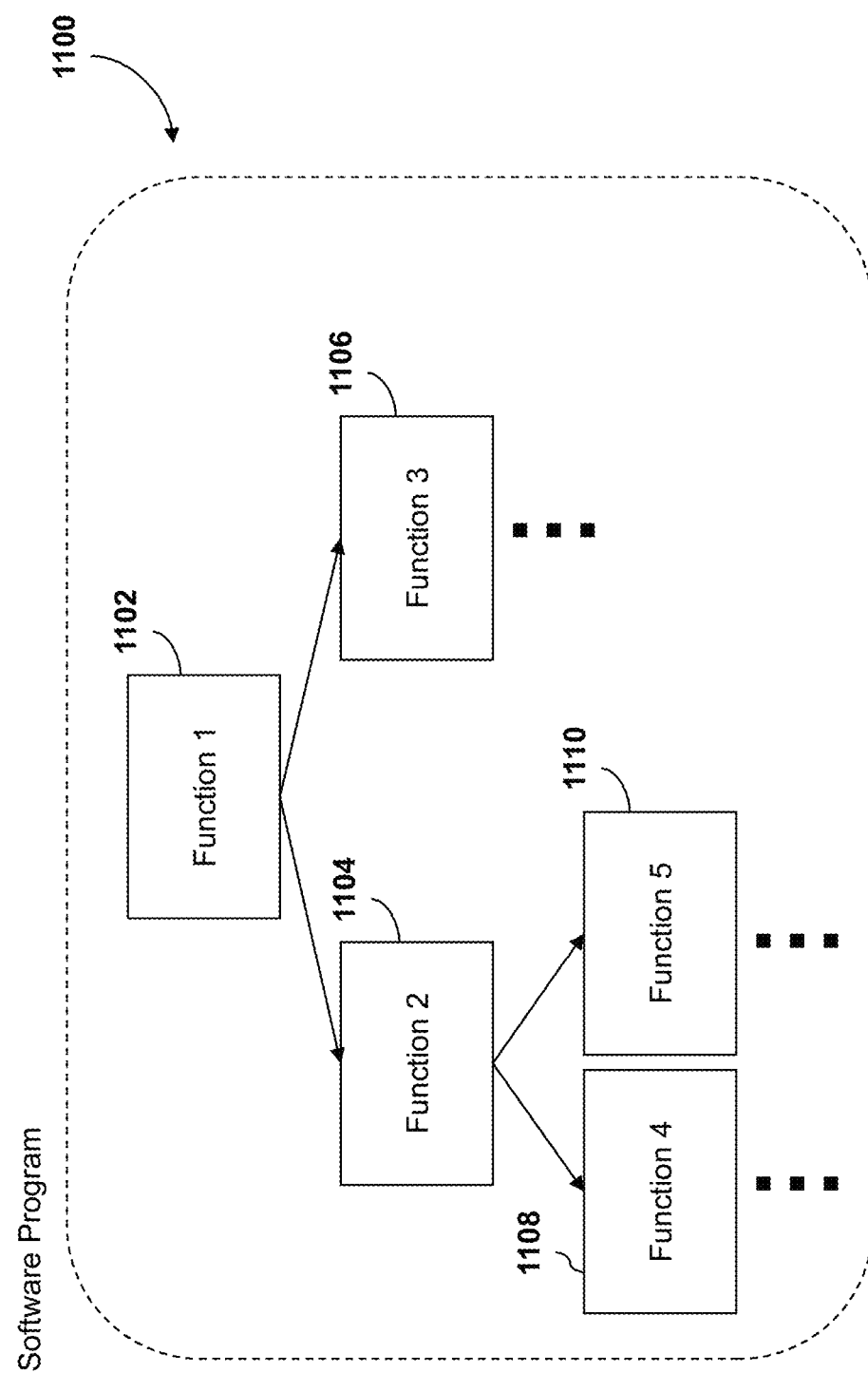
FIG. 11 is a block diagram depicting a high level overview of an embodiment of a software program comprising functions.
Figure 12:
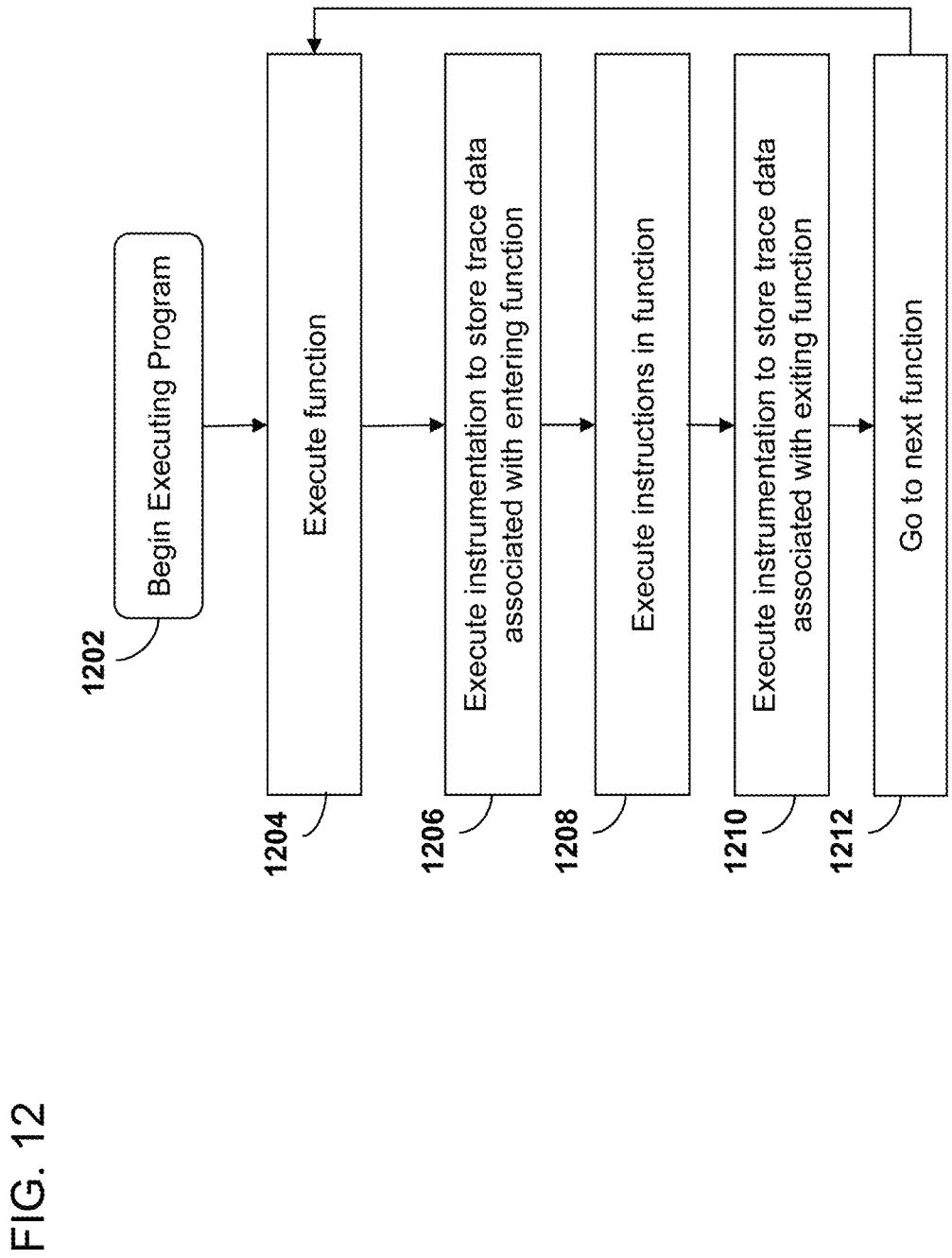
FIG. 12 is a flowchart depicting an embodiment of a process for generating trace data during the execution of a program.

FIG. 11 is a block diagram depicting a high level overview of an embodiment of a software program comprised of functions. In an embodiment, a software program 1100 can be comprised of a plurality of functions. As explained herein, the term function generally refers to a named section of a software program or a group of instructions that performs a specific task In an embodiment, software program 1100 can comprise a first function (function 1) 1102, which can be an entry point into the program (for example, main function). In an embodiment, function 1 can branch off to function 2 at 1104 and function 3 at 1106. Function 2 can also comprise a number of other branches leading to other functions 1108 and 1110.

In an embodiment, one or more leaf functions are not instrumented with FEE instrumentation. A leaf function can be defined as a function that may be called by another function but that does not itself call any other functions. Similar to the optimizations described in connection with basic blocks that are only executed with subsequent basic blocks, FEE instrumentation may be omitted in a leaf function. Instead, in an embodiment, a static lookaside table (as described herein) can indicate execution of a leaf function that was not separately instrumented. As described herein, in some embodiments, the static lookaside table can be used to insert during replay and/or reconstruction appropriate data associated with the execution of the leaf function into the trace data file. In an embodiment, a similar approach can be applied to small functions, for example less than X instructions (where X is a tunable parameter).

Optimizations

Embodiments of systems and methods described herein can utilize one or more of the following optimizations described herein, among others: not separately recording entry into some or all basic blocks that are always executed only with subsequent basic blocks, performing the optimizations explained in connection with FIGS. 8C and 8D, recording the program counter value associated with the end of the basic block, deferred trace data optimization, skipping instrumentation of a leaf function, and not inserting stack entry and exit markers. Using one or more of these optimizations can advantageously lead to one or more of the following, among others: reduction in the size of trace data and shortening of time for replay, reconstruction, and/or simulation.

User Interface

Figure 13:
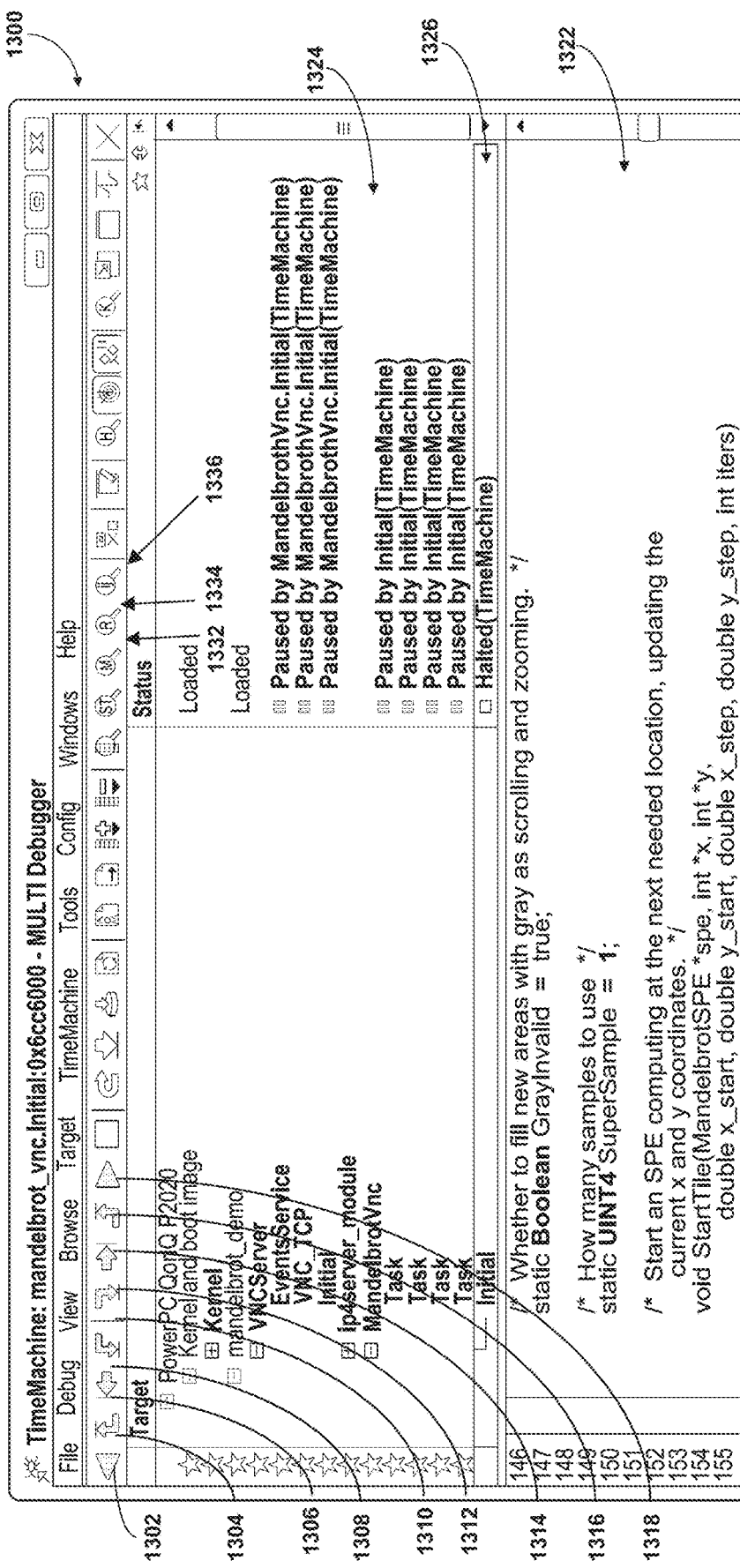
FIG. 13 illustrates a graphical user interface of a debugger system.

FIG. 13 illustrates a graphical user interface of a time traveling debugger system. The illustrated graphical user interface can be presented during the replay and/or reconstruction. In an embodiment, a user can interact with graphical user interface 1300 to step through the execution of a target computer program and compare the execution to corresponding lines in the source code of a target computer program, which is a process that can help a programmer debug the target program. As described herein, the graphical user interface can be dynamically changed or updated responsive to user activity or selection. In an embodiment, the graphical user interface 1300 comprises display area 1322 for displaying the source code to the user. In an embodiment, the display area 1322 also includes various data for presenting a replay or a reconstruction of the execution of the target program, for example, executed commands, inputs/outputs, variable values/changes, register values/changes, memory values/changes, stack trace, breakpoints, source code, break dots to indicate where breakpoints may be placed, and the like. In an embodiment, a current line of the program and/or point in time being debugged is indicated by an arrow 1332. In an embodiment, the current context of a command is indicated by an arrow 1330.

In an embodiment, the graphical user interface 1300 includes buttons 1302 through 1316 that allow the user to execute or run the target computer program forward and backwards in time and permit navigating forward and backwards in time of the trace log using common debugger controls and their backwards-in-time variants. They work similarly for both source line and assembly instruction debugging. In an embodiment, a button 1302 to allow the user to execute or simulate the execution of the target computer program (such as a current function) backwards. In an embodiment, a button 1304 allows the user to return up to a previous sequence of instructions in the source code (such as a previous function) that called the current function. In an embodiment, a button 1306 allows the user to single step backwards to the previous instruction or source line executed in the same stack level. In an embodiment, a button 1308 allows the user to single step backwards to the previous instruction or source line executed and into the instructions or source code of a function call if the previous source line executed was a function call. The buttons 1302 through 1308 can allow the user to replay and/or reconstruct the execution of the target computer program backwards in time.

In an embodiment, a button 1310 allows a user to single step forward to the next instruction or source line executed or simulated and into a function if the next instruction or source line is a function call. In an embodiment, a button 1312 allows a user to execute or simulate the next instruction or line in the source code (or single step). In an embodiment, a button 1314 allows the user to step out of the current sequence of instructions (such as a function, which can result in going up the call stack to a next function). In an embodiment, a button 1316 allows the user to execute or simulate the target computer program (such as a current function) forward. In an embodiment, a button 1318 allows the user to halt the execution or simulation of the target computer program. The buttons 1310 through 1316 can allow the user to execute or simulate the execution of the target computer program forward in time.

In an embodiment, the systems disclosed herein are configured to perform in constant algorithmic complexity (such as within one second or within seconds) the calculations necessary to begin debugging trace data, in order to allow the user to utilize the user buttons herein almost immediately after the program is halted, thereby allowing the user to debug a target program more quickly as compared to traditional debugging systems. For example, each of the processes associated with one or more of the buttons 1302 through 1318 can be executed or simulated within one second or within seconds in order to provide a real-time or substantially real-time experience to the user.

In an embodiment, the graphical user interface 1300 includes one or more additional buttons and/or components. In an embodiment, the graphical user interface 1300 comprises a button 1332 to allow viewing of portions or the entirety of the memory of a target computer system. In an embodiment, the graphical user interface 1300 comprises a button 1334 to allow viewing of a portion or the entirety of registers of a target computer system. In an embodiment, the graphical user interface 1300 comprises a button 1336 to allow viewing of portions or the entirety of local variables of the target computer program.

In an embodiment, the graphical user interface 1300 allows the user to select (for example, via a double click or another action) any variable within source code display 1322 to show the value of that variable at that point in time. The user may also enter textual commands in an area 1320 to effect any action previously described herein. Area 1324 includes a view of operating system tasks that are being executed. The task being debugged is the highlighted task ("Initial") as indicated by the arrow 1326.

Computing System

Figure 14:
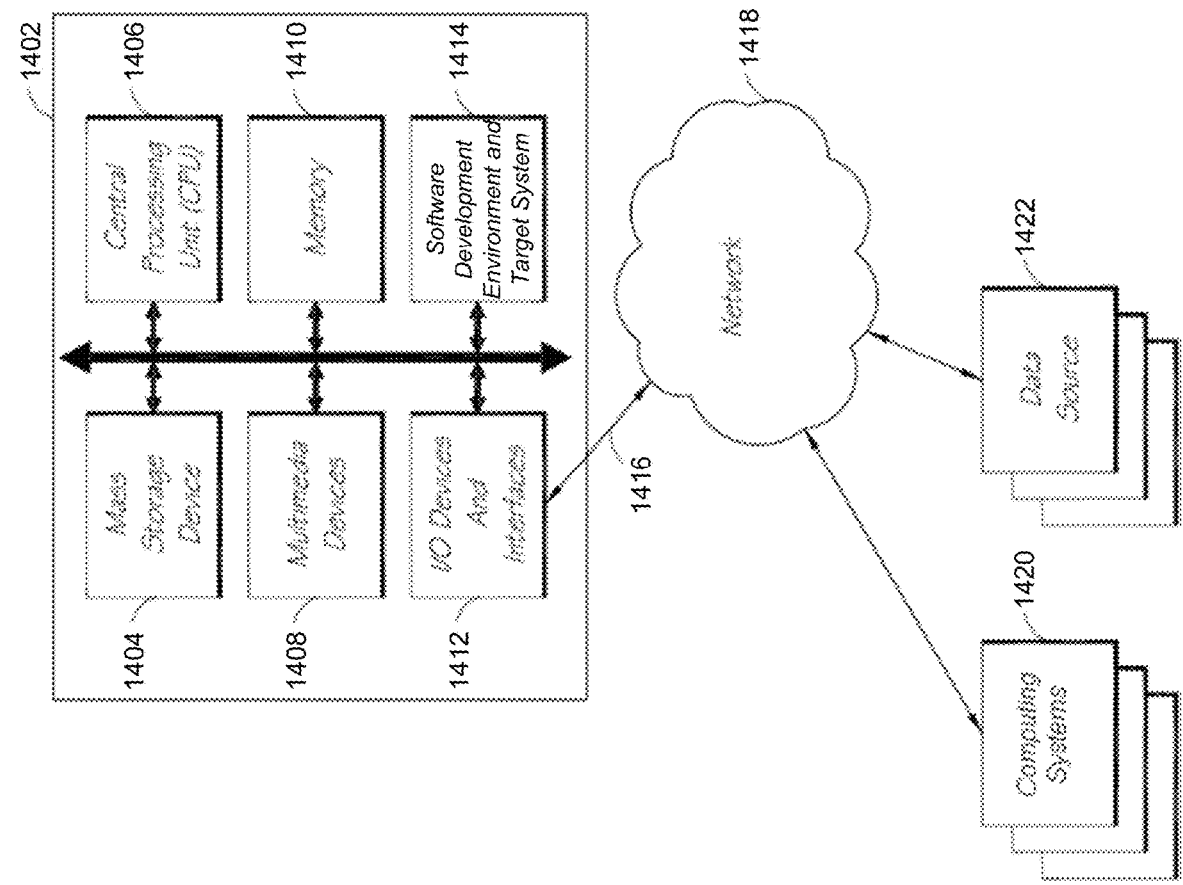
FIG. 14 is a block diagram depicting an embodiment of a computer system configured to operate the compiler and/or debugging systems and methods disclosed herein.

In an embodiment, the systems, processes, and methods described herein are implemented using a computing system, such as the one illustrated in FIG. 14. The example computer system 1402 is in communication with one or more computing systems 1420 and/or one or more data sources 1422 via one or more networks 1418. While FIG. 14 illustrates an embodiment of a computing system 1402, it is recognized that the functionality provided for in the components and modules of computer system 1402 may be combined into fewer components and modules, or further separated into additional components and modules.

Software Development Environment

The computer system 1402 includes a software development environment and target system 1414 that carries out the functions, methods, acts, and/or processes described herein. The software development environment and target system 1414 is executed on the computer system 1402 by a central processing unit 1406 discussed further herein. In an embodiment, the target system may reside in a separate computer system, as opposed to residing on the same computer system 1402 as the software development environment 1414, as depicted here.

Computing System Components

The computer system 1402 includes one or more processing units (CPU) 1406, which may include a processor, such as a microprocessor. In an embodiment, the computer system is an SMP system, such as a symmetric multiprocessor or a symmetric multicore (SMP) system. The computer system 1402 further includes memory 1410, such as random access memory (RAM) for temporary storage of information, a read only memory (ROM) for permanent storage of information, and a mass storage device 1404, such as a hard drive, solid state drive (SSD), diskette, or optical media storage device. Alternatively, the mass storage device may be implemented in one or more servers. Typically, the components of the computer system 1402 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1402 includes one or more input/output (I/O) devices and interfaces 1412, such as a keyboard, mouse, touch pad, and printer. The I/O devices and interfaces 1412 can include one or more display devices, such as a monitor, that allows the visual presentation of data to a user. More particularly, a display device provides for the presentation of graphical user interfaces (GUIs) as application software data, and multi-media presentations, for example. The I/O devices and interfaces 1412 can also provide a communications interface to various external devices. The computer system 1402 may include one or more multi-media devices 1408, such as speakers, video cards, graphics accelerators, and microphones, for example.

Computing System Device/Operating System

The computer system 1402 may run on a variety of computing devices, such as a server, a Windows server, a Unix Server, a personal computer, a laptop computer, and so forth. The computing system 1402 is generally controlled and coordinated by an operating system software, such as z/OS, Windows 95, Windows 98, Windows NT, Windows 2000, Windows XP, Windows Vista, Windows 7, Windows 8, Windows 10, Linux, OS X, BSD, SunOS, Solaris, INTEGRITY, or other compatible operating systems, including proprietary operating systems. Operating systems can control and schedule computer processes for execution, perform memory management, provide file system, networking, and I/O services, and/or provide a user interface, such as a GUI, among other things.

Network

The computer system 1402 illustrated in FIG. 14 can be coupled to a network 1418, such as a LAN, WAN, or the Internet via a communication link 1416 (wired, wireless, or a combination thereof). The network 1418 communicates with various computing devices and/or other electronic devices. The network 1418 can communicate with one or more computing systems 1420 and one or more data sources 1422.

The output module may be implemented as a combination of an all-points addressable display such as a cathode ray tube (CRT), a liquid crystal display (LCD), a plasma display, or other types and/or combinations of displays. The output module may be implemented to communicate with input devices 1412 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

Additional Variations

In some embodiments, a method of instrumenting one or more computer programs to determine the state of the one or more programs at a plurality of points in time includes recording as logged changes a plurality of changes that occur in the state of the one or more programs by logging at least part of the state that changed, logging said part of the state that changed by logging as a pre-image at least a representation of said part from a time prior to the occurrence of each of the logged changes, obtaining as a baseline image a baseline state of the one or more programs, and applying to the baseline image one or more pre-images successively from most recently to least recently logged, thereby reconstructing the state at a time earlier than the baseline image, and retrieving and interpreting the one or more pre-images from newest to oldest, thereby enabling analysis of most recent execution history of the one or more programs without waiting for earlier parts of logged data representing execution history to be retrieved, downloaded, and/or decoded.

The method of the preceding paragraph can include one or more of the following features. Each of the logged changes may not be recorded at the time the logged change occurs, and the logged change can be recorded through at least one register state snapshot including a state of one or more registers. Recording the at least one register state snapshot can avoid negatively impacting the run-time performance and/or memory footprint of the one or more program or programs. The baseline image can include a memory state of the one or more programs. Obtaining the baseline image can include obtaining a plurality of sections of the baseline image one at a time as needed for the reconstruction, thereby bounding the time required to begin debugging. The baseline image can be modified after at least one section is downloaded, thereby causing one or more inconsistencies between sections obtained at different times, and the method can include applying one or more pre-images recorded in conjunction with the modification to the baseline image to eliminate the one or more inconsistencies. The baseline image can include a previously-saved image of at least a portion of system memory. Using the previously-saved image of at least a portion of system memory as the baseline image can allow a programmer to perform debugging. Debugging can include debugging after the one or more programs has stopped executing. Logging of a pre-image associated with each of the logged changes can be performed before the logged change occurs. Logging of a pre-image associated with the each of the logged changes can be performed after the logged change occurs. Logging of a pre-image associated with each of the logged changes can be performed during the logged change.

In some embodiments, a method of determining at least a portion of the state of the one or more programs at a plurality of points in time includes obtaining as a baseline image a baseline state of the one or more programs, and applying to the baseline image one or more pre-images successively from most recently to least recently logged, thereby reconstructing the state at a time earlier than the baseline image and retrieving and interpreting the one or more pre-images from newest to oldest, thereby enabling analysis of most recent execution history of the one or more programs without waiting for earlier parts of logged data representing execution history to be retrieved, downloaded, and/or decoded. At least one change that occurred in the state of the one or more programs may have been recorded as logged changes by logging at least part of the state that changed, and said part of the state that changed may have been logged by logging as a pre-image at least a representation of said part from a time prior to the occurrence of each of the logged changes.

The method of any preceding paragraph can include one or more of the following features. Each of the logged changes may not be recorded at the time the logged change occurs, and the logged change can be recorded through at least one register state snapshot including a state of one or more registers. Recording the at least one register state snapshot can avoid negatively impacting the run-time performance and/or memory footprint of the one or more program or programs. The baseline image can include a memory state of the one or more programs. Obtaining the baseline image can include obtaining a plurality of sections of the baseline image one at a time as needed for the reconstruction, thereby bounding the time required to begin debugging. The baseline image can be modified after at least one section is downloaded, thereby causing one or more inconsistencies between sections obtained at different times, and the method can include applying one or more pre-images recorded in conjunction with the modification to the baseline image to eliminate the one or more inconsistencies. The baseline image can include a previously-saved image of at least a portion of system memory. Using the previously-saved image of at least a portion of system memory as the baseline image can allow a programmer to perform debugging. Debugging can include debugging after the one or more programs has stopped executing. Logging of a pre-image associated with each of the logged changes can be performed before the logged change occurs. Logging of a pre-image associated with the each of the logged changes can be performed after the logged change occurs. Logging of a pre-image associated with each of the logged changes can be performed during the logged change.

In some embodiments, a method of instrumenting one or more computer programs to determine a state of the one or more programs at a plurality of points in time includes inserting one or more executable instructions configured to record as logged changes at least one change that occurs in the state of the one or more programs by logging at least part of the state that changed and inserting one or more executable instructions configured to log said part of the state that changed by logging as a pre-image at least a representation of said part from a time prior to the occurrence of each of the logged changes. Recording and logging can enable a debugger to apply to a baseline image corresponding to a baseline state of the one or more programs one or more pre-images successively from most recently to least recently logged, thereby reconstructing the state at a time earlier than the baseline image and retrieve and interpret the one or more pre-images from newest to oldest, thereby enabling analysis of most recent execution history of the one or more programs without waiting for earlier parts of logged data representing execution history to be retrieved, downloaded, and/or decoded.

The method of any preceding paragraph can include one or more of the following features. Each of the logged changes may not be recorded at the time the logged change occurs, and the logged change can be recorded through at least one register state snapshot including a state of one or more registers. Recording the at least one register state snapshot can avoid negatively impacting the run-time performance and/or memory footprint of the one or more program or programs. The baseline image can include a memory state of the one or more programs. Recording and logging can further enables the debugger to obtain the baseline image by obtaining a plurality of sections of the baseline image one at a time as needed for the reconstruction, thereby bounding the time required to begin debugging. The baseline image can be modified after at least one section is downloaded, thereby causing one or more inconsistencies between sections obtained at different times, and wherein the recording and logging can further enable the debugger to apply one or more pre-images recorded in conjunction with the modification to the baseline image to eliminate the one or more inconsistencies. The baseline image can include a previously-saved image of at least a portion of system memory. Using the previously-saved image of at least a portion of system memory as the baseline image can allow a programmer to perform debugging. Debugging can include debugging after the one or more programs has stopped executing. Logging of a pre-image associated with each of the logged changes can be performed before the logged change occurs. Logging of a pre-image associated with the each of the logged changes can be performed after the logged change occurs. Logging of a pre-image associated with each of the logged changes can be performed during the logged change.

In some embodiments, a non-transitory computer storage stores instructions that, when executed by the one or more processors, cause the one or more processors to execute the method of any preceding paragraph. In some embodiments, a computer system includes at least one memory and one or more processors configured to implement the method of any preceding paragraph.

In an embodiment, a non-transitory computer storage medium includes instructions for debugging a computer program that is executed by an operating system of a target computer system as a task, the instructions, when executed by the target computer system, perform a method that includes executing a plurality of program instructions of the computer program on the target computer system until at least one condition for stopping execution is triggered, the target computer system including memory and at least one processor. The method can also include, while executing the plurality of instructions of the computer program on the target computer system, recording in a trace data log trace data associated with execution of the computer program, the trace data including a first set of data identifying a subset of program instructions being executed, a second set of data identifying a plurality of memory writes being performed by the computer program, and a third set of data including memory values stored in the memory of the target computer system when the at least one condition for stopping execution has been triggered. The method can also include providing the trace data for reconstruction, in a reverse order of execution of the computer program from a program instruction being executed when the at least one condition has been triggered, of a state of the target computer system at a time of execution of a program instruction from the plurality of program instructions, wherein the reconstruction is performed in accordance with constant algorithmic complexity.

In an embodiment, the computer storage medium of the preceding paragraph can include one or more of the following features. The second set of data identifying the plurality of memory writes can include data values stored in the memory prior to being overwritten. The method can also include periodically recording a plurality of snapshots of data values stored in a plurality of registers of the at least one processor of the target computer system during execution of the computer program and providing the plurality of snapshots for reconstruction of the state of the target computer system. The computer program can include a plurality of instrumentation instructions configured to record at least some of the trace data. The plurality of instrumentation instructions can include one or more instrumentation instructions configured to be executed, for each basic block of a plurality of basic blocks, upon entry into the basic block, wherein the plurality of basic blocks are associated with the computer program, and wherein each basic block in the plurality of basic blocks includes a sequence of instructions that has one entry point and one exit point. One or more instrumentation instructions can be further configured to be executed prior to executing a first instruction of the basic block. One or more instrumentation instructions can be further configured to record in the trace data log a plurality of unique identifiers associated with the execution of each basic block of the plurality of basic blocks. One or more instrumentation instructions configured to record in the trace data log a unique identifier associated with the execution of a basic block can be configured to be executed upon exit from the basic block. The unique identifier can include a program counter value associated with the exit from the basic block. The plurality of instrumentation instructions can be further configured not to record data identifying a plurality of memory reads of at least some volatile memory locations of the target computer system performed during execution of the computer program. The plurality of instrumentation instructions can be further configured to record addresses of the at least some volatile memory locations. The at least one condition for stopping execution can include one or more of execution of a program instruction, memory access, or another halting condition.

In an embodiment, the computer storage medium of any of the preceding paragraphs can include one or more of the following features. The method can include setting a reserved register of the at least one processor of the target computer system as a pointer into a memory buffer for storing trace data in the trace data log. The method can also include, during execution of the computer program on the target computer system, detecting, by the operating system of the target computer system, a page fault associated with accessing the memory buffer, allocating a new memory buffer for storing trace data in the trace data log, and setting the reserved register to point to the new memory buffer. The method can also include during execution of the computer program, recording in a separate trace data log a plurality of operating system events associated with execution of the computer program. The method can also include during execution of the computer program, recording one or more memory values corresponding to one or more memory locations of the target computer system prior to the one or more memory values being overwritten by the operating system. The at least one processor can include a plurality of symmetric multicore processors (SMPs) and the plurality of instrumentation instructions can be further configured to generate a plurality of trace data logs associated with trace data of each of the plurality of SMPs. The method can also include recording in the plurality of trace data logs trace data associated with execution of the computer program by the plurality of SMPs. The method can also include periodically writing a plurality of timestamps to the plurality of trace data logs, the plurality of timestamps configured to facilitate synchronization of the trace data collected from the plurality of SMPs. The trace data log can be stored in memory of the computer system.

In an embodiment, a non-transitory computer storage medium includes instructions for debugging a computer program, the instructions, when executed by a computer system, perform a method that includes instrumenting the computer program with a plurality of instrumentation instructions configured to generate trace data configured to be stored in at least one trace data log. Instrumenting can include determining a plurality of basic blocks associated with the computer program, wherein each basic block in the plurality of basic blocks includes a sequence of instructions that has one entry point and one exit point, and for at least some basic blocks of the plurality of basic blocks, generating and inserting into the computer program one or more instrumentation instructions configured to record a plurality of basic block entry points of the at least some basic blocks. The method can include while the computer program is being executed, causing recording in the at least one trace data log trace data associated with execution of the computer program on a target computer system, the target computer system including memory and at least one processor.

In an embodiment, the computer storage medium of any of the preceding paragraphs can include one or more of the following features. Instrumenting can also include generating instrumentation instructions configured to record one or more memory values stored in the memory prior to being overwritten. Instrumenting can also include skipping recording of memory addresses of at least some memory locations that are overwritten. Instrumenting can also include skipping a basic block that is configured to be executed together with another basic block. At least some of the basic block entry points or at least some of one or more memory locations of the target computer system can be virtual memory locations. The plurality of instrumentation instructions can be also configured to record periodically values stored in a plurality of registers of the at least one processor of the target computer system. The plurality of instrumentation instructions can be also configured to improve cache usage. The plurality of instrumentation instructions can also reduce cache impact. At least some instrumentation instructions of the plurality of instrumentation instructions can be disabled during linking of one or more object files into an executable file for execution on the at least one processor of the target computer system. Instrumenting the computer program can further include inserting at least one additional instrumentation instruction during compiling of the computer program in response to encountering one or more compiler directives in the computer program. The one or more compiler directives can be configured to mark a synchronization operation in the computer program. The plurality of instrumentation instructions can be further configured to be executed upon exit from a first basic block but not a second basic block, the second basic block having only the first basic block as a successor. The plurality of instrumentation instructions can be further configured to be executed upon exit from first and second basic blocks but not a third basic block, the third basic block having only the first and second basic blocks as successors.

In an embodiment, the computer storage medium of any of the preceding paragraphs can include one or more of the following features. The plurality of instrumentation instructions can be further configured to record trace data associated with a plurality of function entries and exits for a plurality of functions of the computer program. Instrumenting the computer program can include skipping at least one leaf function of the plurality of functions of the computer program. The plurality of instrumentation instructions can be further configured to record a plurality of timestamps in the trace data, the plurality of timestamps configured to record a time of function entry and a time of function exit of a function of the plurality of functions of the computer program. The at least one trace data log can include a first trace data log for storing trace data associated with the plurality of instrumentation instructions and a second trace data log for storing trace data associated with an operating system.

In an embodiment, a non-transitory computer storage medium includes instructions for debugging at least one task from a plurality of tasks executed by an operating system, the instructions, when executed by a target computer system, perform a method that includes reconstructing a state of the target computer system at a particular time using trace data collected during execution of the task on the target computer system, the target computer system including memory and at least one processor and displaying the state of the target computer system and thereby enabling identification of an error in the at least one task. The trace data can include a plurality of memory locations of a target computer system associated with a plurality of basic block entry points of a plurality of basic blocks of the at least one task, one or more memory values corresponding to one or more memory locations of the target computer system prior to the one or more memory values being overwritten, and a plurality of snapshots of data values stored in a plurality of registers of the at least one processor of the target computer system, the plurality of snapshots periodically recorded during execution of the at least one task. Reconstructing the state of the target computer system at the particular time can further include starting with a last basic block being executed before halting execution of the at least one task, decoding the trace data in a reverse order of execution of the at least one task, the decoding including determining memory values stored in the memory and the plurality of registers of the target computer system and using the decoded data values stored in the memory and the determined data values stored in the plurality of registers, simulating execution of the at least one task on the target computer system from a time that precedes the particular time to the particular time.

In an embodiment, the computer storage medium of any of the preceding paragraphs can include one or more of the following features. The trace data can further include memory values stored in the memory of the target computer system when execution of the at least one task has been stopped, and wherein reconstructing the state of the target computer system further includes using the memory values stored in the trace data when execution of the at least one task has been stopped. Reconstructing the state of the target computer system can further include, for a first memory location of the plurality of memory locations, retrieving from the trace data a first memory location address and value prior to being overwritten and writing to the first memory address the memory value prior to being overwritten. Reconstructing the state of the target computer system can further include storing a current memory value of the first memory location in the trace data and simulating execution of the at least one task can further include in response to determining that the first memory location is being written to, retrieving the current memory value stored in the trace data and storing the current memory value in the first memory location. Reconstructing the state of the target computer system can further include, for a second memory location of the plurality of memory locations, determining a second memory location address using the first memory location address and information stored in a mapping file. Each basic block in the plurality of basic blocks can include a sequence of instructions that has one entry point and one exit point. Determining data values stored in the plurality of registers of the at least one processor of the target system at the time that precedes the particular time can include using a snapshot that is closest in time and precedes the particular time. Determining data values stored in the plurality of registers of the at least one processor of the target system can include using register values saved during a context switch to another task. The at least one task can include a plurality of tasks executed by the operating system.

Terminology

In general the word "module," as used herein, refers to logic embodied in hardware or firmware or to a collection of software instructions. Modules are written in a program language, such as JAVA, C or C++, or the like. Software modules may be compiled or linked into an executable program, installed in a dynamic link library, or may be written in an interpreted language such as BASIC, Perl, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in- whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted. All of the features disclosed in this specification (including any accompanying claims, abstract and drawings), and/or all of the steps of any method or process so disclosed, may be combined in any combination. The protection extends to any novel one, or any novel combination, of the features disclosed in this specification (including any accompanying claims, abstract and drawings), or to any novel one, or any novel combination, of the steps of any method or process so disclosed.

In the present disclosure, the term "real-time" can refer to a substantially instantaneous or near instantaneous event. In other words, "real-time" may refer to the concept of user-interaction time, such as the amount of processing time by or with the contextual virtual workspace is less than the user's reaction time (for example, less than 1 second or 0.5 seconds). Elsewhere in the present disclosure, the term "real-time" is used as part of the phrase, "real-time clock." When used as part of the phrase "real-time clock", "real-time" refers to the objective passage of time, and a "real-time clock" is a mechanism that measures the objective passage of time in common units such as milliseconds.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," "containing," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z. Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 50% of, within less than 10% of, within less than 5% of, within less than 1% of, within less than 0.1% of, and within less than 0.01% of the stated amount. The headings used herein are for the convenience of the reader only and are not meant to limit the scope of the disclosure or claims. Although this disclosure has been described in the context of certain preferred embodiments and examples, it will be understood by those skilled in the art that the present disclosure extends beyond the specifically disclosed embodiments to other alternative embodiments and/or uses of the disclosure and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present disclosure should not be limited by the particular disclosed embodiments described above.

All of the methods and tasks described herein may be performed and fully automated by a computer system. The computer system may, in some cases, include multiple distinct computers or computing devices (for example, physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (for example, ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 9%, 8%, 7%, 6%, 5%, 4%, 3%, 2%, or 1% of, within less than 0.1% of, and within less than 0.01% of the stated amount.

What is claimed is:

1. A non-transitory computer-readable storage medium storing instructions that, when executed by at least one processor, cause the at least one processor to perform a method of instrumenting at least one computer program, the method comprising:

instrumenting the at least one computer program by adding, to the at least one computer program, instrumentation instructions that log, to a unified log, trace data generated during execution of the at least one computer program on one or more execution units, wherein the trace data facilitates determination of a state of the at least one computer program at a plurality of points in time;

wherein the unified log comprises one or more logs and one or more pools of available memory configured to be written to by the one or more execution units;

wherein at least one log of the one or more logs of the unified log comprises one or more chunks of memory allocated from the one or more pools of available memory;

wherein each log of the one or more logs of the unified log comprises a current chunk of memory allocated from the one or more pools of available memory to which the instrumentation instructions log the trace data;

wherein each log of the one or more logs of the unified log comprises a log pointer from which a location of a next entry to be written within the current chunk of memory allocated from the one or more pools of available memory is determined; and wherein logging the trace data to the unified log maximizes capacity of the unified log for storing the trace data generated during execution of the at least one computer program on the one or more execution units and is configured to improve execution performance of the at least one computer program.

2. The non-transitory computer-readable storage medium of claim 1, wherein at least one chunk of memory from the one or more pools of available memory is allocated to each log of the one or more logs of the unified log.

3. The non-transitory computer-readable storage medium of claim 2, wherein at least one log of the one or more logs of the unified log is extended by the allocation.

4. The non-transitory computer-readable storage medium of claim 3, wherein the at least one log of the one or more logs of the unified log is extended responsive to the current chunk of memory allocated from the one or more pools of available memory being full.

5. The non-transitory computer-readable storage medium of claim 1, wherein the instrumentation instructions write the trace data to the current chunk of memory allocated from the one or more pools of available memory associated with a log of the one or more logs of the unified log.

6. The non-transitory computer-readable storage medium of claim 1, wherein the unified log supports archiving the current chunk of memory allocated from the one or more pools of available memory from a log of the one or more logs of the unified log and designating a new current chunk of memory allocated from the one or more pools of available memory within the log of the one or more logs of the unified log.

7. The non-transitory computer-readable storage medium of claim 6, wherein identifying an end of the current chunk of memory allocated from the one or more pools of available memory in the log of the one or more logs of the unified log is used to determine when to initiate the archiving.

8. The non-transitory computer-readable storage medium of claim 6, wherein the new current chunk of memory allocated from the one or more pools of available memory is assigned from the one or more pools of available memory.

9. The non-transitory computer-readable storage medium of claim 6, wherein the new current chunk of memory allocated from the one or more pools of available memory comprises a recycled chunk of memory allocated from the one or more pools of available memory that was previously archived.

10. The non-transitory computer-readable storage medium of claim 9, wherein the recycled chunk of memory allocated from the one or more pools of available memory comprises a chunk of memory allocated from the one or more pools of available memory that was least recently archived.

11. The non-transitory computer-readable storage medium of claim 9, wherein the recycled chunk of memory allocated from the one or more pools of available memory is cleared before it becomes the new current chunk of memory allocated from the one or more pools of available memory.

12. The non-transitory computer-readable storage medium of claim 1, wherein the at least one computer program executing on the one or more execution units comprises one or more virtual address spaces and the current chunk of memory allocated from the one or more pools of available memory of the at least one log of the one or more logs of the unified log is mapped into a logging aperture within at least one virtual address space of the one or more virtual address spaces.

13. The non-transitory computer-readable storage medium of claim 12, wherein one or more attempts to write beyond an end of the logging aperture are detected.

14. The non-transitory computer-readable storage medium of claim 13, wherein the one or more attempts to write beyond the end of the logging aperture are detected using one or more virtual memory addresses adjacent to the logging aperture that are left unmapped.

15. The non-transitory computer-readable storage medium of claim 12, wherein the at least one virtual address space of the one or more virtual address spaces contains a plurality of logging apertures.

16. The non-transitory computer-readable storage medium of claim 15, wherein at least one logging aperture of the plurality of logging apertures is associated with at least one execution unit of the one or more execution units.

17. The non-transitory computer-readable storage medium of claim 16, wherein the instrumentation instructions are configured to log the trace data by writing the trace data to the at least one logging aperture of the plurality of logging apertures associated with the one or more execution units on which the instrumentation instructions are executed.

18. The non-transitory computer-readable storage medium of claim 1, wherein a faulty software program writing erroneous data to the unified log is detected.

19. The non-transitory computer-readable storage medium of claim 18, wherein a consumer of the erroneous data detects the erroneous data and stops consuming log data before consuming the erroneous data.

20. The non-transitory computer-readable storage medium of claim 1, wherein the one or more logs of the unified log changes over time.

21. The non-transitory computer-readable storage medium of claim 1, wherein the instrumentation instructions comprise one or more store instructions that bypass at least one data cache to improve execution performance of the at least one computer program.

22. The non-transitory computer-readable storage medium of claim 1, wherein the instrumentation instructions comprise at least one instruction that manipulates a data cache to improve execution performance of the at least one computer program.

23. The non-transitory computer-readable storage medium of claim 22, wherein the at least one instruction that manipulates the data cache results in a flushing of at least one data cache line of the data cache.

24. The non-transitory computer-readable storage medium of claim 22, wherein the at least one instruction that manipulates the data cache results in a pre-allocation of at least one data cache line of the data cache.

25. The non-transitory computer-readable storage medium of claim 22, wherein a compiler determines a placement of the at least one instruction that manipulates the data cache.

* * * * *